(12) United States Patent
Fachan et al.

(10) Patent No.: US 7,509,448 B2
(45) Date of Patent: Mar. 24, 2009

(54) SYSTEMS AND METHODS FOR MANAGING SEMANTIC LOCKS

(75) Inventors: Neal T. Fachan, Seattle, WA (US); Aaron J. Passey, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 191 days.

(21) Appl. No.: 11/650,572

(22) Filed: Jan. 5, 2007

(65) Prior Publication Data

US 2008/0168458 A1 Jul. 10, 2008

(51) Int. Cl.
*G06F 13/00* (2006.01)
(52) U.S. Cl. .......................... 710/200; 707/8; 718/107
(58) Field of Classification Search ............... 707/1, 707/8; 710/200; 718/100, 107, 108
See application file for complete search history.

(56) References Cited

U.S. PATENT DOCUMENTS

| | | | |
|---|---|---|---|
| 5,163,131 A | 11/1992 | Row et al. |
| 5,181,162 A | 1/1993 | Smith et al. |
| 5,230,047 A | 7/1993 | Frey et al. |
| 5,251,206 A | 10/1993 | Calvignac et al. |
| 5,258,984 A | 11/1993 | Menon et al. |
| 5,403,639 A | 4/1995 | Belsan et al. |
| 5,548,724 A | 8/1996 | Akizawa et al. |
| 5,596,709 A | 1/1997 | Bond et al. |
| 5,657,439 A | 8/1997 | Jones et al. |
| 5,668,943 A | 9/1997 | Attanasio et al. |
| 5,734,826 A | 3/1998 | Olnowich et al. |
| 5,761,659 A | 6/1998 | Bertoni |
| 5,774,643 A | 6/1998 | Lubbers et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,884,098 A | 3/1999 | Mason, Jr. |
| 5,884,303 A | 3/1999 | Brown |
| 5,890,147 A | 3/1999 | Peltonen et al. |
| 5,933,834 A | 8/1999 | Aichelen |
| 5,943,690 A | 8/1999 | Dorricott et al. |
| 5,996,089 A | 11/1999 | Mann |
| 6,029,168 A | 2/2000 | Frey |
| 6,038,570 A | 3/2000 | Hitz et al. |
| 6,055,543 A | 4/2000 | Christensen et al. |

(Continued)

FOREIGN PATENT DOCUMENTS

EP    0774723    5/1997

(Continued)

OTHER PUBLICATIONS

Nov. 15, 2002 International Search Report PCT/US02/24728.

(Continued)

*Primary Examiner*—Glenn A Auve
(74) *Attorney, Agent, or Firm*—Knobbe, Mertens, Olson & Bear, LLP.

(57) ABSTRACT

In one embodiment, a system for managing semantic locks and semantic lock requests for a resource is provided. Access to the resource is controlled such that compatible lock requests can access the resource and incompatible lock requests are queued.

5 Claims, 30 Drawing Sheets

U.S. PATENT DOCUMENTS

| | | |
|---|---|---|
| 6,070,172 A | 5/2000 | Lowe |
| 6,081,883 A | 6/2000 | Popelka et al. |
| 6,117,181 A | 9/2000 | Dearth et al. |
| 6,122,754 A | 9/2000 | Litwin et al. |
| 6,138,126 A | 10/2000 | Hitz et al. |
| 6,154,854 A | 11/2000 | Stallmo |
| 6,209,059 B1 | 3/2001 | Ofer et al. |
| 6,219,693 B1 | 4/2001 | Napolitano et al. |
| 6,321,345 B1 | 11/2001 | Mann |
| 6,334,168 B1 | 12/2001 | Islam et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,397,311 B1 | 5/2002 | Capps |
| 6,449,730 B2 | 9/2002 | Mann |
| 6,453,389 B1 | 9/2002 | Weinberger et al. |
| 6,457,139 B1 | 9/2002 | D'Errico et al. |
| 6,502,172 B2 | 12/2002 | Chang |
| 6,502,174 B1 | 12/2002 | Beardsley et al. |
| 6,526,478 B1 | 2/2003 | Kirby |
| 6,546,443 B1 | 4/2003 | Kakivaya et al. |
| 6,557,114 B2 | 4/2003 | Mann |
| 6,567,894 B1 | 5/2003 | Hsu et al. |
| 6,567,926 B2 | 5/2003 | Mann |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,598,174 B1 | 7/2003 | Parks et al. |
| 6,618,798 B1 | 9/2003 | Burton et al. |
| 6,662,184 B1 | 12/2003 | Friedberg |
| 6,732,125 B1 | 5/2004 | Autrey et al. |
| 6,848,029 B2 | 1/2005 | Coldewey |
| 6,917,942 B1 * | 7/2005 | Burns et al. ............... 707/100 |
| 6,934,878 B2 | 8/2005 | Massa et al. |
| 6,940,966 B2 | 9/2005 | Lee |
| 6,954,435 B2 | 10/2005 | Billhartz et al. |
| 7,007,044 B1 | 2/2006 | Rafert et al. |
| 7,111,305 B2 | 9/2006 | Solter et al. |
| 7,146,524 B2 | 12/2006 | Patel et al. |
| 7,177,295 B1 | 2/2007 | Sholander et al. |
| 7,184,421 B1 | 2/2007 | Liu et al. |
| 7,240,235 B2 | 7/2007 | Lewalski-Brechter |
| 7,257,257 B2 | 8/2007 | Anderson et al. |
| 7,318,134 B1 | 1/2008 | Oliveira et al. |
| 7,373,426 B2 | 5/2008 | Jinmei et al. |
| 2001/0047451 A1 | 11/2001 | Noble et al. |
| 2002/0035668 A1 | 3/2002 | Nakano et al. |
| 2002/0055940 A1 | 5/2002 | Elkan |
| 2002/0072974 A1 | 6/2002 | Pugliese et al. |
| 2002/0095438 A1 | 7/2002 | Rising et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0014391 A1 | 1/2003 | Evans et al. |
| 2003/0033308 A1 | 2/2003 | Patel et al. |
| 2003/0135514 A1 | 7/2003 | Patel et al. |
| 2003/0172149 A1 | 9/2003 | Edsall et al. |
| 2004/0003053 A1 | 1/2004 | Williams |
| 2004/0024963 A1 | 2/2004 | Talagala et al. |
| 2004/0153479 A1 | 8/2004 | Mikesell et al. |
| 2004/0199734 A1 | 10/2004 | Rajamani et al. |
| 2004/0205141 A1 | 10/2004 | Goland |
| 2004/0230748 A1 | 11/2004 | Ohba |
| 2005/0066095 A1 | 3/2005 | Mullick et al. |
| 2005/0114609 A1 | 5/2005 | Shorb |
| 2005/0171960 A1 | 8/2005 | Lomet |
| 2005/0171962 A1 | 8/2005 | Martin et al. |
| 2005/0188052 A1 | 8/2005 | Ewanchuk et al. |
| 2005/0289169 A1 | 12/2005 | Adya et al. |
| 2005/0289188 A1 * | 12/2005 | Nettleton et al. ............ 707/200 |
| 2006/0004760 A1 | 1/2006 | Clift et al. |
| 2006/0074922 A1 | 4/2006 | Nishimura |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0230411 A1 | 10/2006 | Richter et al. |
| 2006/0277432 A1 | 12/2006 | Patel |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094452 A1 | 4/2007 | Fachan |
| 2007/0168351 A1 | 7/2007 | Fachan |
| 2007/0171919 A1 | 7/2007 | Godman et al. |
| 2007/0195810 A1 | 8/2007 | Fachan |
| 2007/0233684 A1 * | 10/2007 | Verma et al. ................ 707/8 |
| 2007/0233710 A1 | 10/2007 | Passey et al. |
| 2008/0021907 A1 | 1/2008 | Patel et al. |
| 2008/0031238 A1 | 2/2008 | Harmelin et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0126365 A1 | 5/2008 | Fachan et al. |
| 2008/0154978 A1 | 6/2008 | Lemar et al. |
| 2008/0168458 A1 | 7/2008 | Fachan et al. |

FOREIGN PATENT DOCUMENTS

| | | |
|---|---|---|
| WO | WO 01/14991 | 3/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

Apr. 20, 2004 International Search Report PCT/US03/36699.
Aug. 6, 2004 International Search Report PCT/US03/33704.
European Search Report dated May 21, 2007 issued to EP application No. 02756944.1-2201.
Philip A. Bernstein, Vassos Hadzilacos, and Nathan Goodman, *Concurrency Control and Recovery in Database Systems*, Addison-Wesley, 1987.

Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.
Kenneth P. Birman, *Building Secure and Reliable Network Applications*, Manning, 1996, pp. 1-327.
Kenneth P. Birman, *Building Secure and Reliable Network Applications*, Manning, 1996, pp. 328-619.
Coulouris et al., *Distributed Systems Concepts and Design*; Addison-Wesley, Second Edition, 1994, pp. 353-371 and 377-405.
Jim Gray and Andreas Reuter, *Transaction Processing: Concepts and Techniques*, Morgan Kaufmann, 1993, pp. 1-328.
Jim Gray and Andreas Reuter, *Transaction Processing: Concepts and Techniques*, Morgan Kaufmann, 1993, pp. 329-664.
Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, *Distributed Algorithms*, Morgan Kaufmann, 1996 pp. 410-871.
Sape Mullender, editor, *Distributed Systems ($2^{nd}$ Ed.)*, ACM Press/ Addison-Wesley Publishing Co., New York, NY, USA, 1993, pp. 1-327.
Sape Mullender, editor, *Distributed Systems ($2^{nd}$ Ed.)*, ACM Press/ Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.
Gerhard Weikum, et al., *Transactional Information Systems: Theory, Algorithms, and the Practice of Concurrency Control and Recovery*, Morgan Kaufmann, 2002, pp. 451-863.
Sanjay Ghemawat et al., *The Google File System, Symposium on Operating Systems Principles*, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Bob Duzett, et al., *An Overview of the nCube 3 Supercomputer*, IEEE, Jul. 1992, pp. 458-464.
John Henry Hartman, *The Zebra Striped Network File System*, (Sc.B. (Brown University) 1987, pp. 1-148.
Darrell D.E, Long et al., *Swift/RAID: A Distributed RAID System, Computing Systems*, vol. 7, No. 3 Summer 1994, pp. 333-359.
Michael Stonebraker et al., *Distributed Raid: A new Multiple copy Algorithm*, IEEE 1990, pp. 430-434, Berkeley, California.
Stallings, William, *Operating Systems*, Prentice Hall, Fourth Edition; 2001, pp. 197-253 and 265-293.
United States Court of Appeals, Federal Circuit, *Seachange International, Inc. Vs. nCUBE, Corp.*, Oct. 26, 2004, 28 pages.
United States Court of Appeals, Federal Circuit, *Seachange International, Inc. Vs. C-Corp, Inc.*, Jun. 29, 2005, 22 pages.
United States District Court, Delaware, *Seachange International, Inc. Vs. nCUBE, Corp.*, Apr. 7, 2004, 13 pages.
United States District Court, Delaware, *Seachange International, Inc. Vs. nCUBE, Corp.*, Aug. 29, 2000, 12 pages.
Feb. 22, 2008 Int'l Search report PCT/US07/018326, 20 pages.
May 8, 2008 Int'l Search report PCT/US07/018324, 13 pages.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Seven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately), 1 page.
Isilon Systems, "Isilon IQ Platform Overview", 4 pages, 2007 (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E Ed—Institute of Electrical and Electronics Engineers: "Incremental restart (database management)" Proceedings of the International Conference on Data Engineering. Kobe, JP, Apr. 8-12, 1991; [Proceedings of the International Conference on Data Engineering], Los Alamitos, IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000 (200-01-01), pp. I-V, 423-509.

\* cited by examiner

*420*

| HELD ARRAY FOR RESOURCE X | |
|---|---|
| 421 — TYPE 0 | 0 |
| 422 — TYPE 1 | −1 |
| 423 — TYPE 2 | 30 |
| 424 — TYPE 3 | 3 |
| 425 — TYPE 4 | 0 |
| ⋮ | ⋮ |
| 426 — TYPE N | 0 |
| 427 — TYPE N+1 | −1 |

FIG. 9

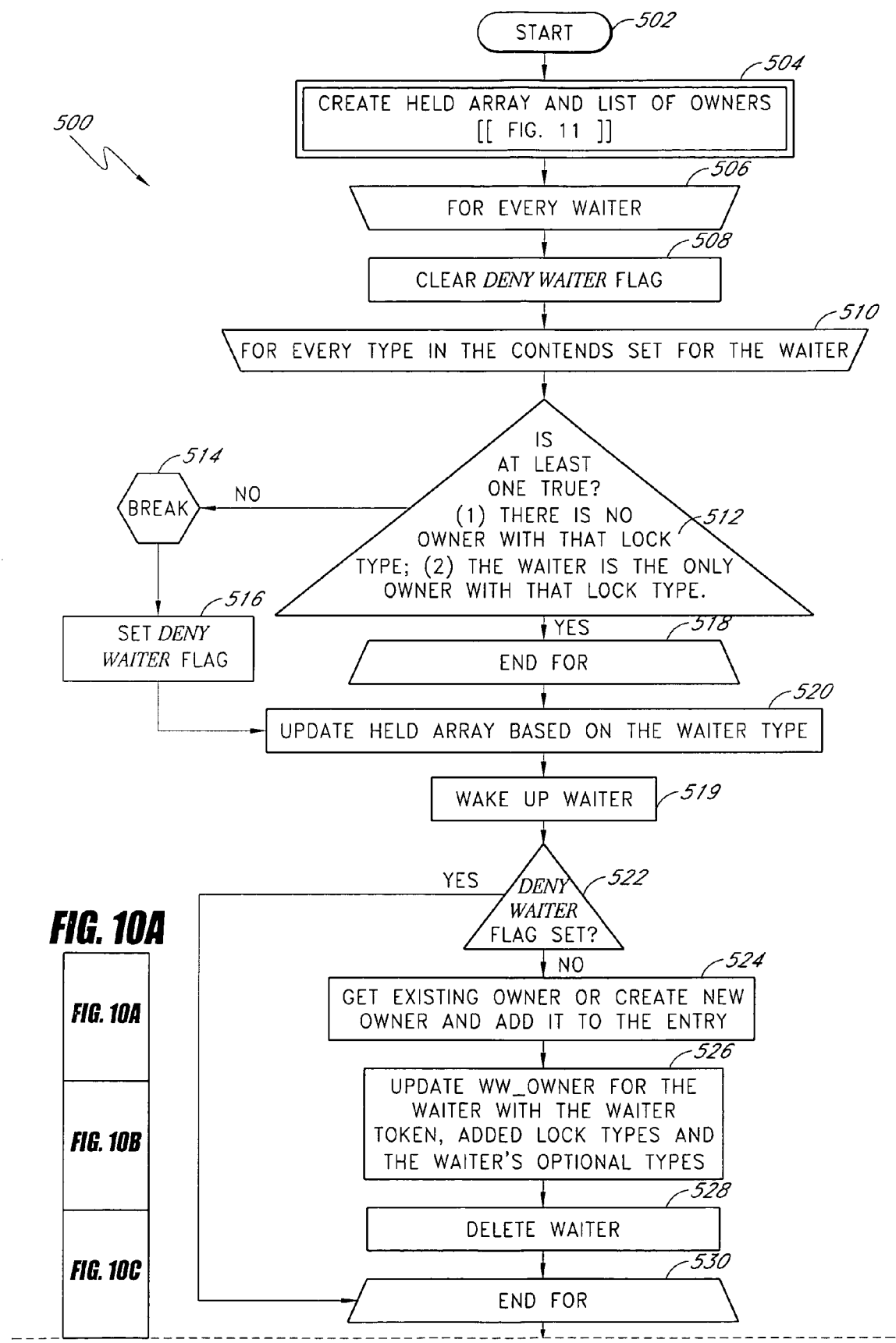

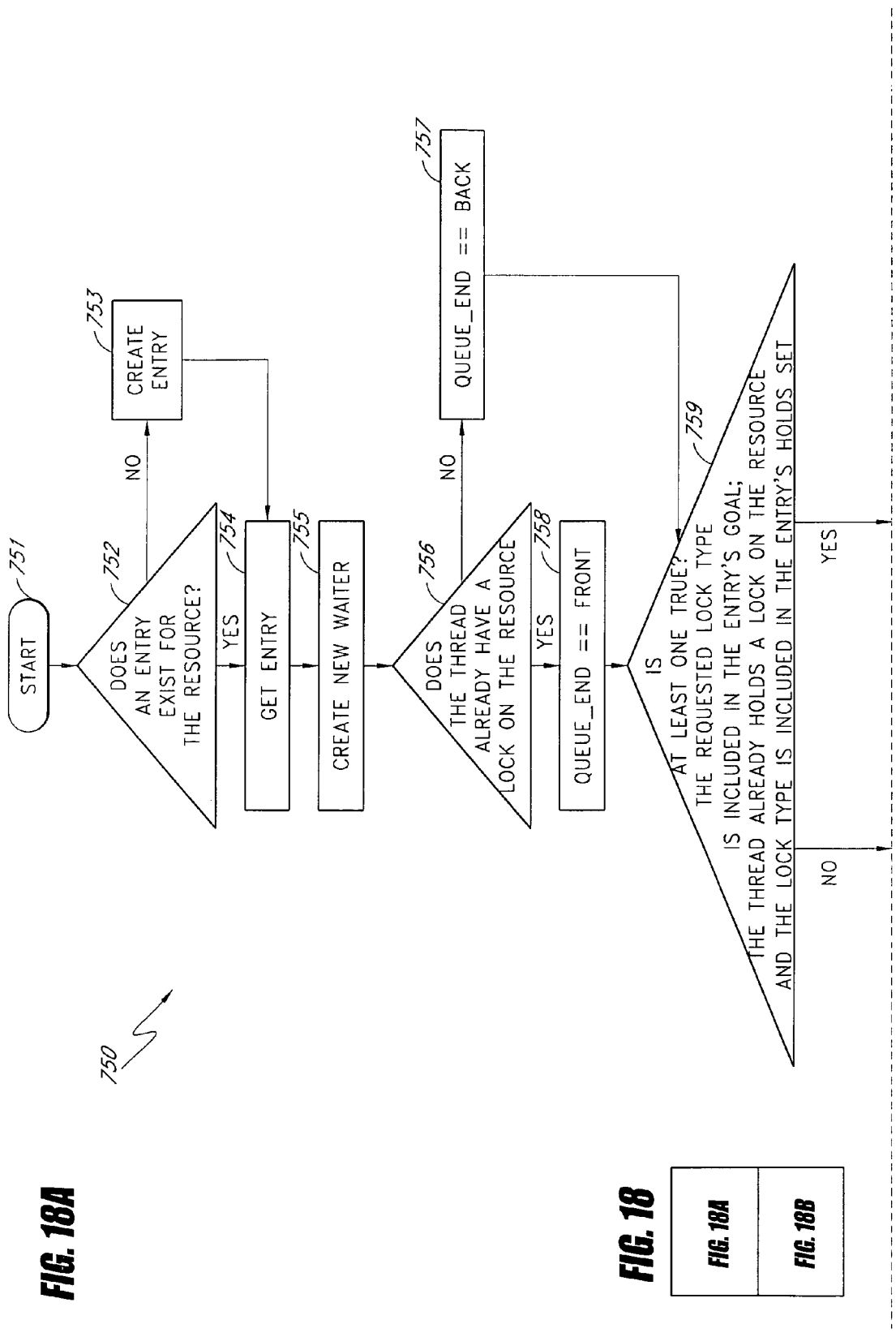

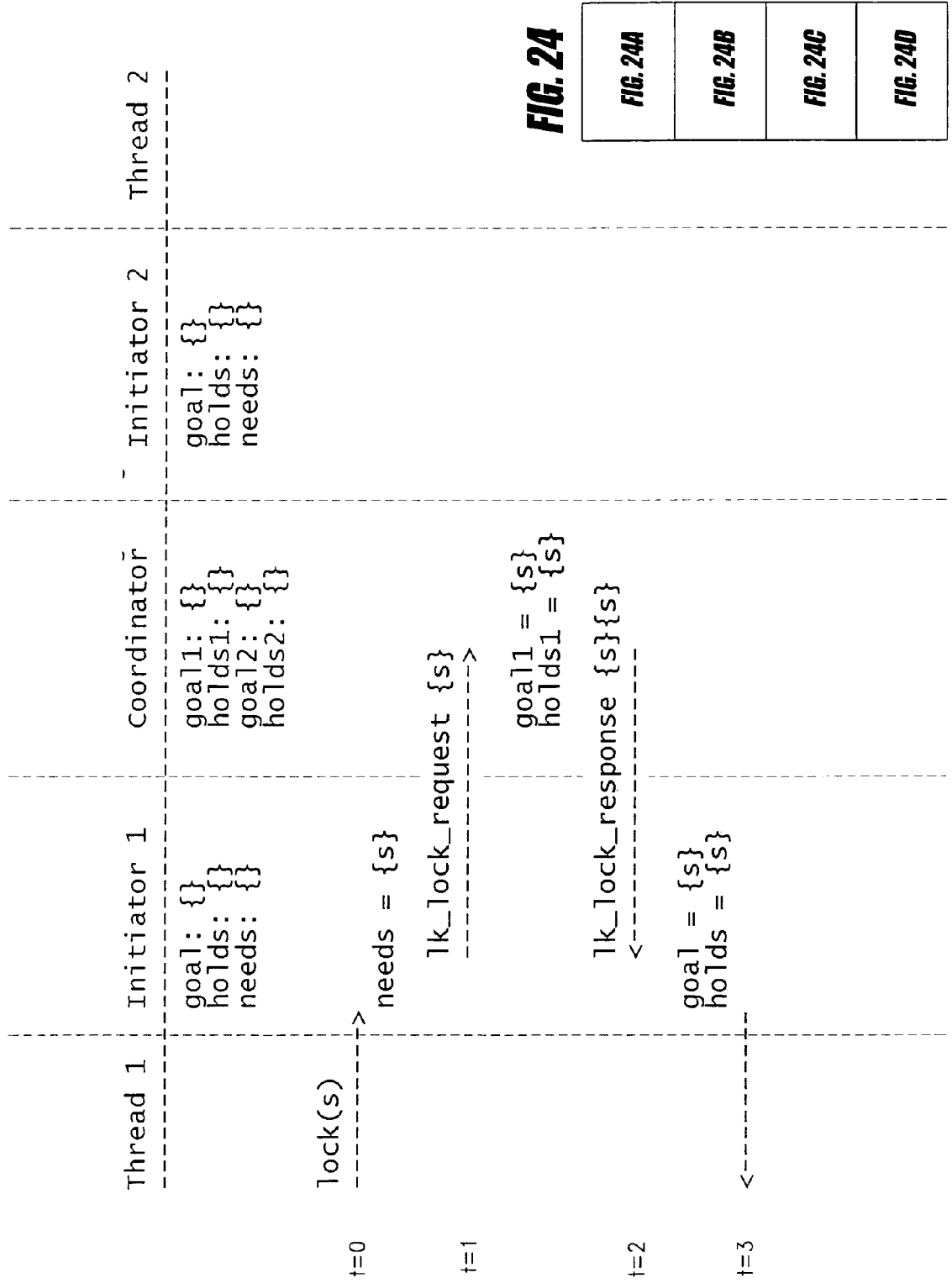

SYSTEMS AND METHODS FOR MANAGING SEMANTIC LOCKS

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF THE INVENTION

The systems and methods disclosed herein relate generally to resources on a computer system and more specifically to systems and methods for managing locks on resources in a computer system.

DESCRIPTION OF THE RELATED ART

Computer systems are generally comprised of resources that are accessed or otherwise utilized by one or more clients on the system. A client may access the resource to perform any number of operations. Some operations are indifferent to whether other clients concurrently access the resource. In other operations, no other clients concurrently access the resource. Yet in other operations, a specific set of other client operations concurrently access the resource. For example, client A may have a lock on a resource that permits it to write to that resource while denying any other client concurrent access to the resource. In contrast, if client A only needs to read the resource, the resource may permit other clients that also desire read access to share the resource.

In complex computing systems, hundreds and even thousands of operation types exist. Accordingly, hundreds of access types, or "locks", on a resource may exist. When a large number of this many lock types are considered, there exists a need in the art to efficiently and accurately manage lock requests on a resource.

SUMMARY OF THE INVENTION

The embodiments disclosed herein relate generally to resources on a computer system and more specifically to systems and methods for managing locks on resources in a computer system.

In one embodiment, a system for managing semantic locks and semantic lock requests for a resource is provided. The system may include a resource; a resource lock information indicating existing locks on said resource; a first lock compatibility table stored in a memory including information on a plurality of lock types, said information relating to the compatibility among the plurality of lock types; and a software module. The software module may be configured to receive a first lock request; access said first lock compatibility table and said resource lock information to determine whether said first lock request is compatible with existing locks on said resource; and transmit a response indicating that said first lock request could be granted if said first lock request is compatible with the existing locks on said resource.

In another embodiment, a method for managing semantic locks and semantic locks requests for a resource is provided. The method may include receiving a first lock request for a resource; accessing a first lock compatibility table and a resource lock information to determine whether said first lock request is compatible with existing locks on said resource, wherein the first lock compatibility table stores information relating to the compatibility among a plurality of lock types and the resource lock information indicates existing locks on said resource; and transmitting a response indicating that said first lock request could be granted if said first lock request is compatible with the existing locks on said resource.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein

BRIEF DESCRIPTION OF THE DRAWINGS

FIG. 9 illustrates one embodiment of a held array data structure used by a coordinator.

FIGS. 10, 10A, 10B, and 10C illustrate one embodiment of a flowchart of operations for a wake coordinator waiters process for a coordinator.

FIGS. 18, 18A and 18B illustrate one embodiment of a flowchart of operations for a start or convert lock process for an initiator.

FIGS. 24, 24A, 24B, 24C, and 24D illustrate an example application of one embodiment of the invention.

DETAILED DESCRIPTION OF PREFERRED EMBODIMENTS

Figure 1:
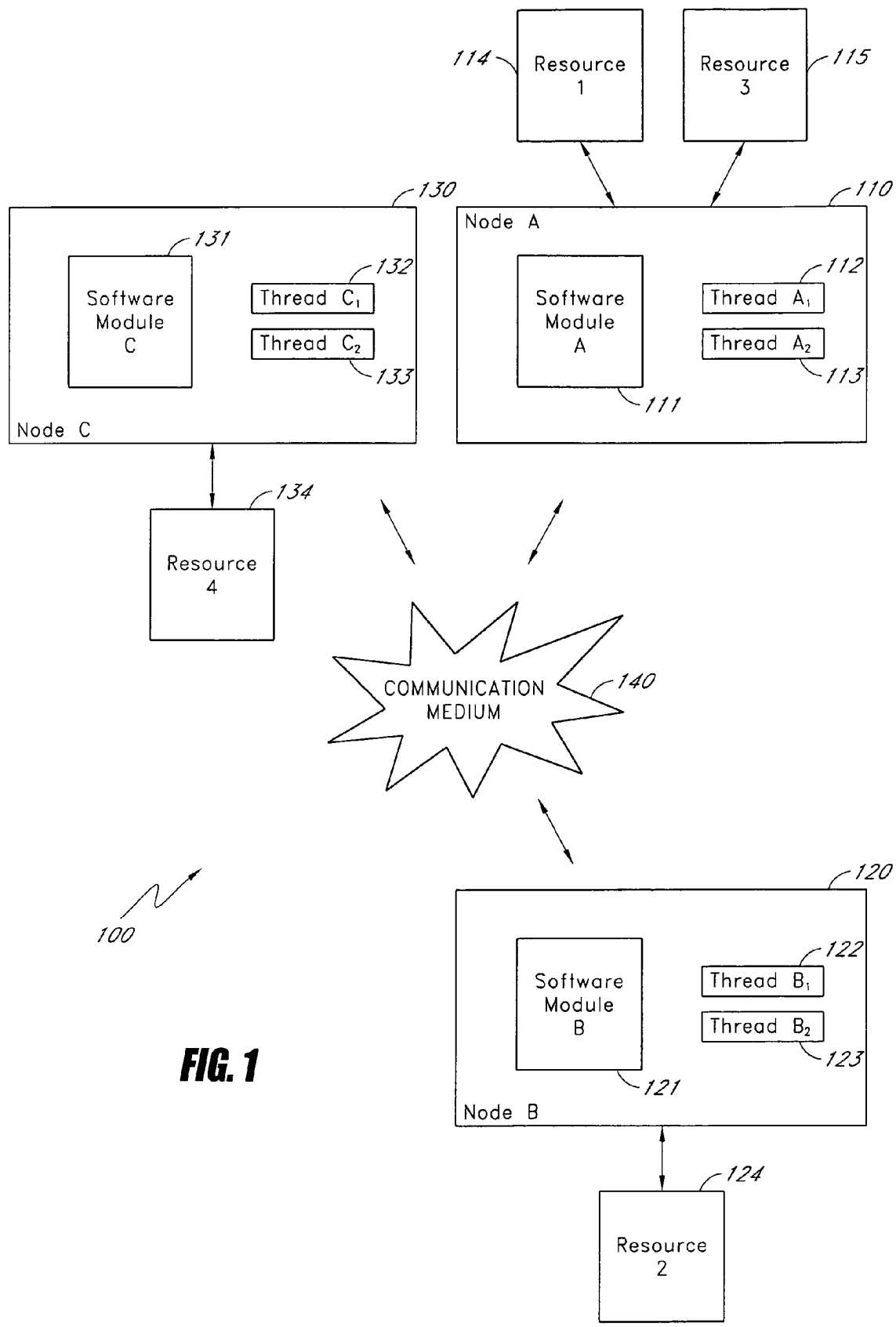
FIG. 1 illustrates one embodiment of a high-level system diagram of connections of nodes in one embodiment of a computer system.

Systems, methods, processes, and data structures which represent one embodiment of an example application of the invention will now be described with reference to the drawings. Variations to the systems, methods, processes, and data structures which represent other embodiments will also be described.

For purposes of illustration, some embodiments disclosed herein may be implemented in the context of a distributed file system. Embodiments of a distributed file system suitable for accommodating embodiments for managing semantic locks disclosed herein are disclosed in U.S. patent application Ser. No. 10/007,003, titled, "Systems And Methods For Providing A Distributed File System Utilizing Metadata To Track Information About Data Stored Throughout The System," filed Nov. 9, 2001 which claims priority to Application No. 60/309,803 filed Aug. 3, 2001, U.S. Pat. No. 7,146,524, titled, "Systems And Methods For Providing A Distributed File System Incorporating A Virtual Hot Spare," filed Oct. 25, 2002, and U.S. patent application Ser. No. 10/714,326, titled, "Systems And Methods For Restriping Files In A Distributed File System," filed Nov. 14, 2003, which claims priority to Application No. 60/426,464, filed Nov. 14, 2002, all of which are hereby incorporated herein by reference in their entirety.

For purposes of illustration, some embodiments will also be described with reference to updating data structures in a file system using information stored in related data structures of the file system. Embodiments of a file system capable of updating data structures with information stored in related data structures of a file system are disclosed in U.S. patent application Ser. No. 11/255,337, titled, "Systems And Methods For Accessing And Updating Distributed Data," and is hereby incorporated herein by reference in its entirety.

As used herein, data structures are collections of associated data elements, such as a group or set of variables or parameters. In one embodiment a structure may be implemented as a C-language "struct." One skilled in the art will appreciate that many suitable data structures may be used.

Additionally, resources, as used herein, refer to anything that is accessed by a node, application, thread, process, subprocess, function, or other entity in a computer system. For example, a resource may be a location on a physical disk, a magnetic storage medium, an optical disk drive, a communication channel, another resource, the resource itself, a function, a process, and so forth. One skilled in the art will appreciate that a variety of different resource types may exist on a computer system at the same time.

Some of the figures and descriptions relate to an embodiment of the invention wherein the environment is that of a computer system. The present invention is not limited by the type of environment in which the systems, methods, processes and data structures are used. The systems, methods, structures, and processes may be used in other environments, such as, for example, other file systems, other distributed systems, the Internet, the World Wide Web, a private network for a hospital, a broadcast network for a government agency, an internal network of a corporate enterprise, an intranet, a local area network, a wide area network, a wired network, a wireless network, and so forth. It is also recognized that in other embodiments, the systems, methods, structures and processes may be implemented as a single module and/or implemented in conjunction with a variety of other modules and the like.

I. Overview

In some of the embodiments disclosed herein, several resources and threads exist on a computer system. As used herein, threads are entities on the system that request locks. A thread requests locks on a resource, and locks for different resources are handled independently. Accordingly, for purposes of illustration only, embodiments are described herein with respect to a single resource. It will be appreciated by one with ordinary skill in the art that the disclosed processes and systems may be used to manage locks for a plurality of resources.

In one embodiment, each thread is associated with one particular node on the computer system. A node is a logical object on the system. As used herein, an initiator is a node associated with threads (for example, the lock-requesting entities). In this embodiment, threads are assigned an initiator based on which node the thread is included in. Resources are assigned an initiator on a round-robin basis. In another embodiment, resources are assigned to coordinator nodes in a manner that achieves load balancing.

Each resource on the computer system is also associated with a particular node. As used herein, a coordinator is a node associated with a resource (for example, a physical disk). In some embodiments, a thread's initiator may be the same node as a resource's coordinator.

In the illustrated embodiment, the lock system utilizes two modules: an initiator and a coordinator. The coordinator hands out locks to initiators, and initiators hand out locks to threads. When a thread requests a lock on a resource, it requests the lock via a message to the initiator. The initiator determines whether the thread's lock request is incompatible with lock requests from threads associated with that initiator. If suitable given other pending locks and/or lock requests associated with the initiator, the initiator sends a message to the coordinator requesting a lock on the resource. Then, the coordinator determines if the requested lock can be granted based on lock requests from other initiators on the system. For example, initiators deal with intranode contention for a resource, and coordinators deal with internode contention for a resource. In some embodiments when the initiator and the coordinator happen to be on the same node, messages are sent through a "loopback" interface rather than through a network.

Additionally, in some embodiments, an initiator is allowed to hold locks even when no threads on that node need the lock. This situation is referred to herein as lock caching. In some embodiments, lock caching supports efficient operation of the system. For example, if a lock is requested by a thread on a certain initiator, there is a high likelihood that that thread will soon request the lock again. In other words, the same initiator would need to obtain a lock on the resource again. Additionally, lock caching can assist with keeping data caches consistent. For example, if an initiator holds a shared lock on a file for a thread, then all cached data associated with that file is known to be valid. However, once the initiator loses the shared lock, another node can change the contents of the file, invalidating the cache. Thus, the lock system knows the cache is invalidated when the shared lock is lost.

Many conventional lock implementations have two types of locks: shared and exclusive. Sometimes, these are called reader and writer locks, respectively. An exclusive lock is incompatible with all other locks, while a shared lock is only incompatible with exclusive locks.

In a semantic locking system, instead of just having two types of locks, the system defines as many types of locks as it needs. It then defines which locks are compatible with other types of locks. The reason it is called "semantic" is that a designer can create one lock type for each semantic operation, and then define the relationships, instead of having to map from a "reading" operation to a "shared" lock. For example, the relationship between shared and exclusive locks may be represented using the following lock compatibility table:

|   | s | e |
|---|---|---|
| s | 1 | 0 |
| e | 0 | 0 |

The lock compatibility table above shows that shared locks (s) are compatible with other shared locks (indicated by "1"), but exclusive locks (e) are incompatible with all other locks (indicated by "0"). In one embodiment, semantic locks are defined by two factors: the operations that need to be performed using the lock, and operations on the resource excluded by the lock when it is asserted. For example, you can read or write data (r,w), or do both (a), and then exclude nobody (n), other readers (r), other writer (w), or all others (a). For ease of reference, lock types will be referenced using the lock types for an operation followed by lock types that are excluded. For example, a lock type that needs to write to a resource and exclude other readers of the resource is represented by, "w-r." One example of a lock compatibility table is provided below:

|     | r-n | r-r | r-w | w-n | w-r | w-w | a-n | a-r | a-w | -a |
|-----|-----|-----|-----|-----|-----|-----|-----|-----|-----|----|
| r-n | 1   | 0   | 1   | 1   | 0   | 1   | 1   | 0   | 1   | 0  |
| r-r | 0   | 0   | 0   | 1   | 0   | 1   | 0   | 0   | 0   | 0  |
| r-w | 1   | 0   | 1   | 0   | 0   | 0   | 0   | 0   | 0   | 0  |
| w-n | 1   | 1   | 0   | 1   | 1   | 0   | 1   | 1   | 0   | 0  |
| w-r | 0   | 0   | 0   | 1   | 1   | 0   | 0   | 0   | 0   | 0  |
| w-w | 1   | 1   | 0   | 0   | 0   | 0   | 0   | 0   | 0   | 0  |
| a-n | 1   | 0   | 0   | 1   | 0   | 0   | 1   | 0   | 0   | 0  |
| a-r | 0   | 0   | 0   | 1   | 0   | 0   | 0   | 0   | 0   | 0  |
| a-w | 1   | 0   | 0   | 0   | 0   | 0   | 0   | 0   | 0   | 0  |
| -a  | 0   | 0   | 0   | 0   | 0   | 0   | 0   | 0   | 0   | 0  |

Accordingly, some embodiments are described herein in the context of a system that can be initialized by providing a set of possible lock types and a lock compatibility table for the set of possible lock types. For example, an embodiment that interfaces with Microsoft® Windows® implements a lock compatibility table that includes a set of more than 100 different possible lock types the Microsoft® Windows® operating system holds on resources.

In some embodiments, the lock compatibility table is symmetric. As illustrated above, a symmetric lock compatibility table is symmetric about the diagonal when it is drawn in a table form. In other embodiments, a lock compatibility table may be asymmetric.

A lock may be equal to another lock, a supertype of another lock, or a subtype of another lock. For example, suppose there are two locks, lock_1 and lock_2. If all locks which are compatible with lock_1 are also compatible with lock_2, then lock_1 is a supertype of lock_2. Accordingly, if lock_1 is a supertype of lock_2, then lock_2 is a subtype of lock_1. However, if all locks that are compatible with lock_1 are compatible with lock_2 and all locks that are compatible with lock_2 are compatible with lock_1, then lock_1 is equal to lock_2. Additionally, locks are unequal if they are neither supertypes nor subtypes of one another.

In the embodiments that implement a lock compatibility table, one implementation disallows equal lock types. For example, if lock_1 and lock_2 are equal, then they must be the same type. In one embodiment, disallowing equal lock types simplifies implementation. If a lock domain has identical types, then a mapping structure or another similar implementation is used to map equal lock types in the lock domain to a single lock type in the lock compatibility table. For example, in a system that supports Microsoft® Windows®, more than 1000 actual lock types can exist with only about 100 unique lock types in the lock compatibility table. This is why, in the larger lock compatibility table above), there is only one row and one column for -a (r-a, w-a, and a-a are equal locks).

II. System Architecture

FIG. 1 illustrates one embodiment of the high level system diagram 100 of connections of nodes 110, 120, 130 in one embodiment of a computer system 100. The nodes 110, 120, 130 communicate over a communication medium 140. In one embodiment, the communication medium 140 is the World Wide Web. In other embodiments, as described above, the computer system 100 may be comprised of one or more hard-wired or wireless connections between the nodes 110, 120, 130 or any combination of communication types/channels known to one with ordinary skill in the art. In yet other embodiments, more or fewer nodes may be present. The nodes 110, 120, 130 may be interfaces, data storage systems, client applications, processes or anther entity that resides on a computer system 100. In one embodiment, a node is any collection of threads which can communicate more quickly with each other than with threads outside of the node. In some embodiments, threads within a node communicate through shared memory, while threads outside of the node communicate through the network. In other embodiments, a node is a Local Area Network ("LAN") that communicates with other nodes over a Wide Area Network ("WAN").

As used herein, the word module refers to logic embodied in hardware or firmware, or to a collection of software instructions, possible having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software module may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

Each of the nodes 110, 120, 130 is associated with one or more resources 114, 115, 124, 134. For example, node A 110, is associated with resources one 114 and three 115. Each of the nodes 110, 120, 130 also comprises a software module 111, 121, 131. The software modules 111, 121, 131 (i) execute processes needed to manage requests to the resource(s) associated with its respective node and (ii) manage requests by its local threads for remote resources. In other embodiments, the software modules only execute processes needed to manage requests to the resource(s) associated with its respective node. In yet other embodiments, the software modules only manage requests by its local threads for remote resources.

In the illustrated embodiment, node A 110 comprises software module A 111. Node A 110 is also associated with resource one 114 and resource three 115. Node A 110 is also associated with two threads, thread $A_1$ 112 and thread $A_2$ 113. If thread $A_1$ wishes to access resource four 134, it sends a message for a lock request to software module A 111. Then, software module A 111 sends a message over the communication medium 140 to node C 130 which is associated with resource four 134. Software module C 131 determines if the lock requested by thread $A_1$ 112 can be granted (for example, software module C 131 determines if thread $A_{1'_s}$ 112 lock request is compatible with other outstanding locks and/or lock requests).

Additionally, if thread $A_2$ 113 wishes to obtain a lock on resource one 114, it sends a lock request message to the software module 111. In this scenario, because the resource is local to the thread requesting the lock, node A 111 is both the initiator and coordinator. Thus, the node first determines whether there is intranode contention for resource one 114. If there is no intranode contention, the message is passed through a loopback interface and a determination of internode contention is made.

III. Coordinator

As stated above, a resource on the system is associated with a coordinator. The coordinator determines whether a lock request for its associated resource may be granted. The coordinator makes the determination of whether the lock request can be granted based on the current owners and waiters of the resource. As used herein, an owner of a resource has a lock on the resource. An entity is considered an owner both when it is asserting a lock on the resource or if it holds a cached lock (for example, a deasserted lock) on the resource. In some embodiments, an entity is only considered an owner if it is asserting a lock on a resource (for example, during an operation involving the resource). Additionally, the term waiter is used herein to refer to entities on the system 100 that have sent the coordinator a lock request message but are waiting to have the request granted (for example, a pending lock request).

A. Data Structures

Figure 2:
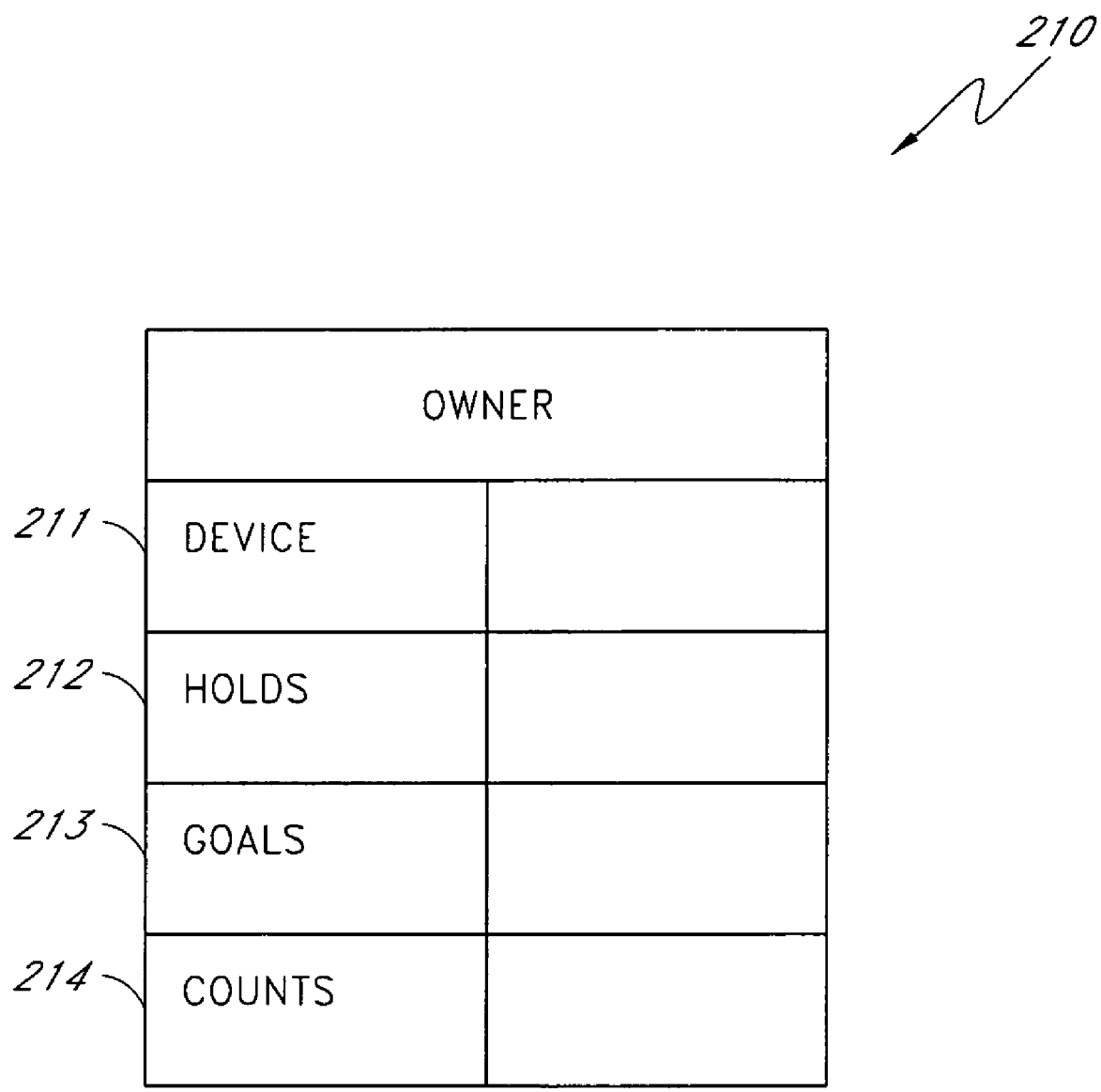
FIG. 2 illustrates one embodiment of an owner data structure used by a coordinator.

FIG. 2 illustrates one embodiment of an owner data structure used by a coordinator. An owner data structure is created for initiators that hold a lock on a particular resource. For example, an initiator that holds a lock on a plurality of resources would have an owner data structure for each of the resources. The exemplary coordinator data structure 210 is comprised of four fields: a device field 211, a holds field 212, a goals field 213, and a counts field 214. The device field 211 stores information relating to the device identifier (ID) of the initiator that the owner data structure 210 represents. In one embodiment, the device ID is a unique identifier on the system associated with the initiator. The holds field 212 stores a set of lock types that the particular owner holds on the associated resource. The goals field 213 indicates the types of locks that the coordinator for the resource thinks the particular owner should have. In some embodiments, the coordinator determines the lock types in the goals set 213 based on pending lock requests. In one embodiment, the goals field is a subset of the holds set. In other embodiments, there is no relationship between the goals set and the holds field set. The counts field 214 stores an array or other data structure that indicates the number of locks of each type that the owner holds on the resource. In one embodiment, a lock type is in the holds set if and only if the count for that lock type is nonzero. The purpose of storing counts is described in further detail below.

Figure 3:
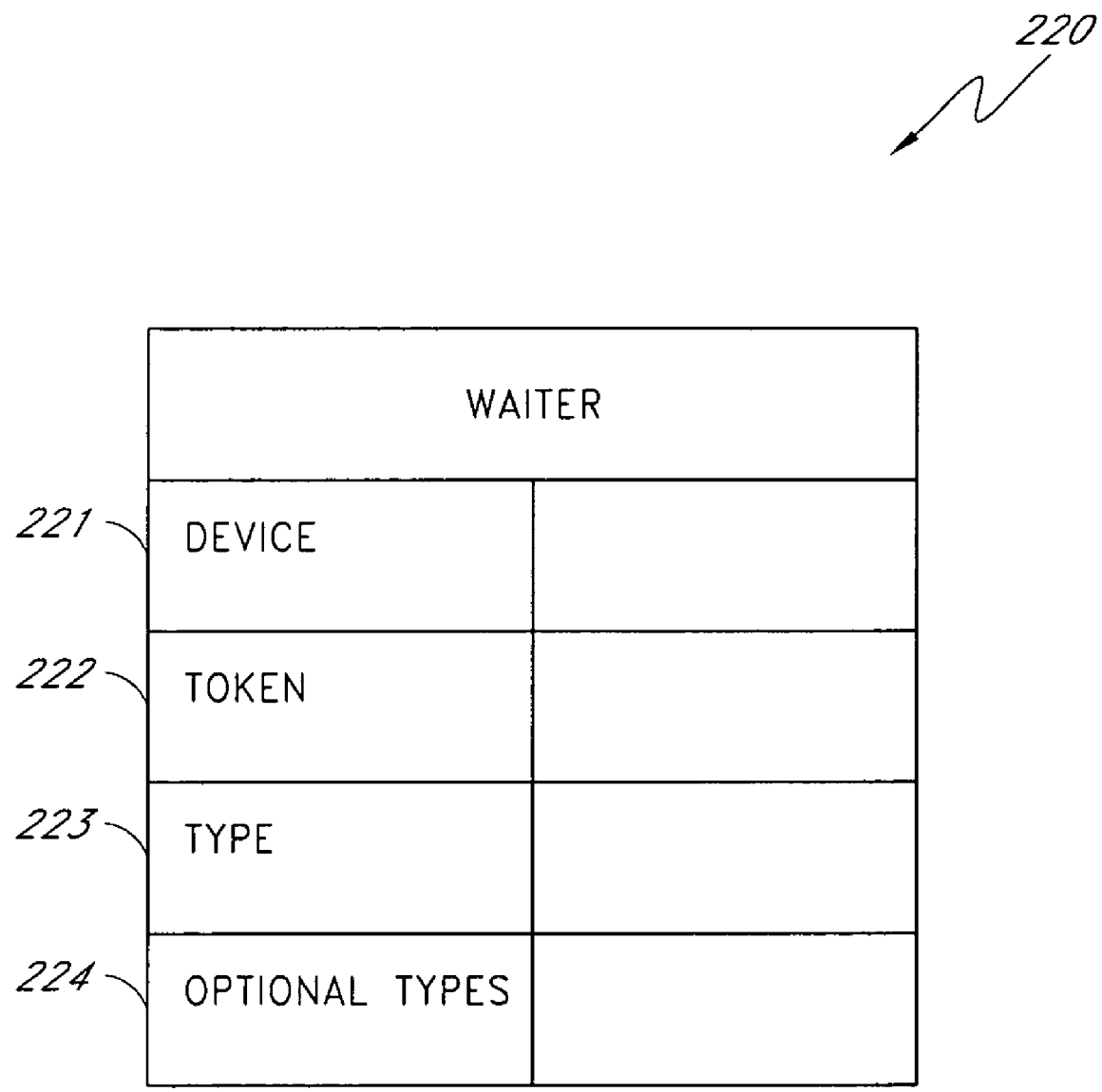
FIG. 3 illustrates one embodiment of a waiter data structure used by a coordinator.

FIG. 3 illustrates one embodiment of a waiter data structure used by a coordinator. A waiter data structure is created for pending lock requests for a particular resource. In the illustrated embodiment, a waiter data structure is created when an initiator sends a lock request to a coordinator. In this embodiment, if the lock request is granted, the waiter data structure is "converted" into an owner data structure. However, if the initiator must wait to obtain access to the resource, the waiter data structure is "converted" to an owner data structure only after the lock is granted. In other embodiments, if a lock request is immediately granted, only a corresponding owner data structure is created.

The waiter data structure 220 is comprised of four fields, a device field 221, a token field 222, a type field 223, and an optional types field 224. The device field 221 includes the device ID of the initiator represented by the waiter data structure 220. The token field 222 is a field that stores a value that is unique to the lock request associated with the waiter data structure 220. For example, when an initiator places a request for a lock on a resource, that request is assigned a unique token that is stored in the token field 222. In some embodiments, the token is used to track the sequence of lock requests. The type field 223 stores a representation of the types of lock(s) that the initiator is requesting. The optional types field 224 indicates the optional types of lock(s) that an initiator is requesting. As will be discussed in more detail below, the types field 223 stores lock types that the initiator needs. In contrast, the optional types field 224 stores lock types that the initiator would like to have but does not need.

Figure 4:
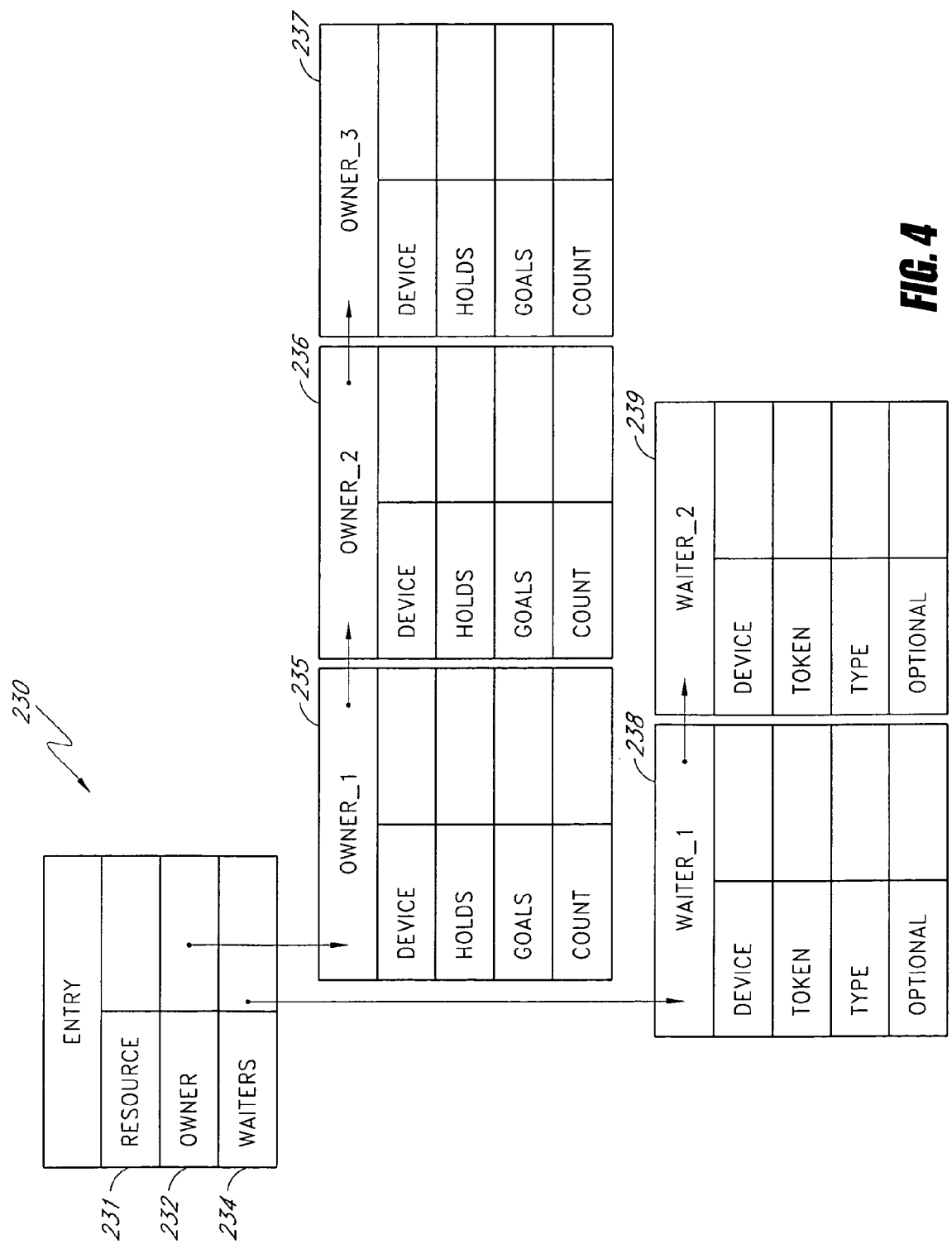
FIG. 4 illustrates one embodiment of an entry data structure used by a coordinator and related owner and waiter data structures.

FIG. 4 illustrates one embodiment of an entry data structure used by a coordinator and the owner and waiter data structures that the entry data structure references. An entry data structure is associated with a particular resource on the system. In the illustrated embodiment, an entry data structure exists if there is an owner of the resource. For example, if a resource does not have an owner, an entry data structure is created when an owner obtains a lock on the associated resource. Additionally, if the sole owner of a resource releases its lock, the entry data structure for the resource is disassociated with the resource and deleted.

The entry data structure 230 is comprised of three fields, a resource field 231, an owner field 232, and a waiters field 234. The resource field 231 stores a reference to the resource associated with the entry data structure 230. The owner field 232 includes a reference to one or more owner data structures 235, 236, 237 associated with the resource. As shown, owner data structures 235, 236, and 237 hold a lock on the resource associated with entry data structure 230. In one embodiment, the owner field 232 references a single owner data structure 235. That owner data structure 235 then references a next owner data structure 236, owner data structure 236 references the next owner data structure 237, and so forth. In another embodiment, the owner field 232 stores a set of references to the set of owner data structures associated with the resource. The waiters field 234 includes a reference to one or more waiter data structures 238, 239 associated with the resource. In one embodiment, the waiters field 234 references a single waiter data structure 238. The waiter data structure 238 then references a subsequent waiter data structure 239, and so forth. In this implementation, the order of the waiters queue is apparent. In another embodiment, the waiter field 234 stores a set of references to a plurality of waiter data structures associated with the resource.

The data structures illustrated in FIGS. 2-4 represent only one embodiment of the data structures that can be used by the system described herein. In other embodiments, the data structures have more of fewer fields. For example, the entry data structure 230 may include a field for each one of the owners to a resource referenced in field 231. Additionally, the owner data structure 210 may have additional fields such as a field that stores a set of cached locks on the resource.

B. Messages and Operations

In the illustrated embodiment, the coordinator receives three types of messages from initiators on the system: a lock request message, a lock release message, and a lock cancel message; and the coordinator sends one type of message to initiators on the system: a lock response message.

Figure 5:
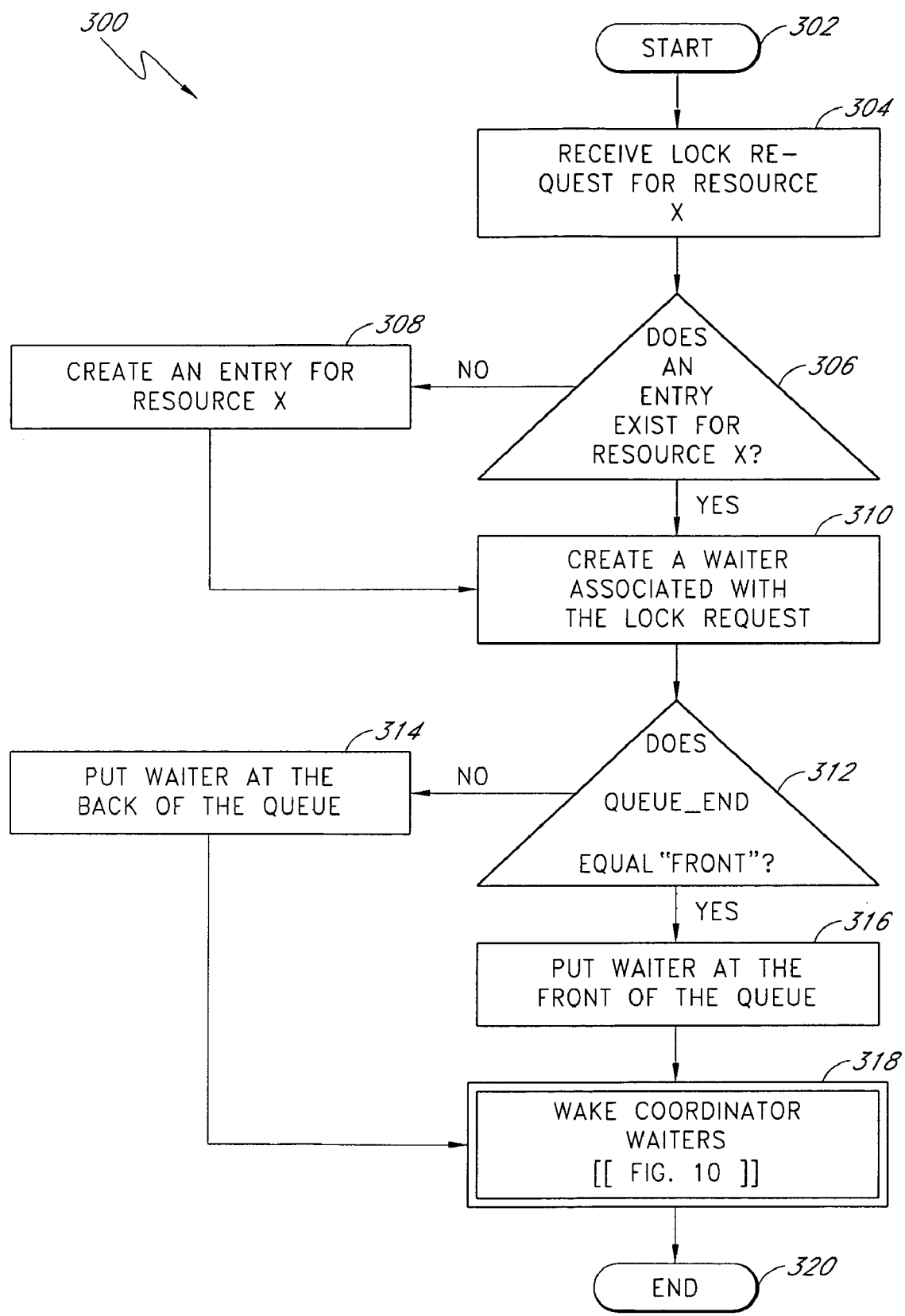
FIG. 5 illustrates one embodiment of a flowchart of operations for receiving a lock request by a coordinator.

FIG. 5 illustrates one embodiment of the flowchart of operations for a coordinator when it receives a lock request message. An initiator sends a lock request message to a coordinator in order to obtain a lock on the resource associated with the coordinator. In the illustrated embodiment, when the initiator receives the lock request message, it creates a waiter data structure associated with the request and calls the "wake coordinator waiters" process 500. As will be described in more detail below, wake coordinator waiters determines if any of the waiters in the queue may be woken (for example, it determines whether a pending lock request can be granted). For example, when the coordinator receives a lock request message, it first creates a corresponding waiter data structure and then determines if the lock request can be granted. If the lock can be granted, the waiter data structure is removed from the waiters queue and converted to an owner data structure.

The receive lock request process 300 begins 302 by receiving a lock request for resource X 304. In one embodiment, the lock request includes some or all of the following information: the device ID of the initiator associated with the request, a reference to the corresponding resource, the type(s) of lock(s) requested, the type(s) of optional lock(s) requested, a waiter token, and a QUEUE_END value. In one embodiment, the waiter token is a unique value assigned to each lock request. The QUEUE_END value stores an indication of whether a waiter data structure should be placed at the beginning or end of the queue. In some embodiments, lock conversions (for example, an upgrade or downgrade of an existing lock) and recursive locks (for example, multiple concurrent locks) are placed at the beginning of the queue, and other lock requests are placed at the end of the queue.

After receiving the lock request 304, decision block 306 determines whether an entry exists for resource X. In embodiments where an entry data structure exists only when a resource has an owner, an entry data structure must first be created if the resource has no owners. If an entry for the resource has already been created, the process 300 creates a waiter data structure associated with the lock request 310. However, if an entry data structure for the resource does not exist, then the process 300 creates an entry data structure associated with the resource 308 before creating the waiter data structure 310.

Next, decision block 312 determines whether the QUEUE_END variable equals FRONT. As described above, in some embodiments, the QUEUE_END variable stores a representation of the value "FRONT" when the lock request is for a lock conversion or a lock request, otherwise the QUEUE_END variable does not store a representation of the value "FRONT". If the QUEUE_END variable equals FRONT, then the waiter associated with the received locked request is put at the FRONT of the queue 316. However, if the QUEUE_END variable does not equal front, then the waiter associated with the received lock request is put at the back of the queue 314. Next, after the waiter has been added to the queue, the receive lock request process 300 calls the subprocess wake coordinator waiters in block 318. After the wake coordinator waiters process 500 finishes, then the receive lock request process 300 ends 320.

Figure 6:
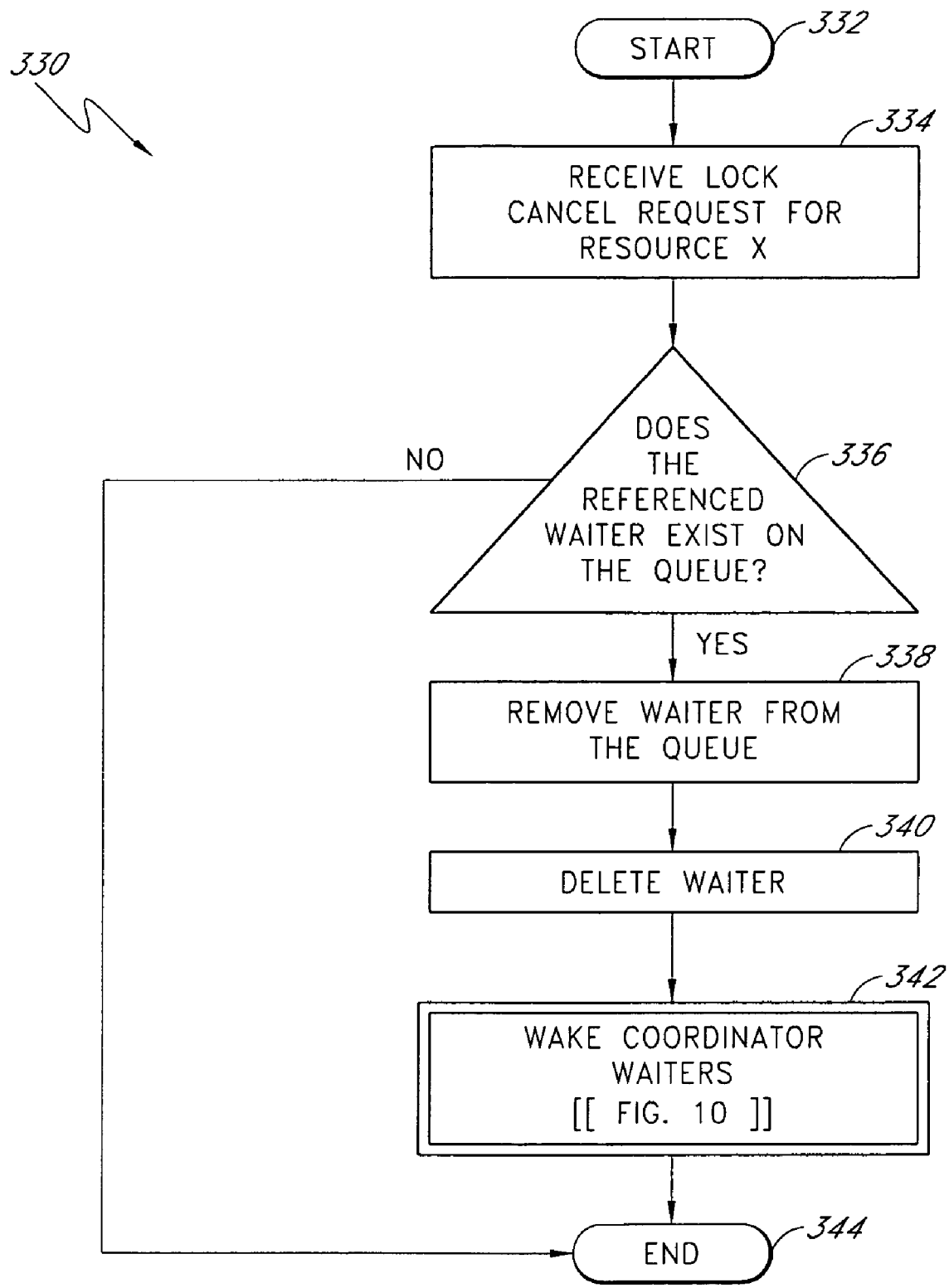
FIG. 6 illustrates one embodiment of a flowchart of operations for receiving a lock cancel message by a coordinator.

FIG. 6 illustrates one embodiment of a flowchart of operations 330 for receiving a lock cancel message by a coordinator. An initiator sends a lock cancel message to a coordinator in order to cancel a pending lock request for a resource associated with the coordinator. When the coordinator receives a lock cancel message, it locates the referenced waiter data structure and tries to remove it from the queue of waiters. If a waiter data structure is found and removed, then the receive lock cancel process calls the subprocess wake coordinator waiters. However, in situations where the referenced waiter does not exist (for example, if the coordinator grants the lock request before it receives the lock cancel message), then the receive lock cancel process ends.

In the illustrated embodiment, a lock cancel message only applies to waiters that are waiting for their lock to be granted. As will be described below, the lock release message applies owners of the resource rather than waiters.

The receive lock cancel process 330 begins 332 by receiving a lock cancel request message for resource X 334. In one embodiment, the lock cancel message will include some or all of the following information: the device ID of the initiator associated with the request, a reference to the corresponding resource, and a waiter token. The waiter token is a unique value that is assigned to the lock request the initiator wishes to cancel. In combination with the other inputs, the waiter token can be used to reference the lock request the initiator wishes to cancel.

After the received lock cancel request for resource X has been received 334, decision block 336 determines whether the referenced waiter exists on the queue for the resource. If the referenced waiter is not on the queue, the receive lock cancel process 330 ends.

However, if the referenced waiter is in the entry data structure's waiters queue for the resource, the associated waiter data structure is removed from the queue 338 and deleted 340. Then, the receive lock cancel process 330 calls the wake coordinator waiters process 500 in block 342. After the wake coordinator waiters process 500 finishes, then the receive lock cancel process 330 ends 344.

Figure 7:
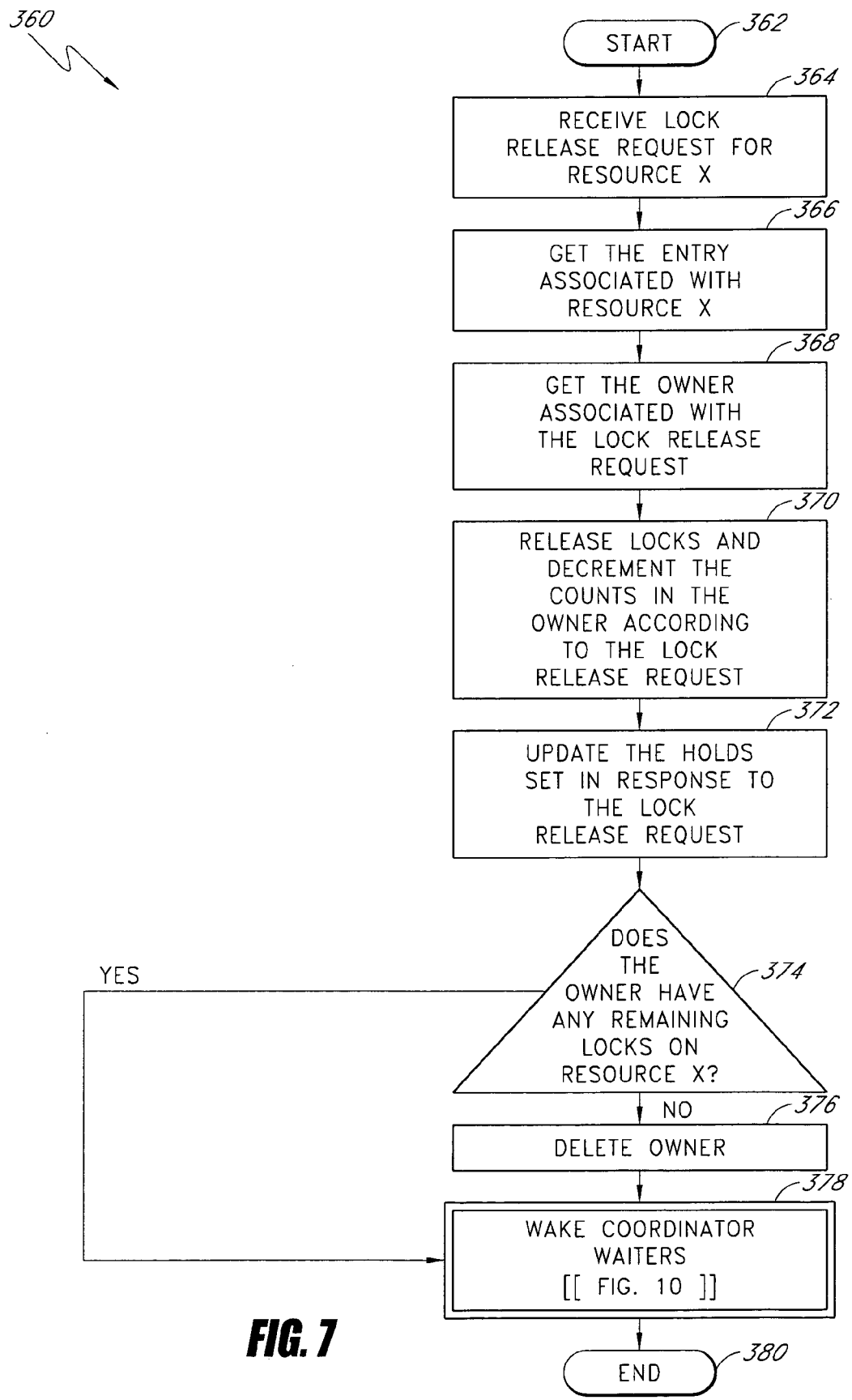
FIG. 7 illustrates one embodiment of a flowchart of operations for receiving a lock release message by a coordinator.

FIG. 7 illustrates one embodiment of a flowchart of operation for receiving a lock release message by a coordinator. An initiator sends a lock release message to a coordinator when it wants to release a lock one of its associated threads has on a resource. When the coordinator receives the lock release message, it decrements the counts for the owner, updates the holds if necessary, and calls the subprocess wake coordinator waiters. In the illustrated embodiment, wake coordinator waiters is called even if the owners of the resource have not changed as a result of the receive lock release message to prevent problems associated with crossed messages between the coordinator and initiator. In other embodiments, the receive lock release process only calls wake coordinator waiters if the locks on the resource have changed.

The received locked release process 360 begins 362 by receiving a lock release message for resource X 364. In one embodiment, the lock release message will include some or all of the following information: the device ID of the initiator associated with the request, a reference to the corresponding resource, and a counts data structure. In one embodiment, the counts indicate the number of each lock type that should be released. The counts array can be implemented using a variety of data structures such as, for example, an array in which each element represents a lock type and the value stored in each element corresponds to the number of locks to release.

After the lock release message has been received 364, the process 360 receives access to the entry data structure associated with resource X 366. Using the entry data structure, the process 360 identifies and retrieves the owner data structure associated with the lock release message 368. In one embodiment, the process 360 identified the owner data structure associated with the lock release request by first accessing the owners field of the appropriate entry data structure and traversing down the chain of owner data structures until an owner data structure with a device ID that matches the lock release message is identified.

Next, the receive lock release process 360 releases locks and decrements the counts according to the counts included in the lock release message 370. After the locks have been released 370, the holds set for the owner data structure is updated in response to the lock release message 372. For example, if the owner data structure had one shared lock and one exclusive lock on the resource and the exclusive lock was released, the holds set in the owner data structure would reflect that the initiator only holds a shared lock.

Then, decision block 374 determines whether the owner has any remaining locks on resource X. If the owner data structure has outstanding locks on resource X, then the wake coordinator waiters process 500 is called in block 378. However, if the owner does not have any remaining locks on resource X, the owner data structure is removed from the entry data structure and deleted 376 before the wake coordinator waiters process 500 is called 378. After the wake coordinator waiters 500 process finishes, the receive lock release process 360 ends 380.

In one embodiment, the wake coordinator waiters process 500 utilizes two data structures: a ww_owner data structure and a held array. In the illustrated embodiment, both data structures are created and used for each call to the wake coordinator waiters process 500.

Figure 8:
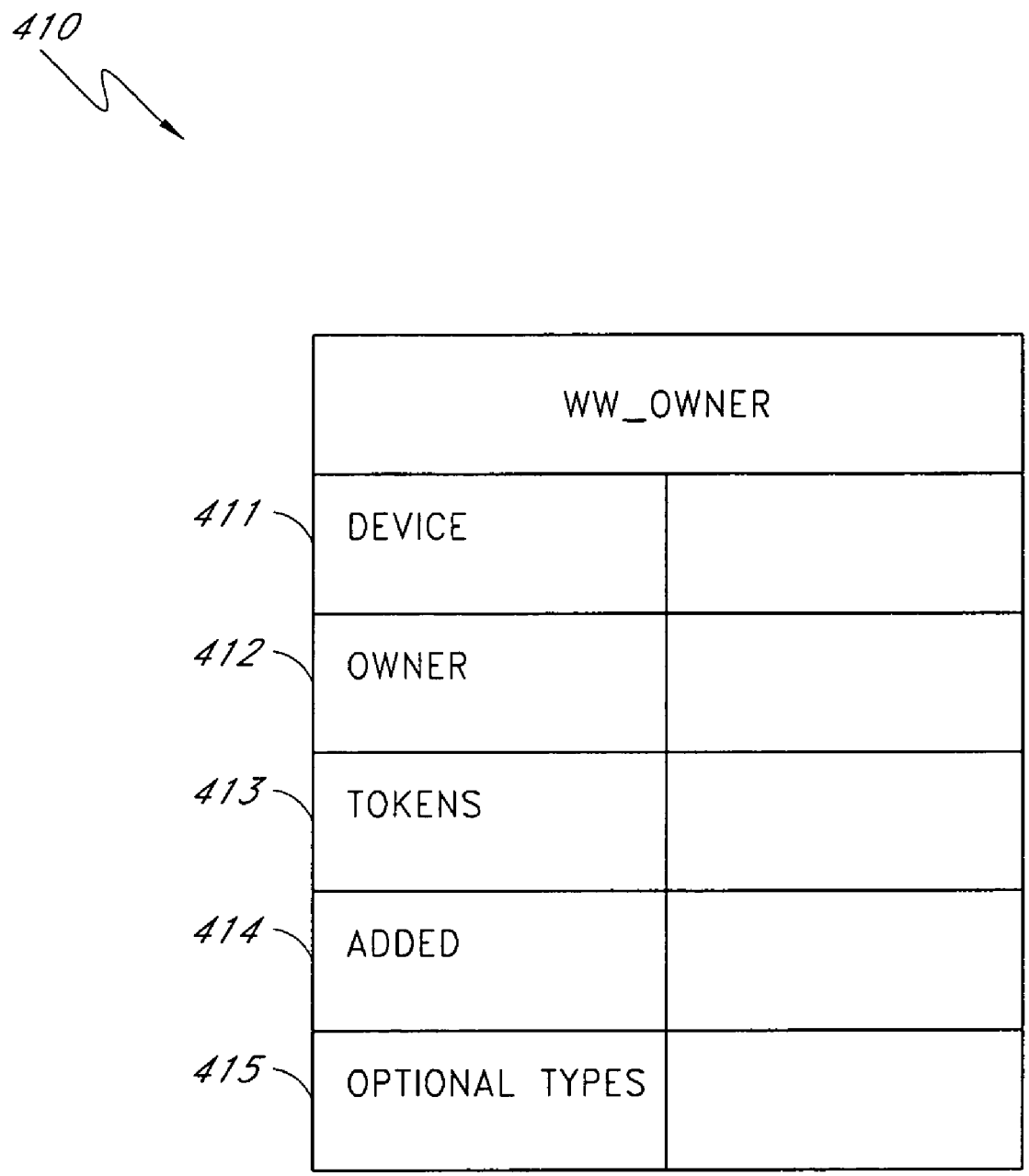
FIG. 8 illustrates one embodiment of a ww_owner data structure used by a coordinator.

FIG. 8 illustrates one embodiment of a ww_owner data structure used by a coordinator when it executes one embodiment of the wake coordinator waiters process. In the wake coordinator waiters process, a ww_owner data structure is created for each owner of the resource. Each ww_owner data structure stores a pointer to the corresponding owner data structure. Accordingly, the ww_owner data structure 410 is comprised of some or all of the following fields: a device field 411, an owner field 412, a token field 413, an added field 414, and an optional types field 415. The device field 411 stores a reference to the initiator that owns a lock on the particular resource. The owner field 412 stores a reference to the owner data structure that is associated with the ww_owner data structure 410. The token field 413 stores a set of all tokens associated with requests which have been completed on a given call to the wake coordinator waiters process 500. In one embodiment, if the token field 413 is not empty, the set is sent back in a lock response message to an initiator.

The added field 414 stores a set of all additional lock types that were granted to an initiator on a given call of wake coordinator waiters process 500. In one embodiment, the set includes a list of all lock types added and all corresponding subtypes of the added locks. The optional types field 415 stores a set of the optional lock types requested by the initiator. When a request is granted, the optional types for that request are copied to the ww_owner data structure 410. As described in more detail below, the coordinator considers optional lock types after the waiters in the queue have been considered.

FIG. 9 illustrates one embodiment of a held array data structure used by coordinator when executing one embodiment of a wake coordinator waiters process for a particular resource. The held array stores a representation of the number of owners of each lock type on the resource. In the illustrated embodiment, each element of the held array represents a lock type. The held array has N elements as indicated in row 427 which corresponds to the number of possible lock types, N, on the resource.

In one embodiment, for each element, the held array stores one of three possible values. The possible values are 0, −1, and a device ID number. A value of 0 is stored in the held array if no owners have a lock of that type; a value of −1 is stored if two or more owners have a lock of that type on the resource; and a device ID is stored if only one owner has that lock type on the resource. In the case where only one initiator has a lock of a particular type on the resource, the held array stores the device ID associated with that initiator.

Figure 10B:
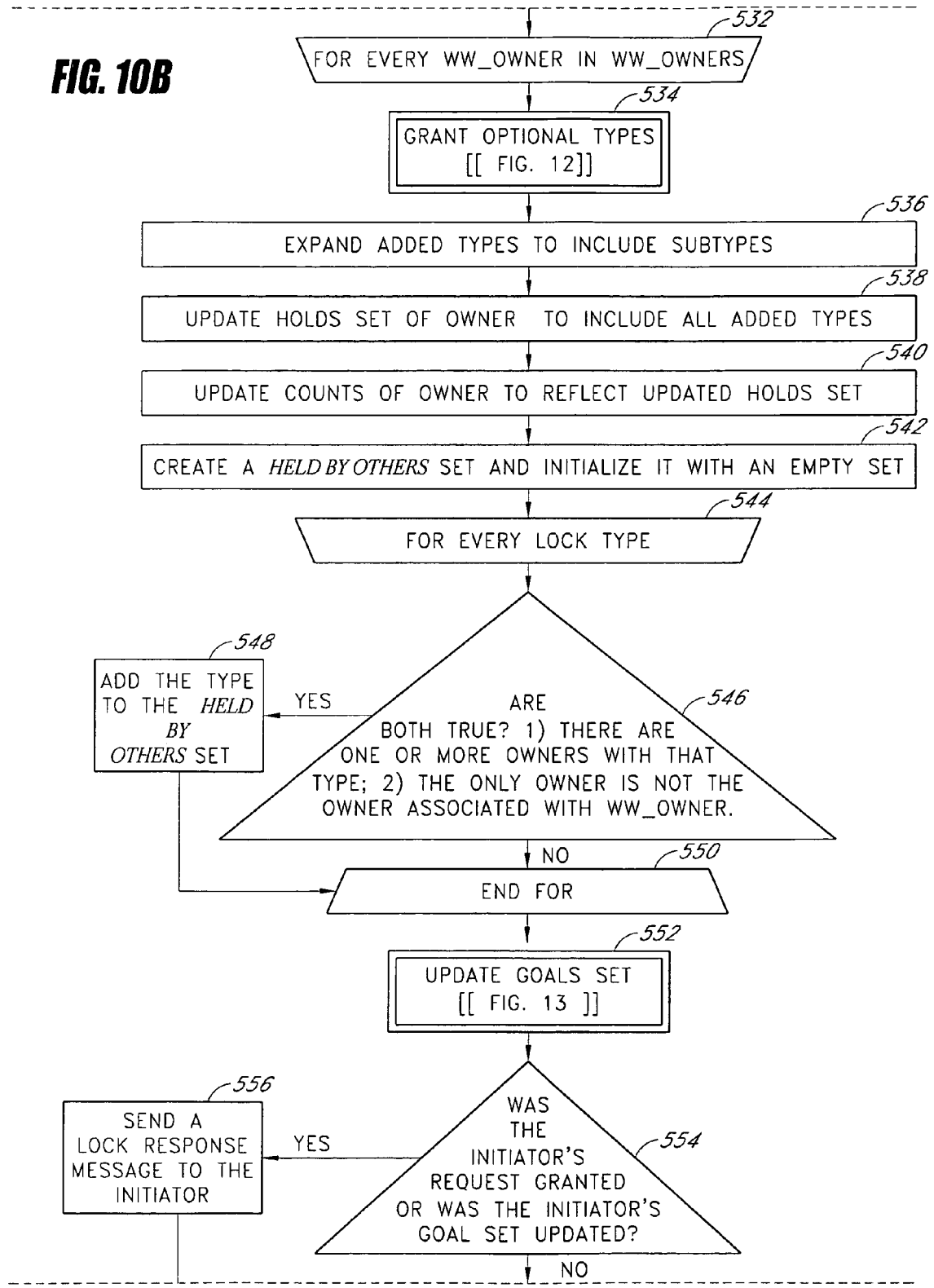
Figure 10C:
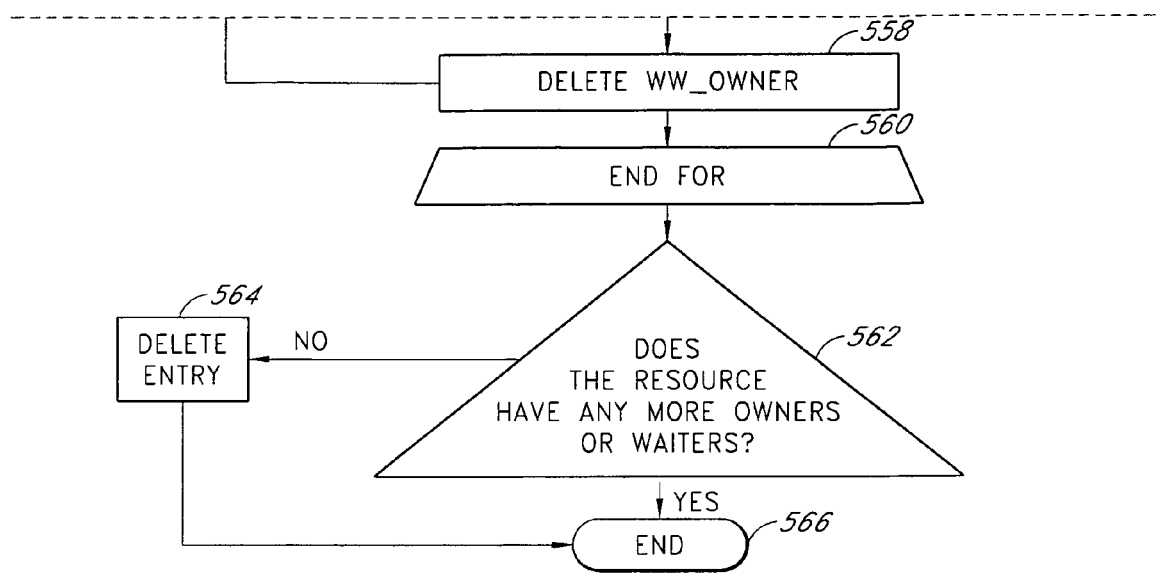

FIGS. 10, 10A and 10B illustrate one embodiment of a flowchart of operations for the wake coordinator waiters process. The wake coordinator waiters process 500 begins 502, by calling the "create held array" subprocess 504 discussed below with respect to FIG. 11.

After the held array has been created 504, the wake coordinator waiters process 500 considers each waiter for the resource in for loop 506. For every waiter, a deny waiter flag is cleared 508. Then, for loop 510 considers every lock type in the contends set for the waiter under consideration. In the illustrated embodiment, a contends set is the union of all possible lock types that are incompatible with each lock type in the type field.

For each type in the contends set, decision block 512 determines whether at least one of the following is true: (1) there is no owner with the particular lock type, or (2) the waiter is the only owner with that lock type. The operation in decision block 512 accesses the held array to determine whether internode contention for the resource exists. If there is no other owner with that lock type, then we know that internode contention is not a problem. Accordingly, if the waiter is the only owner with the particular lock type, then only intranode contention could be a problem. Thus, if internode contention is not a problem, the deny waiter flag remains cleared and the next type in the contends set is considered. If internode contention is not a problem for any of the types in the contends set, for loop 510 ends. If the for loop ends 518 without breaking, then the waiter does not contend with any of the waiters in the contends set and the waiter is woken 519 (for example, the waiter data structure is converted to an owner data structure and the lock request is granted).

However, if internode contention is a problem for any one of the types in the contends set, for loop 510 breaks 514 and the deny waiter flag is set 516.

After the waiter is woken 519 or the deny waiter flag is set 516, the held array is updated to reflect any woken waiters 520. Then, decision block 522 determines whether the deny waiter flag has been set. If the deny waiter flag has not been set, the process 500 retrieves the owner data structure for the associated initiator if one exists or creates an owner data structure and adds it to the entry 524. Next, the ww_owner data structure for the waiter is updated with the waiter token, the added lock types, and the waiter's optional types 524. For example, the token, the added lock types and the waiters optional types are retrieved from the waiter data structure and copied into the ww_owner data structure. Next, the waiter data structure is removed from the waiters queue and deleted 528 before the process 500 considers the next waiter. However, in decision block 522, if the denied waiter flag has been set, then the for loop directly considers the next waiter for that particular resource.

After every waiter for the resource has been considered, FIG. 10 shows that the process considers each ww_owner in the set ww_owners 532. For each ww_owner data structure, the grant optional types subprocess 640 is executed in box 534 as discussed below with respect to FIG. 12.

After the grant optional types subprocess 640 finishes, the added types field in the ww_owners data structure is expanded to include all subtypes of all lock types already in the added types set 536. Then, the hold set of the owner is updated to include all the added types 538. For example, the updated hold set can be computed by taking the union of the previous hold set and the added types set. In block 540, the counts of the owner data structure are updated to reflect the updated hold set. For example, the number of locks held by an owner as a result of the wake coordinator waiters process 500 is reflected in the counts field. Next, in block 542, a held by others set is created and initialized to have an empty set.

Then, for every possible lock type in the domain 544, decision block 546 determines whether both of the following statements are true: (1) there are one or more owners with that type; and (2) the only owner is not the owner associated with ww_owner. If both are true, another initiator holds a lock on the resource of that type. Accordingly, the lock type is added to the held by others set 548 before the next lock type is considered by for loop 544. However, if at least one of the statements in decision block 546 is not true, then the lock type is not added to the held by others set before the next lock type is considered.

After every lock type in the domain has been considered by for loop 544, the process 500 calls the update goals set subprocess 680 in box 552 as discussed below with respect to FIG. 13.

Next, decision block 554 determines whether the initiator's request was granted or whether the initiator's goal set was updated. If either event occurred, a lock response message is sent to the initiator 556. In one embodiment, a lock response message includes some or all of the following information: the domain in which the lock type was granted, the associated resource, the added set, the updated goals set, and tokens associated with any granted lock request. After the lock response message is sent 556, the ww_owner data structure is deleted 558. However, if neither the initiator's request was granted nor the initiators' goal set was updated, the ww_owner data structure is deleted 558 without sending a lock response message. After the ww_owner data structure is deleted 558, the next ww_owner in ww_owners is considered by for loop 532. After all of the ww_owner data structures have been considered, for loop 532 ends 560.

Next, decision block 562 determines whether the resource has any more owners or waiters. If the resource has any owners or waiters, then the process ends 566. However, if the resource does not have any more owners or waiters, the entry data structure associated with that resource is deleted 564. In other embodiments, the entry for the resource does not need to be deleted and just includes an empty set in its waiters and owners fields. After the entry for the particular resource has been deleted 564, the wake coordinators waiters' process 500 ends 566.

Figure 11:
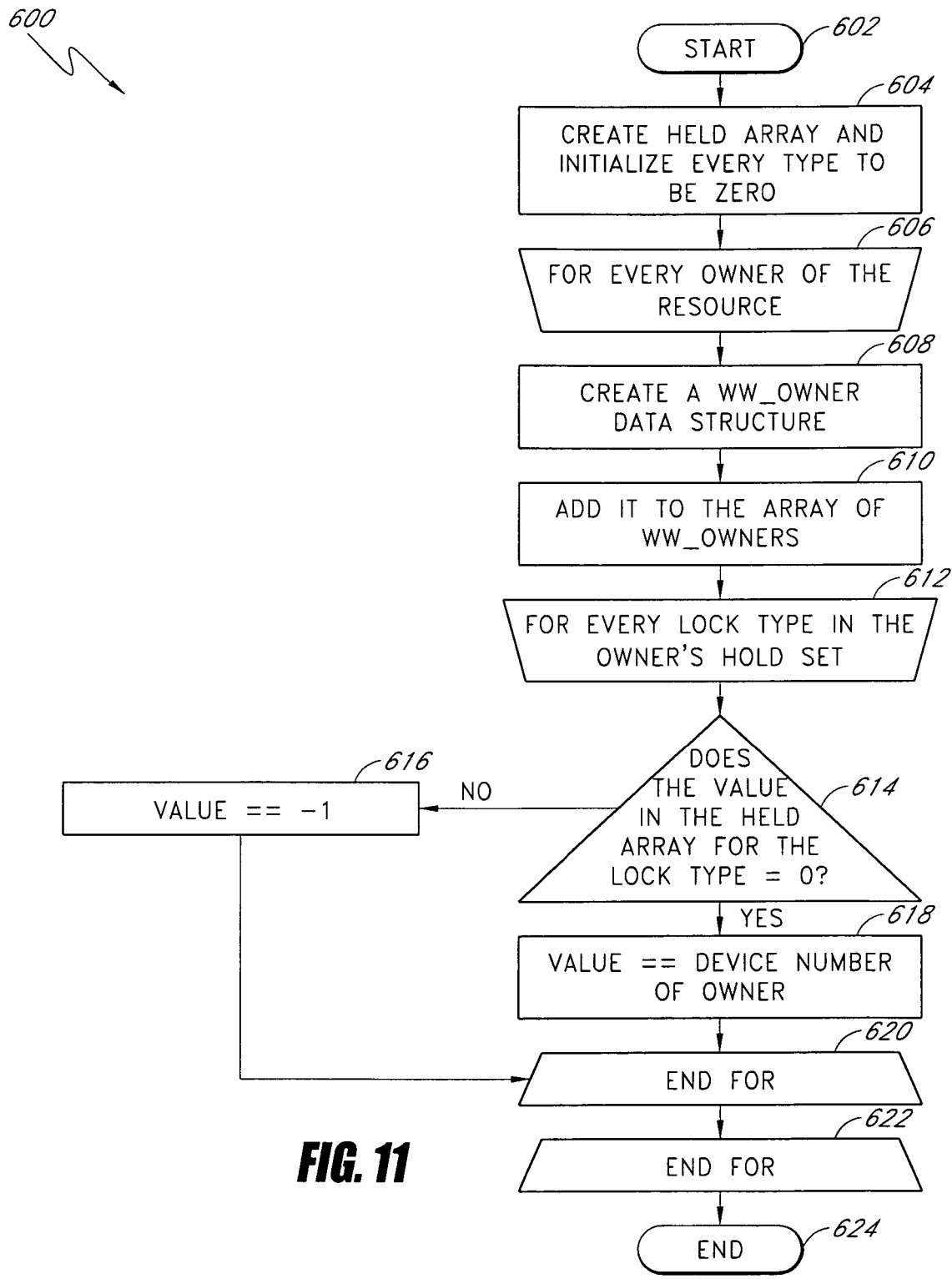
FIG. 11 illustrates one embodiment of a flowchart of operations for a create held array operation for a coordinator.

FIG. 11 illustrates one embodiment of a flowchart of operations for creating a held array for a coordinator. The create held array subprocess 600 creates a held array to be used on a given call to wake coordinator waiters and populates the held array using information from owner data structures associated with the resource.

The create held array process 600 begins 602 by creating an array data structure and initializing every element in the array to zero 604. One embodiment of a held array is illustrated in FIG. 9 and includes N elements, one for each possible lock type on the resource.

Next, for loop 606 considers each owner associated with the resource. For each owner, a ww_owner data structure is created and added to a queue, ww_owners. Then, for every lock type in that owner's hold set 612, decision block 614 determines whether the value in the held array for the lock type is zero. If the value in the held array for that lock type is zero, then no other initiator has a lock of that type on the resource. Consequently, that element in the held array stores the device number of the particular owner 618. However, if the element corresponding to the lock type is non-zero, then we know that there is at least one existing owner with the particular lock type 616. Consequently, that element in the held array stores −1 which indicates that there are two or more owners with a particular lock.

After every lock type in a particular owner's hold set has been considered, for loop 612 ends 620 and the next owner of the resource is considered. Then, after each owner has been considered, for loop 606 ends 622 and create held array subprocess 600 ends 624.

Figure 12:
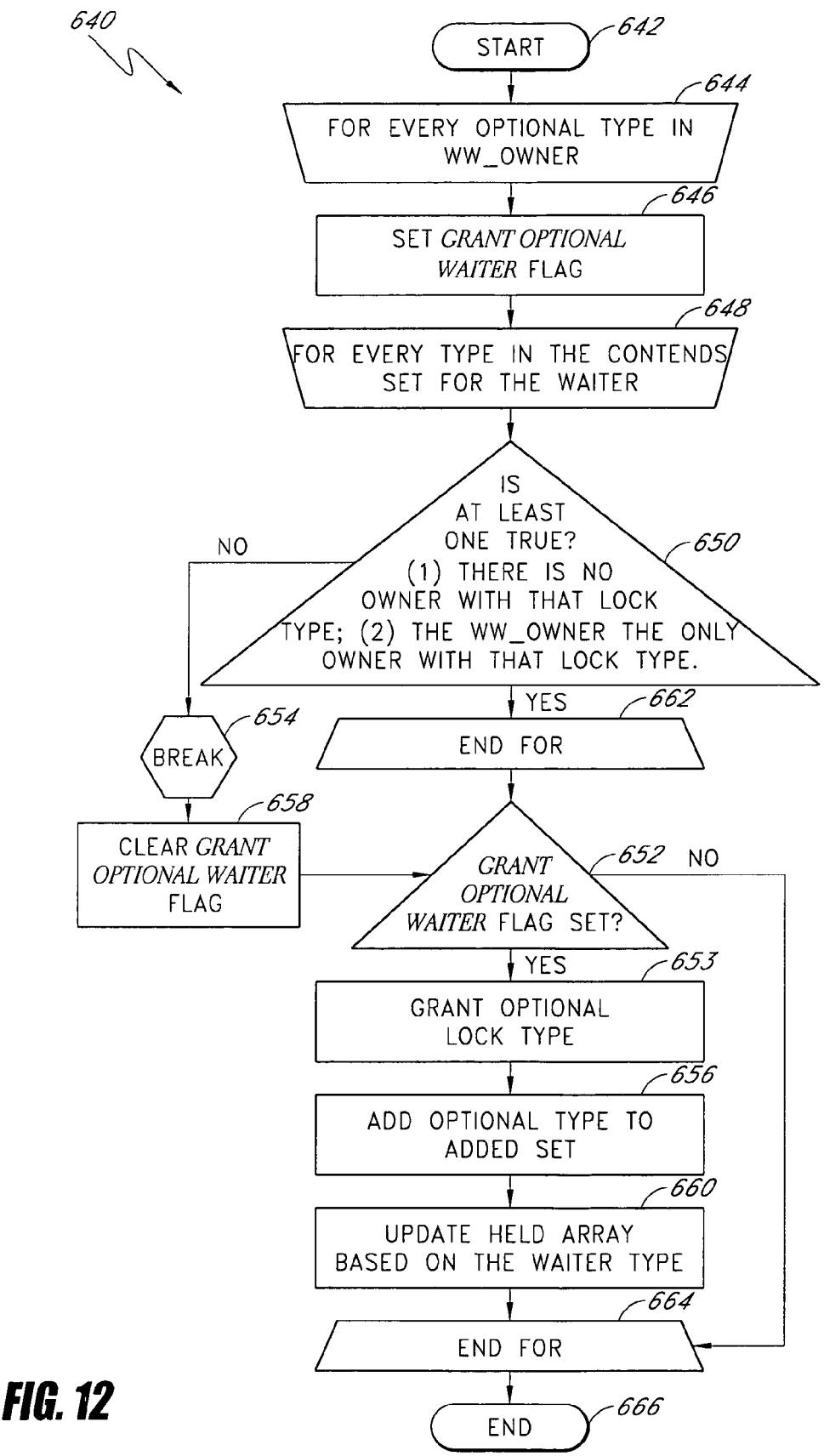
FIG. 12 illustrates one embodiment of a flowchart of operations for a grant optional types operation for a coordinator.

FIG. 12 illustrates one embodiment of a flowchart of operations for a grant optional types operation for a coordinator. The grant optional types subprocess 640 determines whether optional types requested by waiters on the waiters queue can be granted in light of existing resource owners.

The subprocess 640 begins 642 with for loop 644. For each optional type requested by ww_owner 644, a grant optional waiter flag is set 646. Then, for loop 648 considers every lock type in the contends set for the waiter under consideration by for loop 644. Decision block 650 determines whether at least one of the following statements is true: (1) there is no owner with the lock type under consideration; or (2) the ww_owner is the only owner with the considered lock type. The operation performed by decision block 650 determines whether the optional type creates internode contention (for example, if another initiator holds a lock of the same type). If internode contention does not exist, then the next type in the contends set of the optional type is considered. However, if internode contention does exist, then the coordinator cannot grant the optional type lock request. Accordingly, the for loop breaks 654 and the grant optional waiter flag is cleared 658.

After every type in the contends set has been considered or if for loop 648 breaks, decision block 652 determines whether the grant optional waiter flag is set. If it is set, then the optional lock type is granted 653 (for example, the associated waiter is permitted to obtain a lock of that type on the resource). The optional type is also added to the ww_owner data structure's added set 656 and the held array is updated to reflect the granted lock type 660. Then, for loop 648 considers the next ww_owner data structure. However, if, in decision block 652, the grant optional waiter flag is not set, then the process directly moves on to the next ww_owner data structure. After all of the ww_owner data structures have been considered, for loop 644 ends 664 and the grant optional types subprocess 640 also ends 666.

Figure 13:
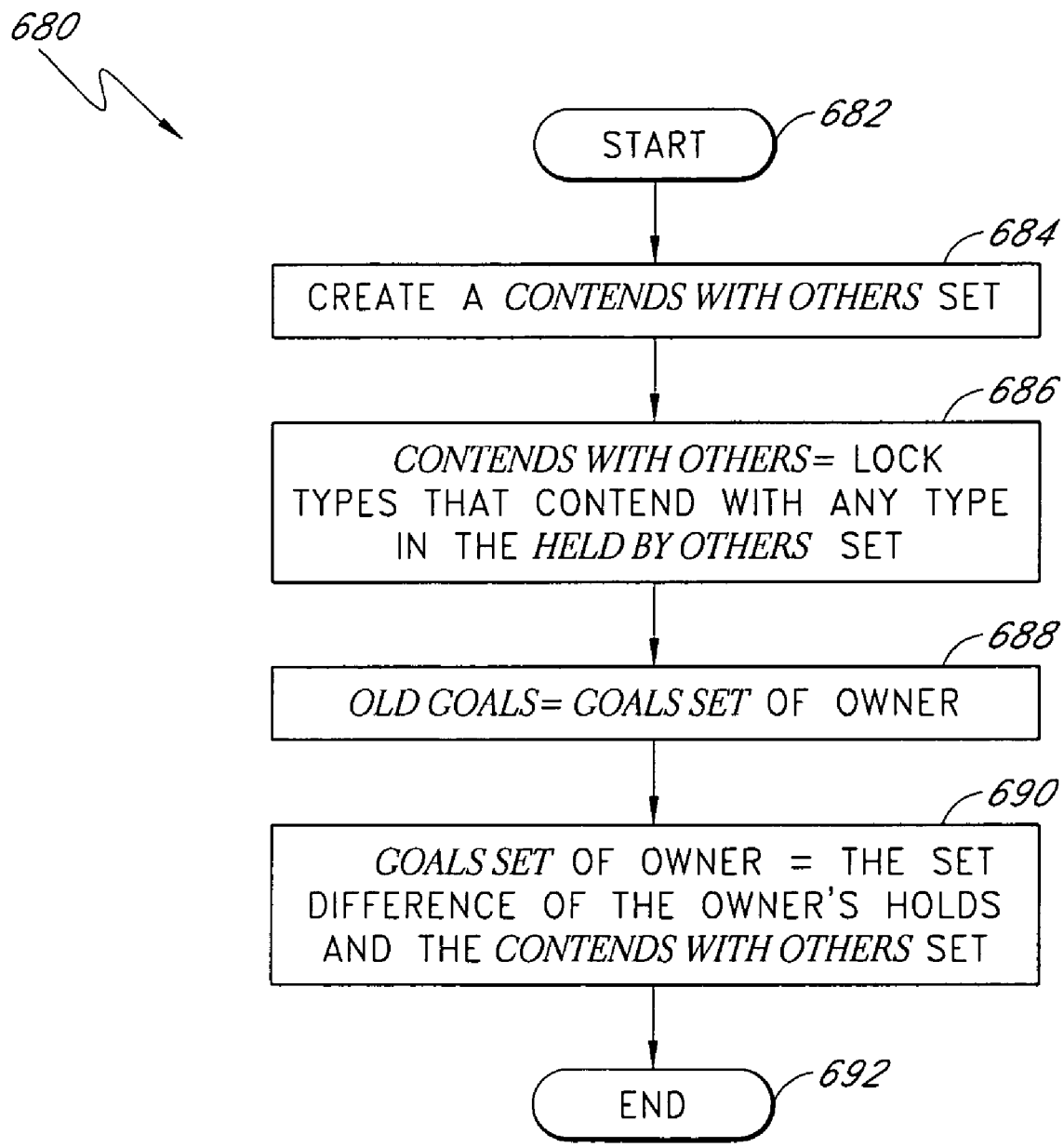
FIG. 13 illustrates one embodiment of a flowchart of operations for an update goals operation for a coordinator.

FIG. 13 illustrates one embodiment of a flowchart of operations for an update goals operation for a coordinator. The update goals set subprocess updates the lock types stored in the goals set of the associated owner data structure to reflect the lock types the initiator should have in order to accommodate other pending lock requests.

The subprocess 680 begins 682 by creating a contends with others set 684. In the illustrated embodiment, the contends with others data set is initialized to the union of the lock types that contend with each of the lock types in the held by others set 686. Next, the goals set of the associated owner 688 is assigned to the variable old goals 688. The updated goals set is then calculated by taking the set difference of the owner's holds set and the contends with others set 690. For example, the goals set is updated to remove any lock types that will contend with locks on the resource held by other initiators. After the goals set has been updated 690, the update goals subprocess ends 692.

While the figures illustrate one embodiment of flowcharts for a coordinator to manage semantic locks, it is recognized that other embodiments may be used. For example, one with ordinary skill in the art will recognize that operations may be implemented to prevent the overflow of the counts data structure associated with a particular resource. Additionally, more or fewer fields may be present in any one of the data structures discussed above.

C. Pseudocode

Additionally, one example of pseudocode that implements an embodiment of a coordinator is provided below. It serves to further illustrate one embodiment included herein and should not be used to limit the scope of the appended claims.

```
/* Coordinator:
 * The coordinator receives three messages: lock request,
 * lock_release, and lock_cancel. The coordinator sends just one message:
 * lock_response.
 * Upon receiving a message, the coordinator just updates it local data
 * structures and then calls wake_waiters. Here is some more detailed
 * pseudocode:
 *
 * An owner struct keeps the coordinator's view of an initiator for a
 * single resource. This status just consists of the initiator's lock
 * counts, along with its holds and goal sets. The holds set includes
 * all the locks which the owner currently holds. The goal set
 * includes only the subset of the holds set which the coordinator
 * would like the initiator to hold. When there is no contention,
 * holds will equal goal. However, when there is contention, the
 * coordinator will remove the locks that it would like the initiator
 * to drop from the goal set.
 *
 * Both the goal set and holds set are transitively closed under the
 * subtype function. That is, if a type is in the holds or goal set,
 * then all of its subsets must also be in the same set. Another way
 * of saying this is to say that an initiator can never have a lock
 * without having a lock on all of the subtypes.
 *
 * The counts array is actually a more detailed representation of the
 * holds set. This is one possible solution to the problem of
 * messages crossing on the wire. For every type in holds, count
 * is non-zero, and for every type not in holds, count is zero.
 * The code could be written without the explicit holds set, since the
 * set is implicit in the counts array. However, this embodiment
 * separates out the main logic of the code of the code from the
 * relatively special case of dealing with crossed messages.
 */
struct owner {
        int             device;
        set<int>        holds;
        set<int>        goal;
        byte            counts[TYPE_COUNT];
};
/*
 * An owner struct represents a pending request sent from an
 * initiator. Each request gets its own token, which is guaranteed to
 * be unique per initiator.
 *
 * In addition to requesting a specific lock type, the initiator can
 * also request a set of optional types.
 */
struct waiter {
        int             device;
        int             token;
        int             type;
        set<int>        optional_types;
};
/*
 * An entry is just a place for holding the owners and waiters for a
 * single resource.
 */
struct entry {
        resource        resource;
        list<owner>     owners;
        queue<waiter>   waiters;
};
/*
```

```
 * This is the set of all entries for the coordinator. In other
 * embodiments, this does not have to be global, but could be part of a
 * per-domain structure.
 */
map<resource, entry> entries;
receive_lock_request(int from, resource resource, int lock_type,
      set<int> optional_types, int waiter_token, queue_end)
{
        /*
         * When the coordinator receives a lock request, it just
         * creates a waiter and calls wake_waiters. However, there may
         * not be an entry for the resource, in which case an entry
         * needs to first be created. This is because the coordinator
         * doesn't keep around entries for resources for which there
         * are no waiters or owners.
         *
         * Note that the queue_end parameter is used to decide if the
         * waiter should go on the front or on the back of the queue.
         * waiters usually go on the back of the queue, but when the
         * initiator is trying to upgrade an existing lock, or when a
         * recursive lock is in progress, then it will request that
         * the waiters go on the front of the queue.
         */
        /* Get or create the entry.    */
        entry = entries.find(resource);
        if (!entry) {
                entry = new entry(resource);
                entries.add(resource, entry);
        }
        /* Put a new waiter on the queue.    */
        waiter = new waiter(from, type, optional_types, waiter token);
        if (queue_end == FRONT)
                entry->waiters.insert_front(waiter);
        else
                entry->waiters.insert_back(waiter);
        wake_waiters(entry);
}
receive_lock_cancel(int from, resource resource, int waiter_token)
{
        /*
         * When the coordinator receives a lock cancel message, it
         * just looks for the referenced waiter and tries to remove
         * it. If it actually removes the waiter, then wake_waiters
         * needs to be called, because the coordinator may be able to
         * wake up some other waiters.
         *
         * However, it is perfectly valid for the referenced waiter to
         * not exist. This is because the coordinator may have already
         * granted the request before the message arrived.
         */
        /* Get the entry.    */
        entry = entries.find(resource);
        assert(entry);
        /* Get the waiter.    */
        waiter = entry->waiters.find(from, token);
        if (!waiter)
                return;
        /* Remove and free the waiter.    */
        entries.remove(waiter);
        delete waiter;
        /* Have wake_waiters do the rest.    */
        wake_waiters(entry);
}
receive_lock_release(int from, resource resource, byte counts[TYPE_COUNT])
{
        /*
         * When the coordinator receives a lock release message, it
         * decrements the counts for the owner appropriately, updating
         * holds if it needs to, and then calls into wake_waiters if
         * anything changed.
         *
         * One might think that the coordinator does not need to call
         * wake_waiters unless the holds set is actually changed.
         * However, because of a subtlety regarding the special counts
         * code to deal with crossed messages, wake_waiters is always
         * called. To be more detailed, since the counts are only one
         * byte in size (they could be even smaller), wake_waiters
         * won't grant a lock if it will overflow a count. When a
         * count is getting close to overflowing, it's the
```

```
 * initiator's job to send a release to decrease the counts
 * enough so that wake_waiters can grant any locks that it
 * needs. In this very special case, wake_waiters should
 * be called, even though the holds set didn't change.
 */
/* Get the entry. This shouldn't fail.   */
entry = entries.find(resource);
assert(entry);
/* Get the owner. This shouldn't fail.   */
owner = entry->owners.find(from);
assert(entry);
/* Decrement all the appropriate counts.   */
for (type = 0; type < TYPE_COUNT; type++) {
        assert(owner->counts[type] >= counts[type]);
        owner->counts[type] -= counts[type];
        /* Keep the holds set up-to-date.   */
        if (!owner->counts[type])
                owner->holds.remove(type);
}
/* If the owner no longer holds any types, get rid of it.   */
if (owner->holds.is_empty( )) {
        entry->owners.remove(owner);
        delete owner;
}
/* Have wake_waiters do the rest.   */
wake_waiters(entry);
}
wake_waiters(entry *entry)
{
        /*
         * This function includes the main logic for the coordinator.
         * To reduce the amount of memory needed long-term,
         * wake_waiters has its own structure which represents an
         * owner. This structure keeps a pointer to the real owner
         * along with some additional data which is only relevant for
         * this call of wake_waiters.
         *
         * The tokens set includes all of the tokens for requests
         * which have been completed on this call to wake_waiters.
         * If non-empty this set will be sent back in a lock_response
         * message.
         *
         * The added set includes all of the additional lock types
         * granted to the initiator in this call to wake_waiters. This
         * set must be closed under the subtype operator.
         *
         * The optional_types set includes all of the optional types
         * requested by the initiator. When a request is granted, the
         * optional types for the request move to the ww_owner. Then,
         * at the end of wake_waiters, all optional types are granted
         * at the same time.
         *
         * Other embodiments do not include the device member, since the
         * owner structure has one. However, it doesn't hurt to
         * duplicate the member in this embodiment.
         */
        struct ww_owner {
                int             device;
                owner           *owner;
                set<int>        tokens;
                set<type>       added;
                set<type>       optional_types;
        };
        map<int, ww_owner> ww_owners;
        /*
         * The held array may be used where a
         * lock type is held by either zero, one, or more than one
         * initiator. If it is held by zero, held is set to 0, if it
         * is held by exactly one, held includes the device ID (which
         * is an integer) for the initiator which holds it; if it is
         * held by more than one, held includes -1.
         */
        /* Create held array. Initialize every type to be zero.   */
        int held[TYPE_COUNT];
        for (int type = 0; type < TYPE_COUNT; type++)
                held[type] = 0;
        /*
         * First we go through and create ww_owners for all real
         * owners so that if we grant another lock to an initiator
```

```
 * which already holds some locks, then we use the same
 * owner structure. There are other ways we could do this.
 * For example, we could check for an existing owner at
 * the time the owner was created.
 *
 * The other thing we do in this loop is setting up
 * the held array.
 */
foreach (owner in entry->owners) {
        ww_owner = new ww_owner(owner);
        ww.owners.add(ww_owner);
        foreach (type in owner->holds) {
                if (!held[type])
                        held[type] = owner->device;
                else
                        held[type] = -1;
        }
}
/*
 * Now go through all of the waiters and wake up as many as we
 * can.
 */
foreach (waiter in entry->waiters) {
        /*
         * Figure out if we should wake this waiter. We do so
         * by going through all the lock types which contend
         * with the requested type, and checking if they are
         * held by a different initiator. Notice, that if a
         * contending lock type is held only by the requesting
         * initiator, it doesn't stop the new type from being
         * granted.
         *
         * Here CONTENDS(int) returns a set of types which
         * contend with the given type.
         */
        bool wake = true;
        foreach (type in CONTENDS(waiter->type)) {
                if (held[type] && held[type] != waiter->device) {
                        wake = false;
                        break;
                }
        }
        /*
         * Update held for this type regardless of whether or not we're
         * waking up this waiter. This makes it so that, for example,
         * a new shared waiter will block behind an older exclusive
         * waiter even if all the current owners are shared.
         */
        if (!held[waiter->type])
                held[waiter->type] = waiter->device;
        else if (held[waiter->type] != waiter->device)
                held[waiter->type] = -1;
        /* Nothing else to do if we're not waking up the waiter.   */
        if (!wake)
                continue;
        /*
         * At this point, we're going to wake up the waiter.
         * We need to get the existing owner for the device,
         * or create a new one if one doesn't already exist.
         */
        ww_owner = ww_owners.find(waiter->device);
        if (ww_owner) {
                /*
                 * Check to make sure none of the counts are
                 * currently too big. We need to make sure we
                 * don't grant a lock which would cause counts
                 * to roll over from 255 to 0.
                 */
                bool too_big = false;
                for (type = 0; type < NUM_TYPES; type++) {
                        if (owner->counts[type] == 255) {
                                too_big = true;
                                break;
                        }
                }
                if (too_big)
                        continue;
        } else {
                /* Create a new owner if there wasn't one.   */
```

-continued

```
                    owner = new owner(waiter->device);
                    entry->owners.dd(owner);
                    ww_owner = new ww_owner(owner);
                    ww_owners.add(ww_owner);
            }
            /*
             * Update the ww_owner with the token for the waiter,
             * the added lock types, and the optional lock types.
             * We will look at this data later, after we have
             * finished waking up waiters.
             */
            ww_owner->tokens.add(waiter->token);
            ww_owner->added.add(waiter->type);
            ww_owner->optional_types = UNION(
                    ww_owner->optional_types, waiter->optional_types);
            /* Now we can remove the waiter.     */
            entry->waiters.remove(waiter);
            delete waiter;
    }
    /*
     * At this point, we have woken all of the waiters we can.
     * Now, we need to see if we can grant optional types; we need
     * to update the goal sets; and we need to send out the
     * response messages.
     */
    foreach (ww_owner in ww_owners) {
            owner *owner = ww_owner->owner;
            /*
             * See if we can grant any of the optional types. We
             * do this at this point to make sure that we don't
             * grant any optional types which may conflict with
             * other types being granted.
             */
            foreach (type in ww_owner->optional_types) {
                    bool grant = true;
                    foreach (type2 in CONTENDS(type)) {
                            if (held[type2] &&
                                            held[type2] != owner->device)
                            {
                                    grant = false;
                                    break;
                            }
                    }
                    if (grant) {
                            ww_owner->added.add(type);
                            if (!held[type])
                                    held[type] = owner->device;
                            else if (held[type] != owner->device)
                                    held[owner->type] = −1;
                    }
            }
            /*
             * Figure out which types are being granted,
             * and update the owner. Here, CLOSURE(set<int>)
             * returns the given set of types, but with all
             * subtypes included.
             */
            ww_owner->added = CLOSURE(ww_owner->added);
            owner->holds = UNION(owner->holds, ww_owner->added);
            foreach (type in ww_owner->added)
                    owner->counts[type]++;
            /*
             * Compute new goal and store it in the owner. We
             * remember the old_goal so that we can later decide
             * if we need to send a response. Here,
             * DIFFERENCE(set<int> A, set<int> B) returns the set
             * difference A\B.
             */
            set<int> held_by_others = { };
            for (type = 0; type < TYPE_COUNT; type++) {
                    if (held[type] && held[type] != owner->device)
                            held_by_others.add(type);
            }
            set<int> contends_with_others = CONTENDS(held_by_others);
            set<int> old_goal = owner->goal;
            owner->goal = DIFFERENCE(owner->holds, contends_with_others);
            /* owner->goal is its own closure, so no need to
             * compute the closure.     */
            /*
```

```
                 -continued

* Now we can send the response messages. We send a
          * response message to an initiator if either we
          * completed up one of its requests, or if we updated
          * its goal set.
          */
          if (!ww_owner->tokens.is_empty( ) || owner->goal != old_goal)) {
                  send_lock_response(owner->device,
                      entry->resource, ww_owner->added,
                      owner->goal, ww_owner->tokens);
          }
          /*
           * Now we can get rid of the ww_owner.
           */
          ww_owners.remove(ww_owner);
          delete ww_owner;
      }
      /* If there are no more waiters or owners, remove the entry.     */
      if (entry->owners.is_empty( ) && entry->waiters.is_empty( )) {
              entries.remove(entry);
              delete entry;
      }
  }
}
```

IV. Initiator

As stated above, threads on the system are associated with a particular initiator. The initiator determines whether lock requests from threads associated with the initiator can be passed onto the coordinator that is managing access to a resource. The initiator makes the determination of whether the lock request can be passed onto the coordinator based on the current owners and waiters. Importantly, owners and waiters on the initiator side are different from owners and waiters on the coordinator side in that they are implemented by different data structures and represent different concepts. As used herein, an owner on the initiator side is a thread that holds a lock on the resource. Sometimes, threads that hold locks will be referred to herein as lockers. Additionally, the term waiter on the initiator side refers to a thread's pending lock request for a resource.

A. Data Structures

A. Data Structures

Figure 14:
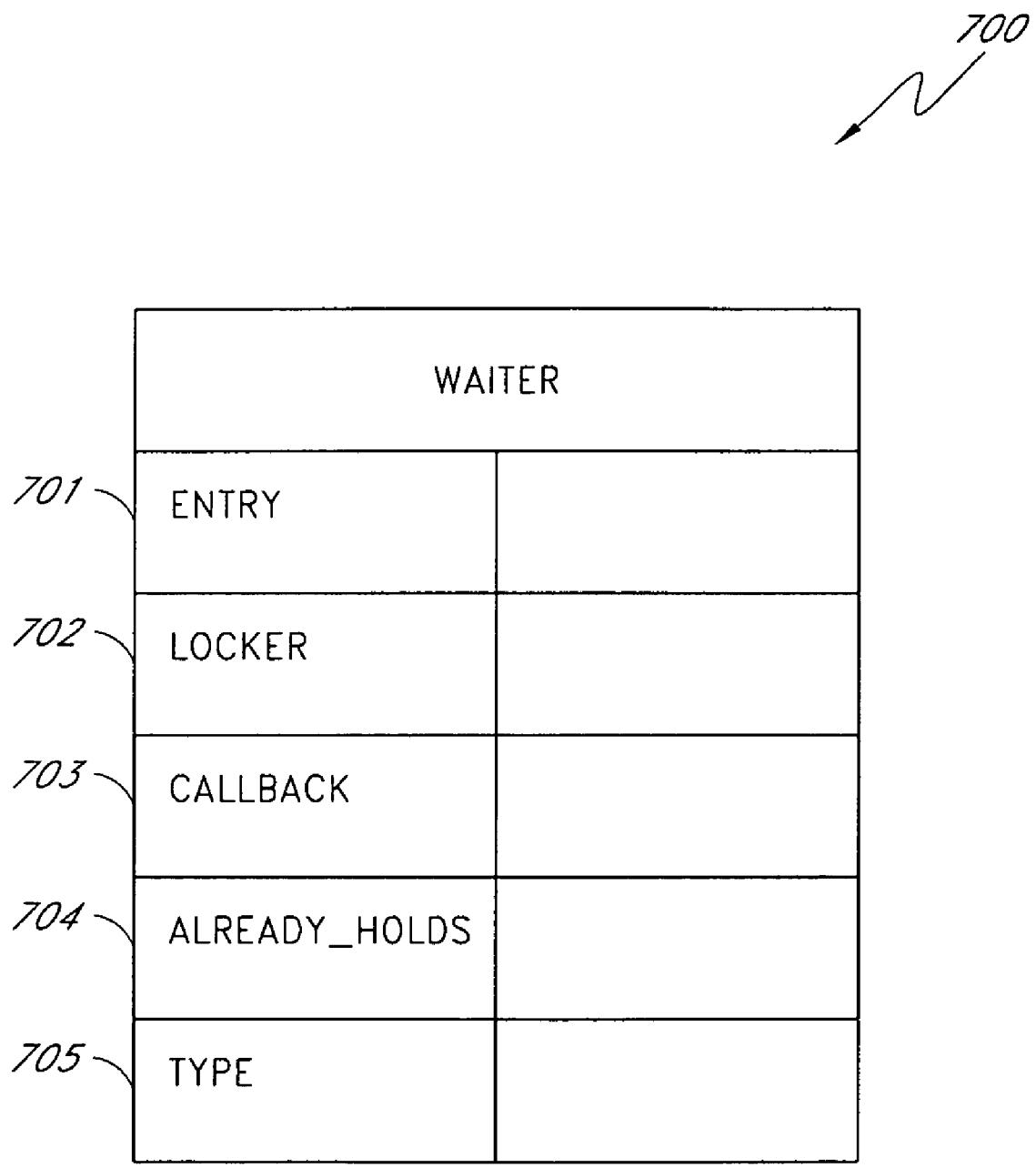
FIG. 14 illustrates one embodiment of a waiter data structure used by an initiator.

FIG. 14 illustrates one embodiment of a waiter data structure used by an initiator. As indicated above, the waiter data structure keeps track of one thread's lock request for a resource. The waiter data structure is comprised of some or all of the following fields: an entry field 701, a locker field 702, a callback field 703, an already_holds field 704, and a type field 705. The entry field 701 stores a reference to the entry associated with the resource. The entry field 701 may also be used by the cancel lock process which is described in more detail below. The locker field 702 represents the locking entity such as for example, a process, application, or function. For ease of reference, the locking entity is referred to herein as a thread. The already_holds field 704 stores a reference to a lock that is being converted (as opposed to a lock that is being locked for the first time). In one embodiment, a converted request occurs when a locker owns a lock of a certain type and wants to atomically convert that lock to another type. If the locker is not doing a conversion, the already_holds set includes a null set. The type field 705 stores a representation of the type of lock that the waiter would like to have on the resource. The callback field 703 is a function which is called when the lock is granted. In one embodiment, the call back function wakes up the thread requesting the lock. In another embodiment, the call back function performs operations that need to be executed after the lock has been acquired. In yet another embodiment, the call back function sends an event that is handled by another thread on the system. In some embodiments, the operation of the callback function may be represented by the following pseudocode:

```
struct context {
        mutext m;
        condition_variable cv;
        int done;
};
void
callback(struct context *c)
{
        c->m.acquire( )
        c->done = true;
        c->m.release( )
        c->cv.wakeup( )
}
void
get_lock(int type)
{
        struct context context;
        context.done = false;
        start_lock(type, callback, cv);
        context.m.acquire( );
        while ( !context.done)
                context.cv.wait(&context.m);
        context.m.release( )
}
```

Figure 15:
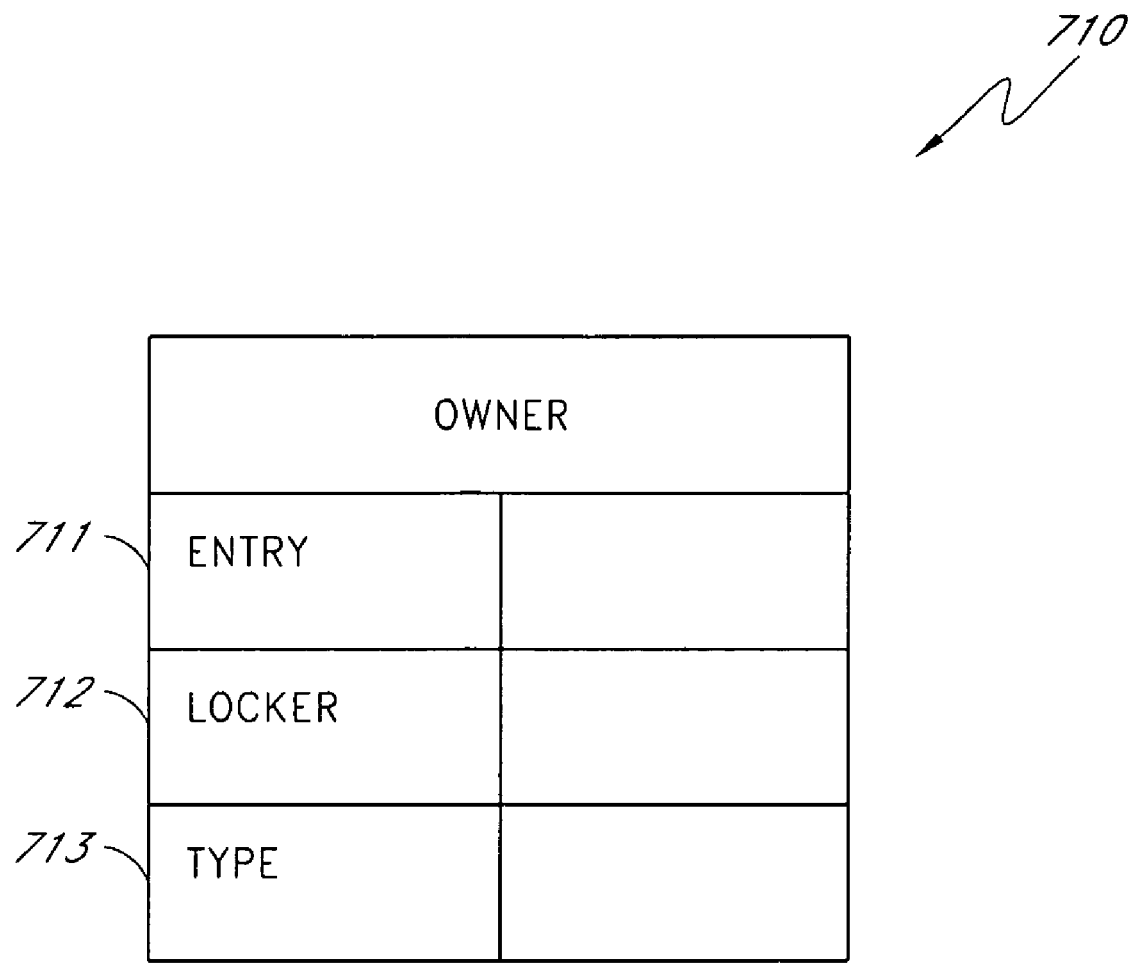
FIG. 15 illustrates one embodiment of an owner data structure used by an initiator.

FIG. 15 illustrates one embodiment of an owner data structure used by an initiator. An owner data structure on the initiator side keeps track of a lock held by a locker (for example, a thread). The owner data structure 710 is comprised of some or all of the following fields: an entry field 711, a locker field 712, and a type field 713. The entry field 711 stores a reference to the entry associated with the resource. In the illustrated embodiment, the entry is used so that the unlock process (described below) can easily locate the entry. The locker field 712 stores a reference to the thread that holds the lock, and the type field 713 stores the type of lock held by the owner.

Figure 16:
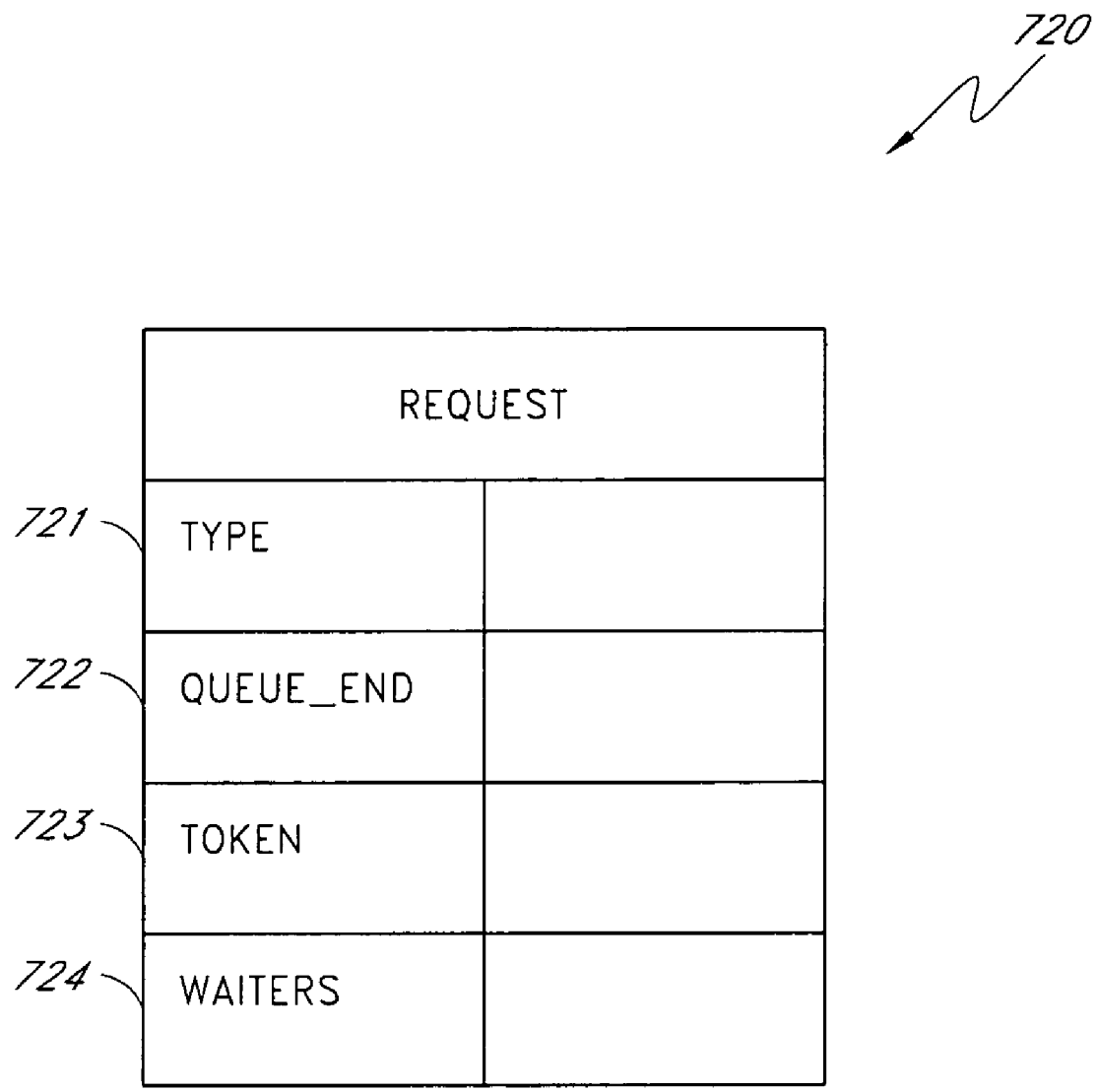
FIG. 16 illustrates one embodiment of a request data structure used by an initiator.

FIG. 16 illustrates one embodiment of a request data structure used by an initiator. A request data structure 720 represents an outstanding lock request and keeps track of a pending lock request in a manner similar to that of a coordinator waiter data structure. Associated with the request is a list of waiters which are added to the main waiter queue when the request is granted.

The request data structure 720 is comprised of some or all of the following fields: a type field 721, a QUEUE_END field 722, a token field 723, and a waiters field 724. The type field 721 stores the type of lock being requested. The QUEUE_END field 722 includes a representation of whether the request is for a lock type that should be placed at the front or at the back of the queue. In one embodiment, converted lock requests are placed at the front of the queue. In another embodiment, recursive lock requests are placed at the front of the queue. Additionally, in the illustrated embodiment, an initiator does not have more than one outstanding request for any (type, QUEUE_END) pair.

The token field 723 stores a value that is unique to the request. In some embodiments, as will be described in more detail below, the token field is used by the receive lock response operation described below. The waiters field 724 indicates a list of waiters which will be added to the main waiter queue when the request associated with the request data structure 720 is granted.

Figure 17:
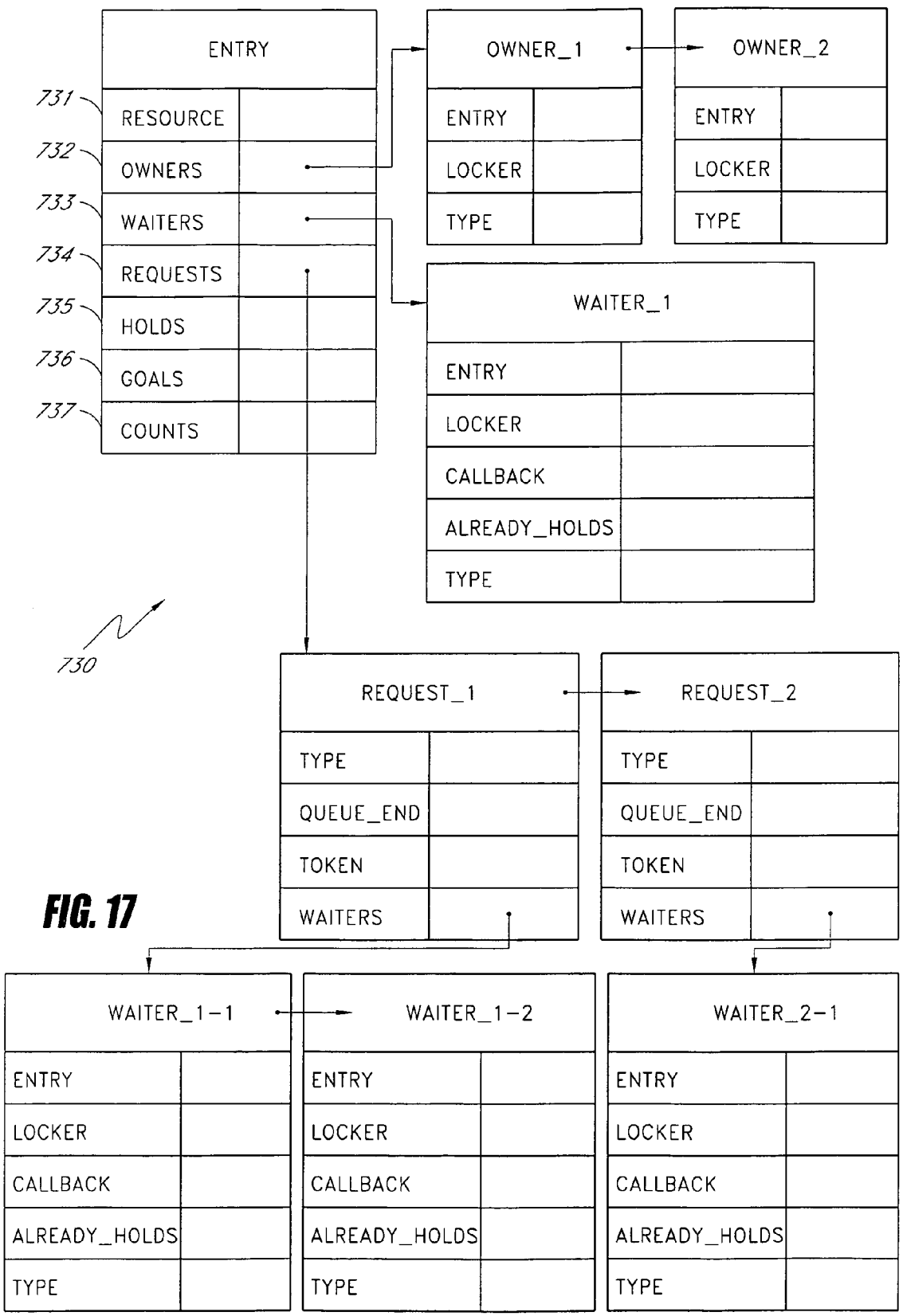
FIG. 17 illustrates one embodiment of an entry data structure used by an initiator.

FIG. 17 illustrates one embodiment of an entry data structure used by an initiator. The entry data structure 730 keeps track of all the initiator's information for a single resource and is similar in function to a coordinator owner data structure 210.

The entry data structure 630 includes some or all of the following fields: a resource field 731, an owners field 732, a waiters field 733, a requests field 734, a holds field 735, a goals field 736, and a counts field 737. The resource field 731 stores a reference to the resource associated with the entry data structure 730. The owners field 732 stores a set of owners that currently have a lock on the resource. The waiter field 733 stores a set of lockers that are waiting for a lock on the resource. The requests field 734 stores a set of outstanding requests for the resource.

The holds field 735 stores a set of lock types held on the resource. The goals field 736 stores a set of lock types the initiator should have on the resource (for example, in order to accommodate other pending lock requests). The counts field 737 stores a representation of a number of each type of lock held on the resource. The holds field 735, goals field 736, and counts field 737 are similar to the similarly named fields in the coordinator owner data structure.

B. Messages and Operations

As described above, the initiator sends three types of messages to a coordinator and receives one type of message from the coordinator. Additionally, an initiator performs three types of processes which are initiated by a request from a thread: a start or convert lock process, a cancel lock process, and an unlock process.

FIG. 18 illustrates one embodiment of a flowchart of operations for a start or convert lock operation for an initiator. The start or convert lock process 750 is called when a locker wants to get a new lock on a resource. When a thread calls the start or convert lock process 750, some or all of the following information is passed to the initiator: a reference to the requesting thread, the associated resource, the type of lock being requested, the associated callback function, and a reference to an already_holds value. In the case where the locker already holds a lock on the resource, it may want to convert the old lock to a new lock (for example, to upgrade or downgrade the lock). Accordingly, the original owner is passed as the already_holds value when a lock conversion is requested.

When the process is called, a new waiter data structure is created which is then placed on either a main waiters queue or on a request's waiters queue. Waiters in the main waiters queue are referenced by the entry for the resource. Waiters on a request's waiters queue are added to the main queue when the request is granted.

The start or convert lock process 750 begins 751 at decision block 752. Decision block 752 determines whether an entry exists for the associated resource. If an entry exists for the resource, the entry is retrieved 754. However, if an entry does not exist for the resource, an entry is created 753 before it is retrieved 754. Then, a new waiter associated with the thread's lock request is created 755.

Decision block 756 determines whether the thread already has a lock on the resource. If the thread already holds a lock on the resource 756, the QUEUE_END variable is set to FRONT 758, otherwise the QUEUE_END variable is set to BACK In one embodiment, the QUEUE_END variable is a flag that represents FRONT when the flag is set and BACK when the flag is cleared.

Next, decision block 759 determines whether at least one of the following statements is true: (1) the requested lock type is already included in the entry's goal; or (2) the thread already holds a lock on the resource and the lock type is included in the entry's holds set. If the former is true, we know that the waiter is compatible with other existing waiters. Thus, the waiter can be added to the main queue. Additionally, if the latter statement is true, then we know the chance of deadlock is lower. For example, if a lock is being acquired recursively and the lock is a subtype of a lock already held, putting the waiter at the head of the queue guarantees that it will be woken sooner than if it was at the end. If the waiter was not put at the head of the queue, then it may be blocked by another waiter causing immediate deadlock. Alternatively, even if the recursive lock is not a subtype of the lock already held, deadlock may be averted when a different thread requests an incompatible lock before the recursive lock if the recursive lock is placed at the head of the queue.

Accordingly, if at least one statement in decision block 759 is true, the waiter is added to the front of the main queue if QUEUE_END equals FRONT 760, 762 or the back of the main queue if QUEUE_END does not equal FRONT 760, 761. Then, after the waiter has been added to the main queue, the start or convert lock request process 750 calls the wake initiator waiters process 860 in block 763. After the wake initiator waiters process finishes executing, the waiter data structure is returned 771 and the process 750 ends 772.

However, if neither of the statements in decision block 759 are true, then, decision block 764 determines whether the thread already has a pending request for the lock type. If it does, then the waiter is added to the front of the associated request's queue if QUEUE_END equals FRONT or to the back of the associated request's queue if QUEUE_END does not equal front. However, if in decision block 764 the thread does not already have a request for the lock type, the request is created 765, the request is added to the entry 766, and the initiator sends the coordinator a lock request message (described above with regard to the coordinator) 767. Then, the waiter is added to the request's queue 768, 769, 770. After the waiter data structure has been added to the request's queue, the waiter is returned 771 and the start or convert lock process 750 ends 772.

Figure 19:
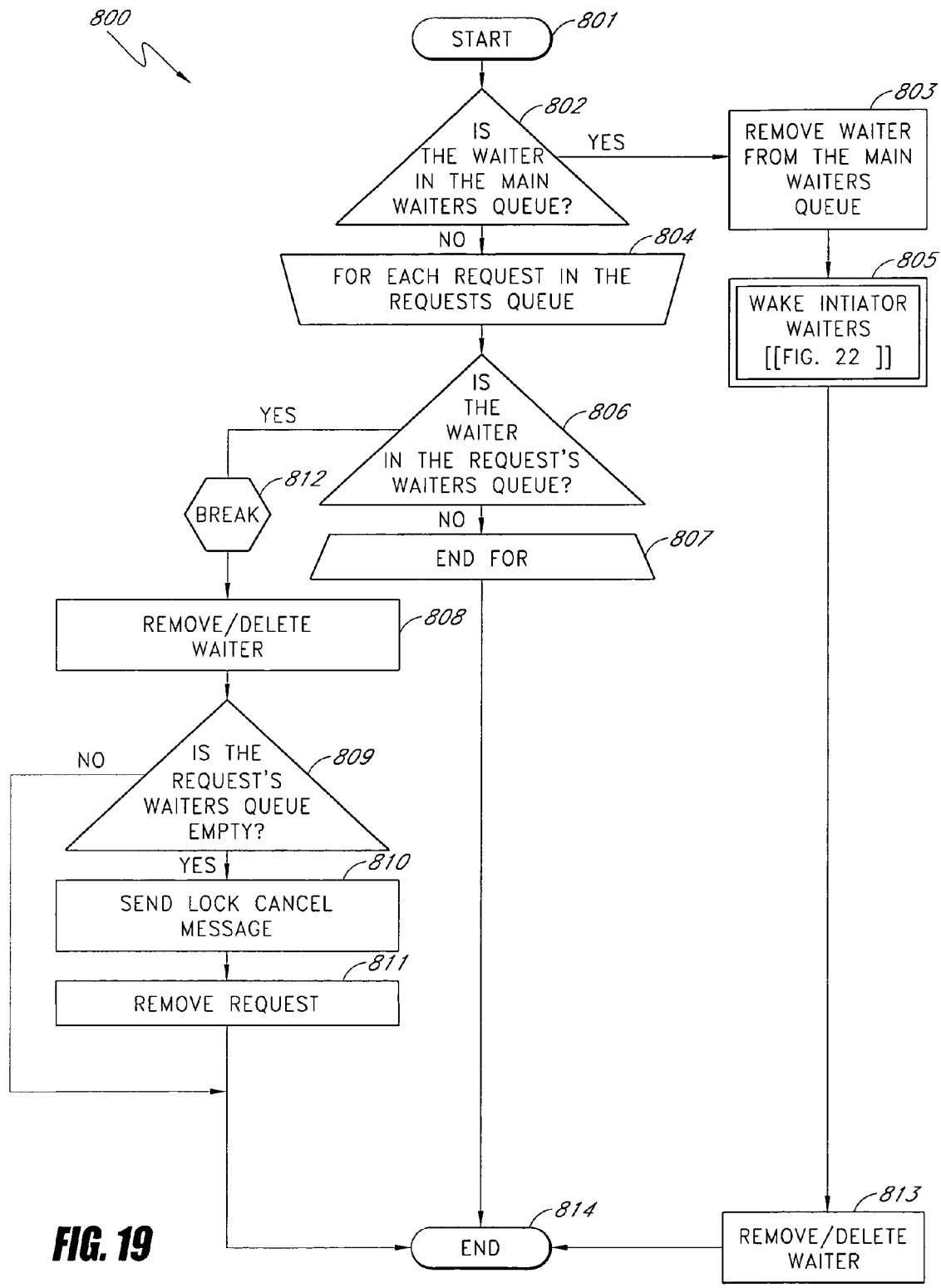
FIG. 19 illustrates one embodiment of a flowchart of operations for a cancel lock process for an initiator.

FIG. 19 illustrates one embodiment of a flowchart of operation for a canceled lock operation for an initiator. A lock cancel request occurs when a waiter gets tired of waiting for a lock to be granted. As a result, the lock cancel processes removes a waiter from the queue. If the waiter is on the main waiters queue, then the wake initiator waiters process 860 is called. The wake initiator waiter's process 860 is called to wake any waiters that may have been blocked by the cancelled waiter. However, if the waiter is on a request's waiters queue and it was the only waiter on that queue, then the request is just canceled.

The canceled lock message includes one input: a reference to the relevant waiter that is being removed from either the main queue or the request queue. The canceled lock process 800 begins 801 in decision block 802 which determines if the waiter is in the main waiters queue. If the waiter is in the main waiters queue 802, then the waiter is removed from the main waiters queue 803 before the wake initiator waiters process 860 is called 804. After the wake initiator waiters process 860 finishes, the waiter data structure is removed from the main waiters queue and deleted 813 before the process 800 ends 814.

However, if the waiter is not in the main waiters queue, the waiter must be on a request's waiters queue. Thus, for loop 804 considers each request in the requests set. For each request 804, decision block 806 determines whether the waiter to be cancelled is in the request's waiters queue. If the waiter is not in the request's waiters queue, the next request in the requests set is considered. If after all the requests in the requests set have been considered, the waiter is not in any of the requests' waiters queues, the for loop ends 807 and the process 800 ends 814.

If, however, during any one of the iterations of the for loop 804, the waiter is in a request's waiters queue, the for loop breaks 812. Then, the waiter is removed from that request's waiters queue and deleted 808.

Decision block 809 determines whether the request's waiters queue is empty. If the request's waiters queue is empty, then a lock cancel message is sent to the coordinator 810 and the request is removed from the requests set 811 before the process 800 ends 814. However, if the request's waiters queue is not empty 809, the process 800 ends 814.

Figure 20:
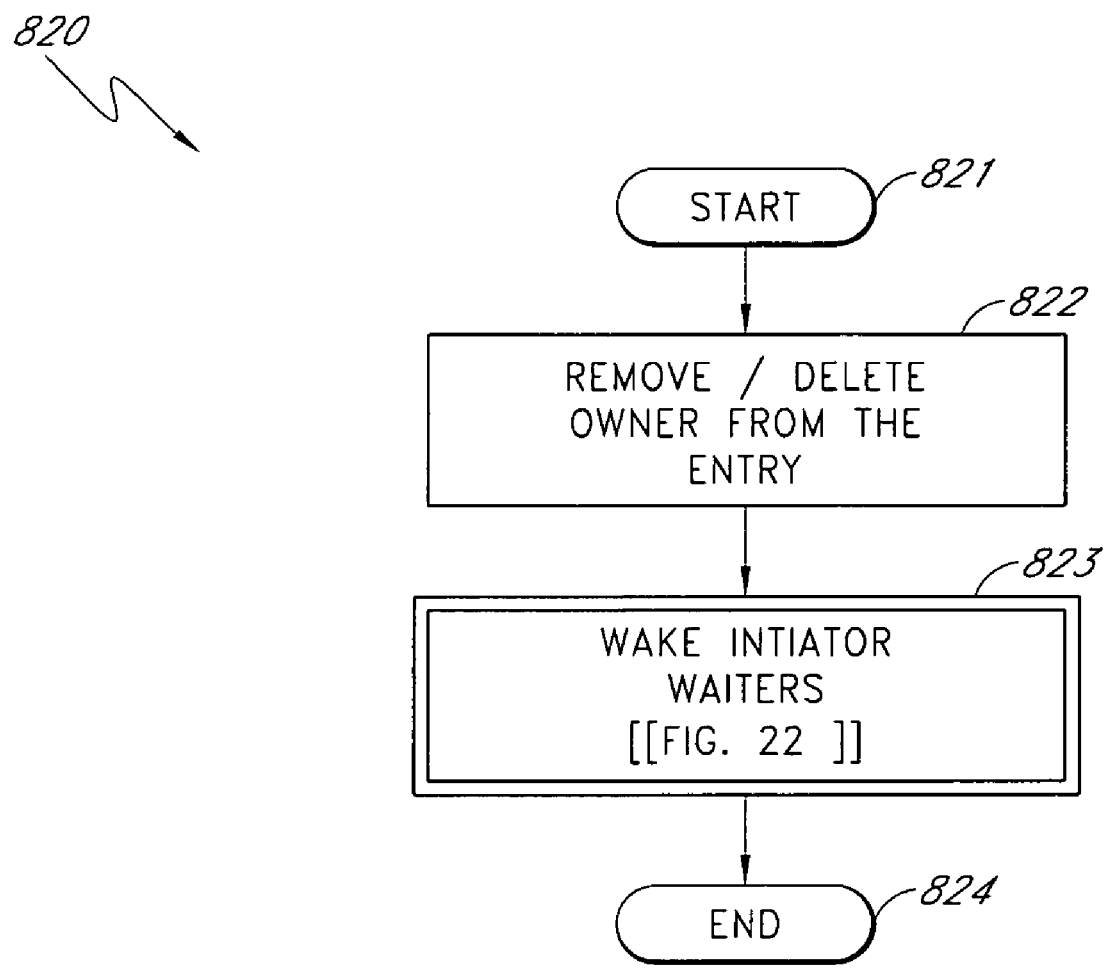
FIG. 20 illustrates one embodiment of a flowchart of operations for an unlock process for an initiator.

FIG. 20 illustrates one embodiment of a flowchart of operation for an unlock operation for an initiator. The unlock process 820 is executed by an initiator in response to a thread's request to release a lock (for example, when a thread completes a process involving the locked resource). The unlock process 820 begins 821 by removing and deleting the owner data structure from the entry for the resource 822. Then, the wake initiator waiters process 860 is called 823 before the process 820 ends 824. In the illustrated embodiment, the wake initiator waiters process 860 is called to wake any waiters that may have been previously blocked by the now removed owner.

Figure 21:
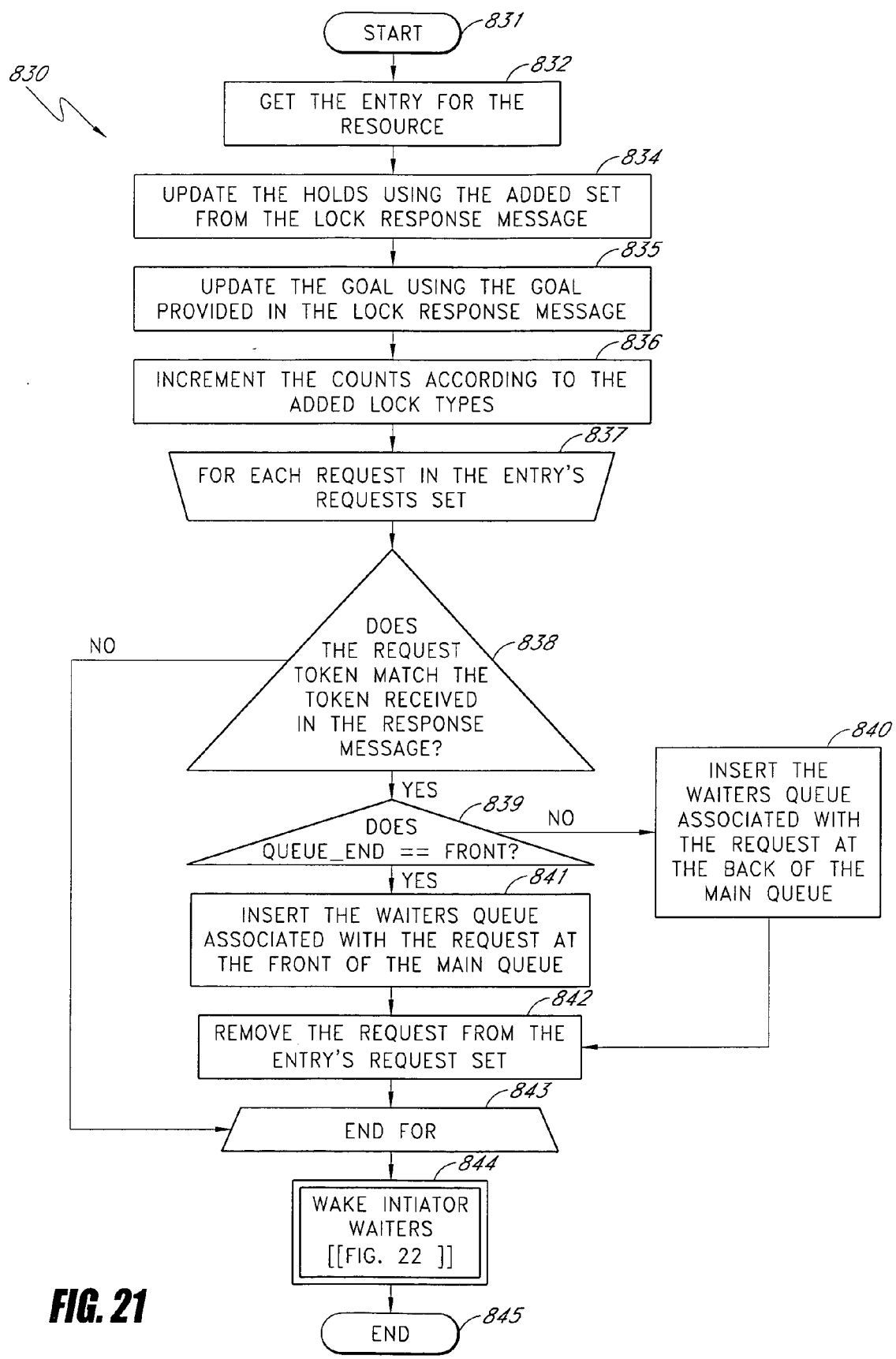
FIG. 21 illustrates one embodiment of a flowchart of operations for a receive lock response process for an initiator.

FIG. 21 illustrates one embodiment of a flowchart of operations for a receive lock response operation for an initiator. The initiator executes the receive lock response process 830 in response to a lock response message sent by the coordinator. A lock response message is sent by the coordinator when the goals or holds set of an owner changes or when requests are granted.

The receive lock response process 830 receives some or all of the following information: a reference to the resource being considered, an added set for newly added lock types, a goals set, and a set of tokens associated with waiters that have been woken by the wake initiator waiter process 860.

The process 830 begins 831 by getting the entry for the resource 832. The holds set for the resource is updated using the added set from the lock response message 834. For example, the updated holds set is equal to the union of the old holds set and the added set. Next, the goals set is updated using the goals set provided in the lock response message 835. For example, the new goals set is replaced by the goals set provided by the lock response message. Then, the counts are incremented to reflect the number of newly added lock type(s) 836.

Next, for loop 837 considers each request in the entry's requests set. For each request 837, decision block 838 determines whether the token in the request data structure matches the token received in the lock response message. If in decision block 838, the token stored in the request data structure under consideration does not match the token received in the lock response message, the next request is considered.

However, if it does match, decision block 839 considers whether QUEUE_END equals FRONT. If QUEUE_END equals FRONT, then the waiters queue associated with the request is inserted at the front of the main queue 841. Then, the request is removed from the entry's request set. However, if, in decision block 839, QUEUE_END does not equal FRONT, then the waiters queue associated with the request is inserted at the back of the main queue 840. Then, the request is removed from the entry's request set. After each request in the request set has been considered, the for loop ends 843.

After the for loop 837 ends 843, the wake initiator waiters process 860 is called in box 844. After the wake initiator waiters process 860 finishes, the receive lock response process 830 also ends 845.

Figure 22:
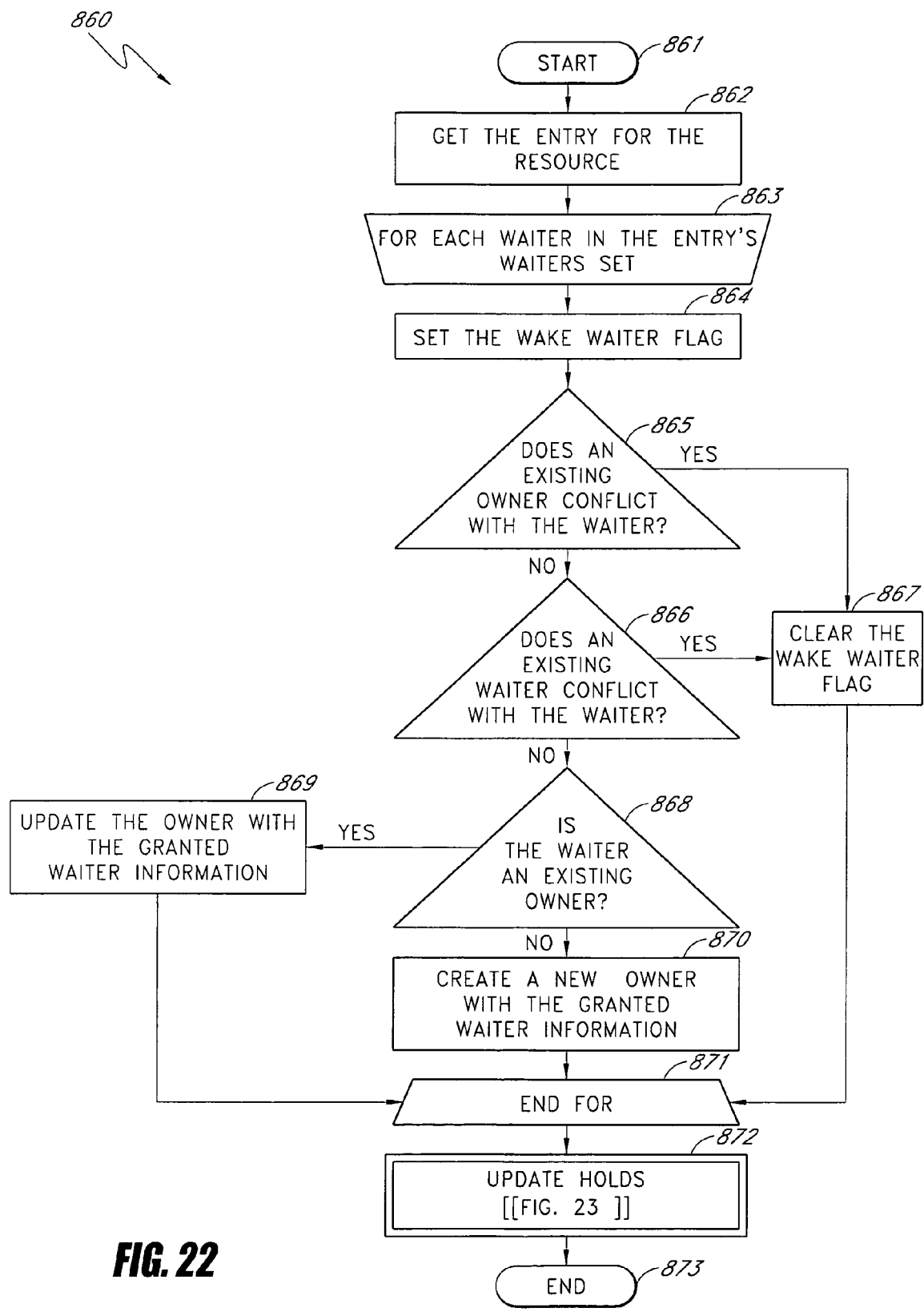
FIG. 22 illustrates one embodiment of a flowchart of operations for a wake initiator waiters process for an initiator.

FIG. 22 illustrates one embodiment of a flowchart of operations for a wake initiator waiters process for an initiator. In the illustrated embodiment, the wake initiator waiters process 860 performs four functions: (1) waiters are woken if possible; (2) the holds set is updated in response to the goals set; (3) lock release messages are sent to the coordinator in response to changes in the holds set; and (4) entries are either dropped or cached if no remaining waiters, owners or requests remain.

The wake initiator waiters process receives a reference to the entry that corresponds to the resource. The wake initiator waiters process 860 begins 861 by receiving the entry for the resource 862. For each waiter in the entry's waiter set 863, the wake waiter flag is set 864. Then, decision block 865 determines whether an existing owner conflicts with the waiter considered by for loop 863, the "current waiter." In one embodiment, the waiter and owner "conflict" if the owner's contends set comprises the lock type requested by the waiter. If an existing owner does conflict with the current waiter, the wake waiter flag is cleared and the next waiter in the entry's waiters set is considered. However, if in decision block 865 an existing owner does not conflict with the current waiter, decision block 866 determines whether an existing waiter conflicts with the current waiter. If an existing waiter does conflict with the current waiter, the wake waiter flag is cleared 867, and the next waiter in the waiters set is considered. However, if, in decision block 866, an existing waiter does not conflict with the current waiter, the process proceeds to decision block 868.

Decision block 868 determines whether the waiter is an existing owner of the resource. If it is an existing owner of the resource 868, the existing owner data structure is updated using the granted waiter information 869. However, if the waiter is not an existing owner of the resource 868, a new owner data structure is created and then updated with the granted waiter information 870. Then, the next waiter in the waiters set is considered by for loop 863 to determine if it can be woken up.

After each of the waiters in the waiters set of the entry have been considered by for loop 863, the for loop ends 871 and the update holds process 880 is executed before the wake initiator waiters process 860 ends 873.

Figure 23:
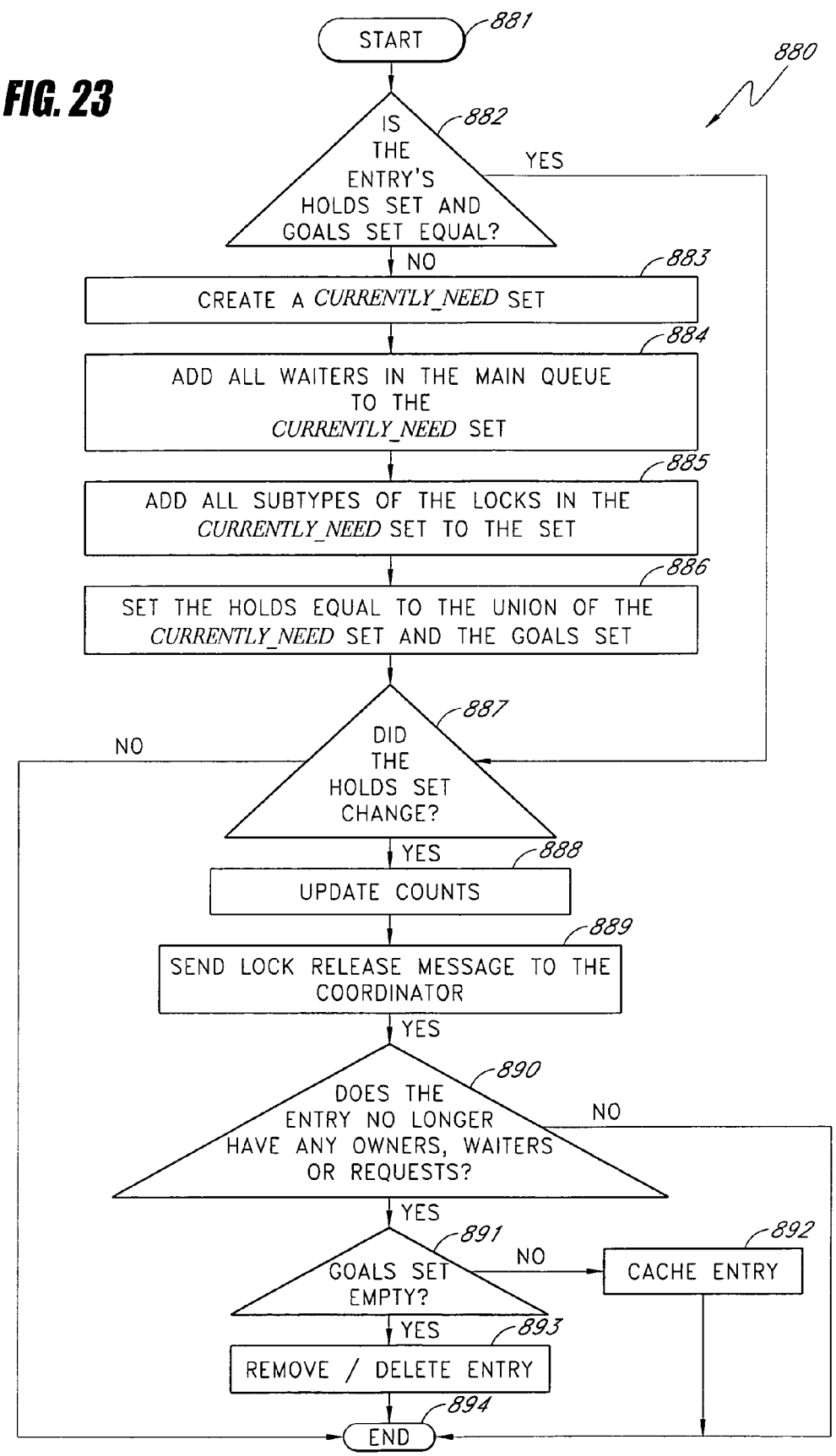
FIG. 23 illustrates one embodiment of a flowchart of operations for an update holds process for an initiator.

FIG. 23 illustrates one embodiment of a flowchart of operation for an update holds operation for the initiator. The update holds process 880 computes the lock types that are currently needed. Locks are needed either because a thread owns a lock of the same type, or because a waiter in the main waiter queue wants that lock type.

The update holds process 880 begins 881 in decision block 882 which determines whether the entry's holds set and goals set are equal. If the entry's holds set and goals set are not equal 882, a currently need set is created 883. Waiters in the main queue are added to the currently need set 884. The currently need set is then updated 885 to include all sub-types of the locks that exist in the currently need set. The holds set is updated to include the union of the currently need set and the goal set 886. Before proceeding to decision block 887 however, if in decision block 882 the entry's holds set and goals set are equal, the process 880 skips to decision block 887.

Decision block 887 determines whether the holds set has changed since the beginning of the update holds process 881. If the holds set has changed 887, the counts are updated to reflect the additional locks added to the holds set 888. Additionally, a lock release message is sent to the coordinator 889. Decision block 890 then determines whether the entry no longer has any owners, waiters, or requests. If the entry has at least one owner, waiter, or request 890, the process moves to decision block 891 which determines whether the goals set is empty. If the goals set is empty 891 then the entry can be removed from the resource and deleted 893 before the process 880 ends 894. However, if in decision block 891, the goals set is not empty 891, the entry is cached before the process 880 ends 894.

However, if the holds set did not change since the process 880 began 881, the process 880 ends 894 directly.

While the preceding figures illustrate one embodiment of flowcharts for an initiator to manage semantic locks, it is recognized that other embodiments may be used. For example, one with ordinary skill in the art will recognize that operations may be implemented to prevent the overflow of the counts data structure associated with a particular resource. Additionally, more or fewer fields may be present in any one of the data structures discussed above.

C. Pseudocode

One example of pseudocode that implements one embodiment of an initiator is provided below. It serves to further illustrate only one embodiment included herein and should not be used to limit the scope of the appended claims.

```
/* Initiator:
 * The initiator sends three messages: lock_request, lock_release, and
 * lock_cancel. The initiator receives one message: lock_response.
 * Action on the initiator is also initiated by function calls by client
 * threads. A thread can either call start_or_convert_lock( ),
 * cancel_lock( ), or unlock( ).
 *
 * A waiter struct keeps track of one client thread's lock request for
 * a resource. The entry points to the entry, and is used
 * by cancel_lock( ). The locker field just represents the locking
 * entity. Normally, this is a thread, but it may be any other type of
 * object. The callback is a function which is called when the lock is
 * granted. The already_holds field is used when locks are converted,
 * instead of locked freshly. A converted request happens when a
 * locker owns a lock of a certain type, and wants to atomically
 * convert that lock to another type. If the locker isn't doing a
 * conversion, already_holds will be null. The lock type represents
 * the type of lock that the locker wants.
 *
 * There is no coordinator-side structure which corresponds to the
 * initiator's waiter.
 */
struct waiter {
    entry           *entry;
    thread          *locker;
    callback        callback;
    owner           *already_holds;
    int             type;
};
/*
 * An owner struct just keeps track of a lock held by a locker. It
 * keeps a pointer to the entry so that unlock can easily find the
 * entry.
 */
struct owner {
    entry           *entry;
    thread          *locker;
    int             type;
};
/*
 * A waiter structure represents an outstanding lock request. It
 * corresponds to a coordinator's waiter structure. An initiator will
 * never have more than one outstanding request for any (type,
 * queue_end) pair. Associated with a request is a list of waiters,
 * which will be added to the main waiter queue when the request is
 * granted.
 */
struct request {
    int             type;
    queue_end       queue_end;
    int             token;
    queue<waiter>   waiters;
};
/*
 * An entry structure keeps track of all the initiator's information
 * for a single resource. It corresponds to the coordinator's owner
 * structure. The owners list, waiters queue, and requests map keep
 * track of outstanding owners, waiters, and requests. The holds set,
 * goal set, and counts array mirror structures in the coordinator's
 * owner structure.
 */
struct entry {
    resource                              resource;
    list<owner>                           owners;
    queue<waiter>                         waiters;
    map<(type, queue_end), request>       requests;
    set<int>                              holds;
    set<int>                              goal;
    byte                                  counts[TYPE_COUNT];
};
map<resource, entry> entries;
int next_token;
waiter *
start_lock_or_convert(thread *locker, resource resource, int lock_type,
callback callback, owner *already_holds)
{
    /*
     * This function is called when a locker wants to get a new
     * lock. It may already hold a lock, in which case it may want
     * to convert the old lock to a new lock type, atomically. In
     * this case, an owner will be passed in the already_holds
     * parameter.
     *
     * Either way, this function creates a new waiter structure,
     * and then either puts it in the main waiters queue hanging
     * off the entry, or puts it on a request's waiters queue, to
     * be added to the main queue later. If a new request needs to
     * be created, a message is sent to the coordinator.
     *
     * If a conversion is requested, then the lock request wants
     * to go at the front of the queue. Otherwise, it wants to go
     * at the back. This function doesn't deal with recursive
     * locks, but they would be dealt with in a similar manner to
     * conversions. That is, recursive requests would go at the
     * beginning of the queue, and they wouldn't contend with
     * other locks held by the same locker.
     */
    /* Get or create the entry.     */
    entry = entries.find(resource);
    if (!entry) {
```

```
                entry = new entry(resource);
                entries.add(resource, entry);
        }
        /* Create a new waiter.    */
        waiter = new_waiter(entry, locker, callback, already_holds, type);
        /* Figure out the queue_end based on whether this is a convert
         * or a new lock.    */
        queue_end = already_holds != null ? FRONT : BACK;
        if (entry->goal.find(lock_type) ||
            (already_holds != null && entry->holds.find(lock_types))) {
                /*
                 * The waiter can go on the main queue, since the
                 * initiator has the requested lock type. Generally,
                 * if the initiator has the requested lock type, but
                 * the type isn't in the goal, then the initiator
                 * won't put the waiter on the main queue. However, if
                 * this is a conversion, then it gets special
                 * permission.
                 */
                if (queue_end == FRONT)
                        entry->waiters.insert_front(waiter);
                else
                        entry->waiters.insert_back(waiter);
                /* This next function might grant the lock
                 * immediately.    */
                wake_waiters(entry, false);
        } else {
                /*
                 * The initiator couldn't put the waiter on the main
                 * queue. This means that the waiter needs to wait for
                 * a request to be completed. Generally, a waiter will
                 * only have one request per type per queue_end
                 * outstanding at once. This minimized thrashing to
                 * some extent, while still providing decent fairness
                 * properties.
                 */
                request = entry->requests.find(type, queue_end);
                if (!request) {
                        /*
                         * Since no matching request was found, create
                         * and send a new one.
                         */
                        request = new request(type, next_token++,
                            queue_end);
                        entry->request.add(type, queue_end, request);
                        send_lock_request(entry->resource, type,
                            optional_types, request->token,
                            queue_end);
                }
                /* Put the waiter on the request's queue.    */
                if (queue_end == FRONT)
                        request->waiters.insert_front(waiter);
                else
                        request->waiters.insert_back(waiter);
        }
        /* The waiter is returned so that the locker can cancel the
         * request if it takes too long.    */
        return waiter;
}
cancel_lock(waiter *waiter)
{
        /*
         * A lock cancellation happens when the waiter gets tired of
         * waiting. When this happens, the waiter is removed from its
         * queue. If that queue was the main waiters queue, then
         * wake_waiters is called, since the waiter may have been
         * blocking other waiters. On the other hand, if the waiter
         * was on a request's queue, and it was the only waiter on the
         * queue, then the request should be canceled.
         */
        entry = waiter->entry;
        if (entry->waiters.find(waiter)) {
                /*
                 * The entry was in the main queue, just remove it
                 * from the queue and have wake_waiters do the rest.
                 */
                entry->waiters.remove(waiter);
                wake_waiters(entry, false);
        } else {
                /*
                 * The entry is in a request's queue. Find the
                 * appropriate request, remove the waiter, and then
                 * potentially get rid of the request.
                 */
                foreach (request in entry->requests) {
                        if (!request->waiters.find(waiter))
                                continue;
                        else {
                                request->waiters.remove(waiter);
                                if (request->waiters.empty( )) {
                                        send_lock_cancel(entry->resource,
                                            request->token);
                                        entry->requests.remove(request);
                                        delete request;
                                }
                                break;
                        }
                }
        }
        delete waiter;
}
unlock(owner *owner)
{
        /*
         * An unlock just removes an owner and calls wake_waiters to
         * do the rest.
         */
        entry = owner->entry;
        entry->owners.remove(owner);
        delete owner;
        wake_waiters(entry, false);
}
receive_lock_response(resource resource, set<int> added,
    set<int> goal, set<int> woken_tokens)
{
        /*
         * This message is the message received by the initiator.
         * It is sent by the coordinator any time the goal or holds
         * state is changed, or when requests are granted. This
         * function just updates the states appropriately, and then
         * calls wake_waiters.
         *
         * In some embodiment, code can be added to make sure
         * that counts never overflow. The coordinator will not
         * grant a request if it would overflow a count. To uphold
         * bargain, the initiator does not let its counts get too
         * its side of the high. In this code, if a count ever
         * starts getting high (defined to be 128 here), a special
         * flag will be forced to wake_waiters which will
         * for it to send a lock_release message.
         */
        bool reduce_counts = false;
        /* Get the entry.    */
        entry = entries.find(resource);
        assert(entry);
        /* Update holds to include locks which were just added.    */
        entry->holds = UNION(entry->holds, added);
        /* Update goal with what the coordinator just sent us.    */
        entry->goal = entry->goal;
        /* Update the counts by incrementing the count for every
         * lock type just added. Also set a flag if any count is now
         * too large.    */
        foreach (type in added) {
                entry->counts[type]++;
                if (entry->counts[type] >= 128)
                        reduce_counts = true;
        }
        /* Update the request structs based on the contents of the
         * woken_tokens argument. All the waiters for the request are
         * put on the main queue, and the request is removed.    */
        foreach (request in entry->requests) {
                if (woken_tokens.find(request->token)) {
                        if (request->queue_end == FRONT)
                                entries->waiters.prepend(request->waiters);
                        else
                                entries->waiters.append(request->waiters);
                        entry->requests.remove(request);
                        delete request;
```

```
            }
        }
    /* Now, wake_waiters handles the rest.     */
    wake_waiters(entry, reduce_counts);
}
wake_waiters(entry *entry, bool reduce_counts)
{
    /*
     * The main part of the initiator, wake_waiters does the following:
     *         - It wakes up any waiters which can be woken.
     *         - If holds and goal differ, it computes what holds
     *           should be. In other words, if the coordinator is
     *           requesting that the initiator drop some lock types,
     *           the initiator evaluates which lock types can be
     *           released.
     *         - If a state change takes place, then a lock_release
     *           message is sent to the coordinator.
     *         - If there are no remaining waiters, owners, or
     *           requests, the entry is either dropped, or cached.
     */
    /*
     * First, wake up any waiters on the main queue which can be
     * woken. Since waiters can only be on the main queue if
     * their lock type is in holds, we don't have to worry about
     * that. However, we do have to worry about outstanding
     * owners and waiters on this node.
     */
    foreach (waiter in entry->waiters) {
        bool wake = true;
        /* Check for conflicting owners.    */
        foreach (owner in entry->owners) {
            if (waiter->already_holds == owner)
                continue;
            if (CONTENDS(waiter->type, owner->type)) {
                wake = false;
                break;
            }
        }
        if (!wake)
            continue;
        /* Check for conflicting waiters earlier in the queue.    */
        foreach (waiter2 in entry->waiters) {
            if (waiter == waiter2)
                break;
            if (CONTENDS(waiter->type, waiter2->type)) {
                wake = false;
                break;
            }
        }
        if (!wake)
            continue;
        /* The waiter is to be woken. Call the callback and
         * create an owner. If an owner already existed,
         * convert it into the new owner.    */
        if (waiter->already_holds) {
            waiter->already_holds.type = waiter->type;
            waiter->callback(waiter->already_holds);
        } else {
            owner = new owner(waiter->thread, waiter->type)
            entry->owners.add(owner);
            waiter->callback(owner);
        }
    }
    /*
     * Next, if the coordinator wants us to give up some lock
     * types, figure out which lock types we really need.
     */
    if (!EQUAL(entry->holds, entry->goal)) {
        /*
         * Compute all of the lock types we currently need.
         * These locks are needed either because a thread owns
         * a lock of the given type, or because a waiter in
         * the main waiter queue wants that lock type.
         */
        set<int> currently_need = { };
        foreach (owner in entry->owners)
            currently_need.add(owner->type);
        foreach (waiter in entry->waiters)
            currently_need.add(waiter->type);
        /*
         * Take the closure of the above set, since we must
         * always have all subtypes of any lock type we hold.
         */
        currently_need = CLOSURE(currently_need);
        /*
         * Our new holds should just be the union of what we
         * need with what our goal is. We don't need to take
         * the closure of this set since both sets involved in
         * the union are closed.
         */
        changed_holds = false;
        set<int> new_holds = UNION(currently_need,
            entry->goal);
        if (!EQUAL(new_holds, entry->holds))
            changed_holds = true;
        entry->holds = new_holds;
    }
    /*
     * If we changed our holds set, or if we need to change the
     * counts because a count is too large, send a lock_release
     * message to the coordinator.
     */
    if (changed_holds || reduce_counts) {
        /* Counts will include all the counts we want to
         * release.     */
        byte counts[TYPE_COUNT];
        for (type = 0; type < TYPE_COUNT; type++) {
            /* If we don't want to hold the lock any more,
             * release all counts. However, if we want to
             * retain it, release all but one.    */
            if (entry->holds.find(type))
                count[type] = entry->counts[type] – 1;
            else
                count[type] = entry->counts[type];
            /* Compute our new holds count.    */
            entry->counts[type] –= counts[type];
        }
        /* Send the message.     */
        send_lock_release(entry->resource, counts);
    }
    /*
     * If the entry no longer has any owners, waiters, or
     * requests, then we either want to cache the entry for later,
     * or release it. Caching an entry may lead to releasing
     * an older entry.
     */
    if (entry->owners.empty( ) && entry->waiters.empty( ) &&
        entry->requests.empty( )) {
        if (entry->goal.empty( )) {
            /*
             * Since we don't hold any lock types, just
             * release the lock. There's no use keeping it
             * around.
             */
            entries.remove(entry);
            delete entry;
        } else {
            /*
             * We're going to keep the entry cached for a
             * while, in case a thread wants a lock again
             * in the near future. However, if there are
             * too many cached entries, we may need to get
             * rid of an old one.
             */
            if (too many cached entries) {
                oldest = oldest unused entry;
                send_lock_release(oldest->resource,
                    oldest->counts);
                entries.remove(oldest);
                delete oldest;
            }
        }
    }
}
```

V. Crossed Messages

In some embodiments, the problem of crossed messages may be encountered. The problem of crossed messages occurs when two entities, each with its own copy of logical object are trying to modify an object. In one embodiment, an entity is an initiator and a coordinator, and the logical object is the lock that the initiator has on the resource associated with the coordinator. The coordinator modifies a lock when it grants the lock, and the initiator modifies a lock when it unlocks the lock.

One with ordinary skill in the art will appreciate that if the proper steps are not taken, one side (for example, the initiator or the coordinator) can end up with a copy of the logical object which is incorrect. For example, suppose an initiator initially has a shared lock on a resource and a thread now requests a new exclusive lock. The initiator will send a request for the exclusive lock to the coordinator. Also suppose that during the time that the coordinator takes to grant the exclusive lock request, the initiator decides to release its shared lock. The coordinator will send the initiator a lock response message to the exclusive lock request which grants the initiator both an exclusive and shared lock. (The shared lock is granted because it is a subtype of the exclusive lock.) Then, when the coordinator receives the lock release message sent by the initiator, the coordinator does not know that the lock release message does not apply to the instance of the shared lock that the coordinator just granted.

In one embodiment, the crossed messages problem is solved by a locking scheme. In this embodiment, the initiator requests permission to unlock locks. For example, it would have to send a message to the coordinator requesting permission to release a lock before it sends a lock release message. Once the initiator was granted permission, it could then go ahead and send an unlock message to the coordinator.

In another embodiment, the crossed messages problem is solved by designating the coordinator as the master. In regular operation, messages would only flow from the coordinator to the initiator. If the initiator wishes to send a message to the coordinator, it would have to first have to tell the coordinator to stop sending messages. Once the coordinator acknowledges the initiator's request to stop sending messages, the initiator can send its message to the coordinator. In another embodiment, the initiator is the master, and the coordinator needs to tell the initiator to stop sending messages.

In yet another embodiment, the crossed messages problem is solved by a detecting scheme. For example, crossed messages would be detected and ignored. The coordinator would include a sequence number in its messages which would be incremented with each outgoing message. Also, the initiator would include in its messages the sequence number of the last message received from the coordinator. The coordinator would ignore any message from the initiator that has a sequence number that does not match the sequence number of the last message it sent to the initiator; and the initiator would always apply the messages from the coordinator.

In a further embodiment, the crossed messages problem is solved using a hybrid of the locking scheme and the detection scheme described above. The detection scheme is used during normal operation. However, when a crossed message is detected, the locking scheme is temporarily used.

In one embodiment that implements the hybrid scheme, only the coordinator detects crossed messages. When one is detected, it sends the initiator a permission granted message. At this point if the initiator needs to send a lock release message to the coordinator, it can do so. However, if the initiator does not need to send a lock release message, it still must send a permission no longer needed message.

In another embodiment that implements the hybrid scheme, both the initiator and coordinator detect crossed messages. Upon detecting a crossed message, the coordinator ignores the initiator's message and stops sending messages to the initiator. Next, when the initiator detects the crossed message, it applies the coordinator's change to the logical object (for example, the lock). Then, then the initiator resends its change to the logical message or sends a special message indicating that it has no changes to make.

In yet another embodiment, the crossed messages problem is solved by relying on counts. Whenever a lock is granted, the count is updated by one. Whenever a lock is released, the number of each type of lock that should be released is sent in the lock release message. Accordingly, the count is reduced appropriately.

VI. Example Application

Figure 24B:
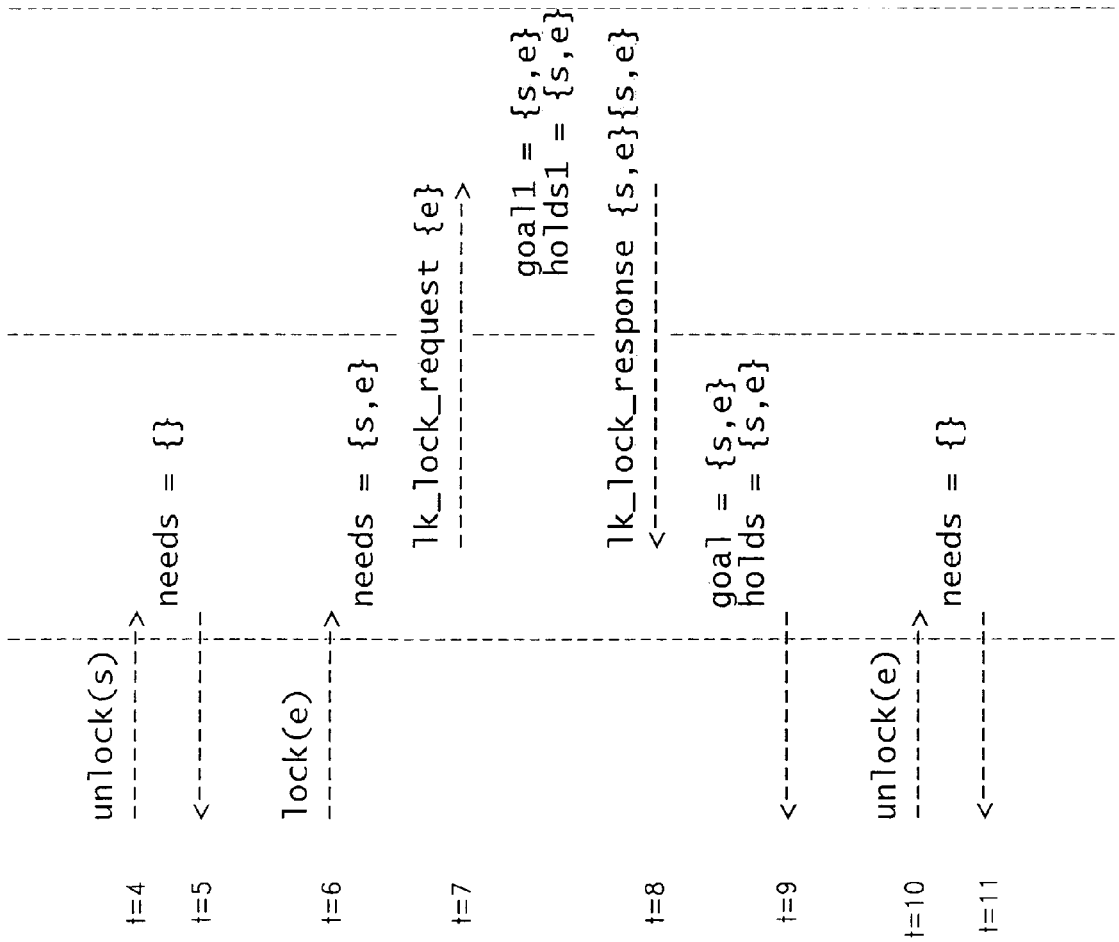
Figure 24C:
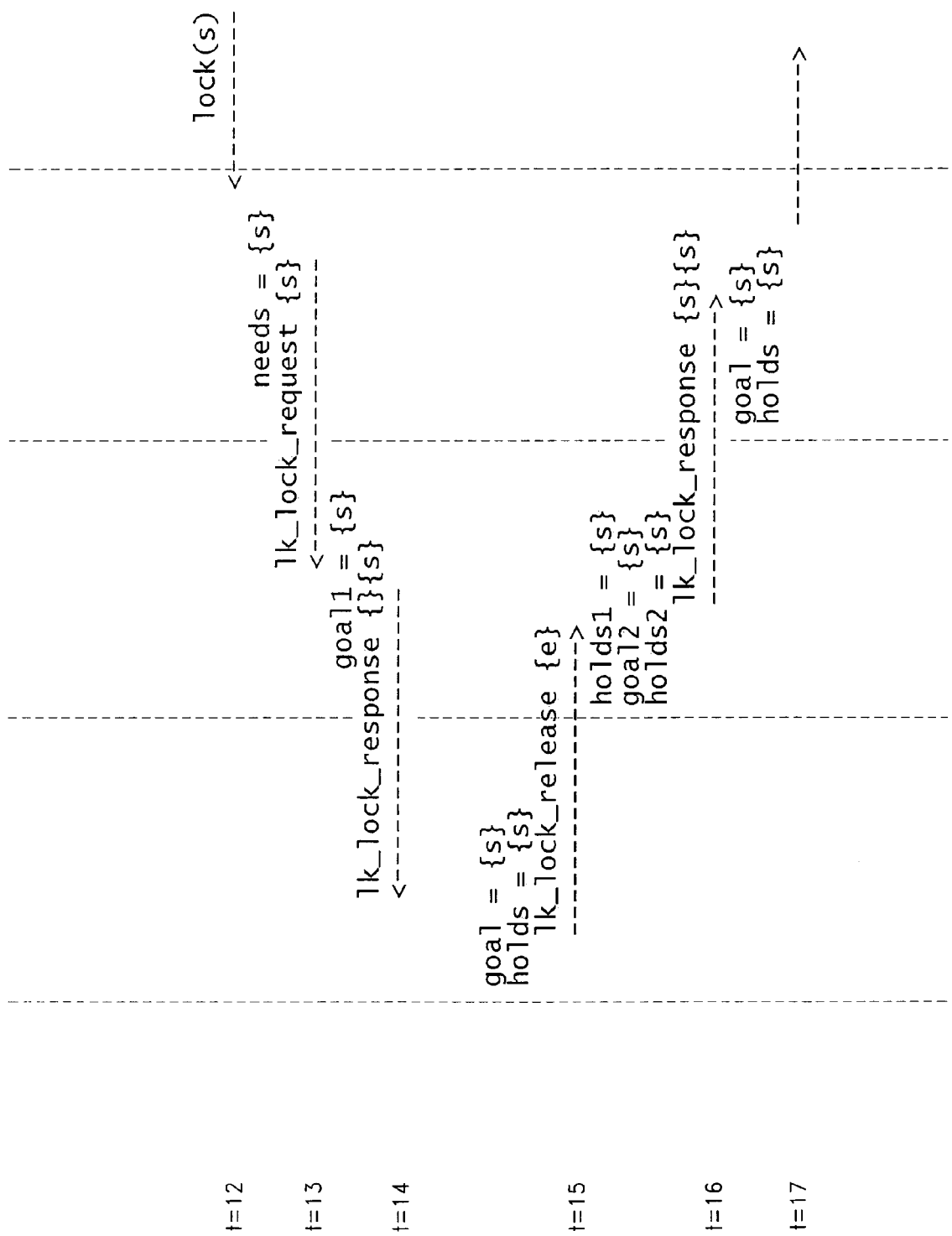
Figure 24D:
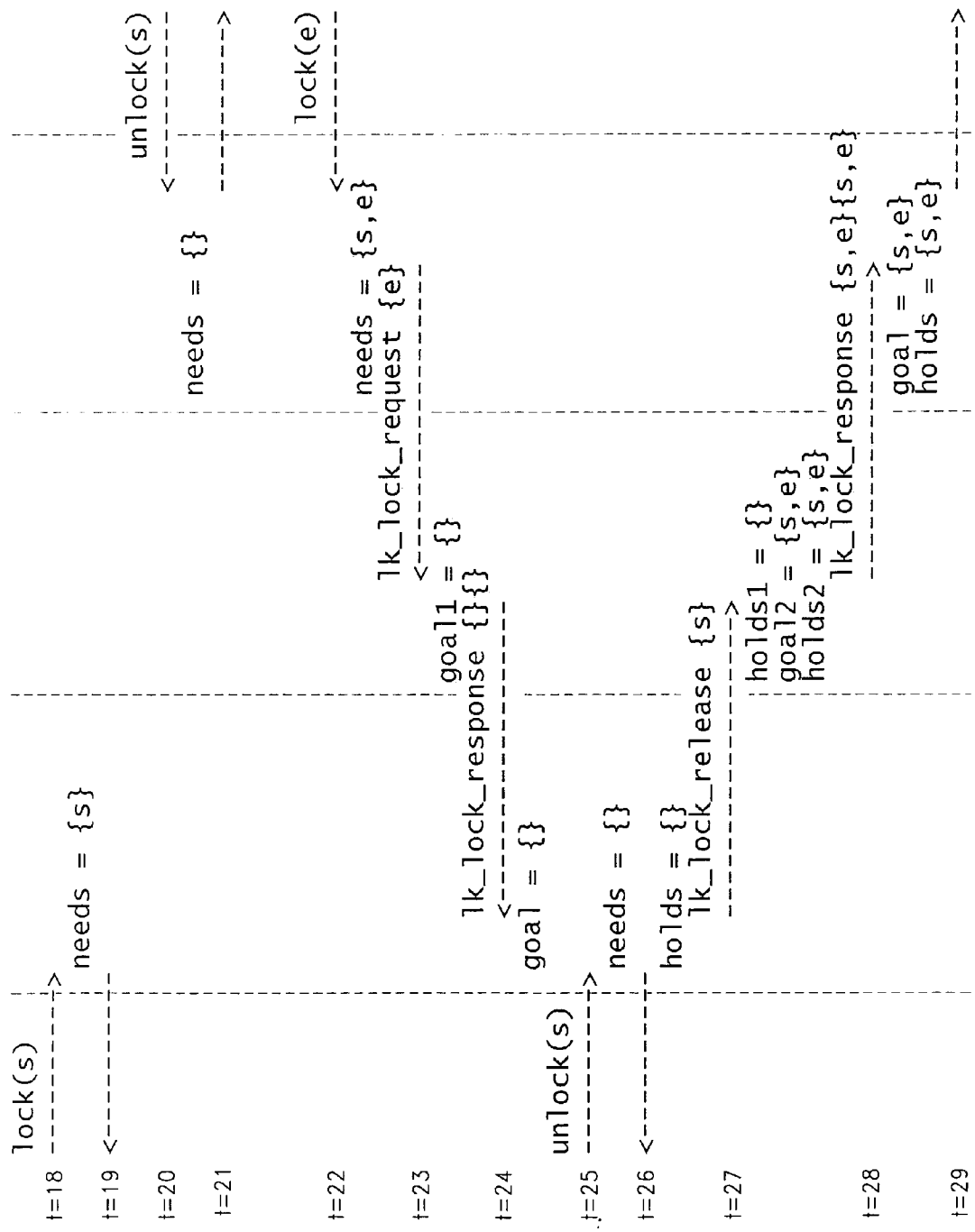

FIGS. 24, 24A and 24B illustrate an example application of one embodiment of messages sent from a coordinator, two initiators, and two threads. In this example, a first thread is in communication with a first initiator; a second thread is in communication with a second initiator; and each of the first and second initiators are in communication with the coordinator.

As illustrated in FIG. 24, messages sent by each entity are indicated by arrows. The entities are arranged in columns with the relative time of each message indicated by the leftmost column. For ease of reference, shared locks are represented using an "s" and exclusive locks are represented using an "e".

Additionally, some of the entities store values which are represented in their respective columns. For example, the first initiator stores its own a goal set, a holds set and a needs set. The second initiator also stores its own goal set, holds set, and needs set. The coordinator stores a goal1 set, a holds1 set, a goal2 set, and a holds2 set. The goal1 and holds1 sets refer to the first initiator's locks on the coordinator's resource, and the goal2 and holds2 sets refer to the second initiator's locks on the coordinator's resource.

At t=0, thread one sends a start or convert lock message to the first initiator. When the initiator receives the message it updates its needs set to include the shared lock. In response, at t=1 the first initiator sends a lock request message for a shared lock to the coordinator. The coordinator updates the goal1 set with a shared lock. Also, because no existing waiters or owners exist that contend with the shared lock request, the shared lock is granted and the holds1 set is accordingly updated. To indicate that the lock request was granted, at t=2, the coordinator sends the first initiator a lock response message with the new goal1 and holds1 sets. In response, the first initiator updates its goal and holds sets using information from the lock response message. Then, at t=3, the first initiator sends a message to the first thread granting its request.

At t=4, the first thread sends an unlock message to the first initiator. The unlock message represents the first thread's desire to release the shared lock it previously obtained. In response, the first initiator updates its needs set to include a null value indicating that it no longer needs a lock. The first initiator does not send a lock release message to the coordinator because the lock is cached. Locks cache when they are released but no contending waiters exist. Then, at t=5, a response to the unlock message is sent to the thread.

At t=6, the first thread sends a start or convert lock message for an exclusive lock to the first initiator. The first initiator updates its needs set to include a shared and exclusive lock. The needs set includes the shared lock because it is a subtype of the exclusive lock. At t=7, the first initiator sends a lock request message for an exclusive lock to the coordinator. In response, the coordinator updates the holds1 set to include a shared and an exclusive lock. The coordinator also updates the goal1 set to include a shared and an exclusive lock. The coordinator can grant a shared and exclusive lock to the first initiator because though normally conflicting lock types, the coordinator will allow the initiator to resolve any intranode contentions. Stated differently, because one thread is requesting both lock types, the shared and exclusive lock requests in this context are compatible. Then, at t=8, the coordinator sends a lock response message indicating that the goal1 set and holds1 set have been updated to include a shared lock and an exclusive lock. Accordingly, the first initiator updates its goal and holds set using information from the lock response message. Then, at t=9, the first initiator sends a message to the first thread granting its request.

At t=10, the first thread sends an unlock message with respect to its exclusive lock. Then, at t=11, a response to the unlock message is sent to the thread. The first initiator retains its shared and exclusive locks on the resource by caching the locks because no contending waiters exist.

Then, at t=12, the second thread sends a start or convert lock message to the second initiator for a shared lock. In response, the second initiator updates its needs set to include a shared lock. At t=13, the second initiator sends a lock request message to the coordinator for a shared lock. In response, the coordinator updates the goal1 set to include only a shared lock. The coordinator updates the goal1 set in this way because the first initiator needs to release its exclusive lock in order to accommodate a shared lock by the second initiator. However, the first initiator can retain its shared lock on the resource because it is compatible with the second initiator's shared lock request. Then, at t=14, the coordinator sends a lock response message indicating that the goal1 set has been updated. The first initiator then updates its goal and holds sets appropriately.

In response, at t=15, the first initiator sends a lock release message for the exclusive lock to the coordinator. The coordinator updates the holds1 set to include just a shared lock. Also, the coordinator updates the goal2 set to include a shared lock and updates the holds2 set to include a shared lock. As a result, both the first initiator and the second initiator each hold a shared lock on the resource. Accordingly, at t=16, the coordinator sends a lock response message to the second initiator that includes the updated goal2 and holds2 sets. Then, at t=17, the second initiator sends a message to the second thread granting its request.

At t=18, the first thread sends a start or convert lock message for a shared lock to the first initiator. In response, the first initiator updates its needs set to include a shared lock. Effectively, the first thread's request means that the shared lock held by the first initiator is no longer cached—it is being used. At t=19, a response to the start or convert lock message is sent to the first thread.

At t=20, the second thread sends an unlock message for its shared lock to the second initiator. In response, the second initiator updates its needs set to include a null set. Now, the shared lock held by the second initiator is cached. Then, at t=21, the second initiator sends the second thread a response to its unlock message.

At t=22, the second thread sends a start or convert lock request message for an exclusive lock to the second initiator. In response, the needs set for the second initiator is updated to include a shared and exclusive lock. At t=23, the second initiator sends a lock request message for an exclusive lock to the coordinator. In response, the coordinator updates the goal1 set to include a null set. This means that the first initiator should release all of its locks in order to accommodate the second initiator's pending request for an exclusive lock. Then, at t=24, the coordinator sends a lock response message to the first initiator that includes the updated goal1 set. In response, the first initiator appropriately updates its goal set.

At t=25, the first thread no longer needs its shared lock on the resource and sends an unlock message to the first initiator for the shared lock. In response, the first initiator updates its needs set and sends the first thread a response to its message.

In response to the unlock message, at t=26, the first initiator updates its holds set. Then, at t=27, the first initiator sends a lock release message for the shared lock to the coordinator. In response, the coordinator updates the holds1 set for the first initiator to equal a null set. Accordingly, because no other initiator has a lock that contends with the second initiator's request for an exclusive lock, the goal2 and holds2 sets are updated to include an exclusive lock and a shared lock. Then, at t=28, the coordinator sends a lock response message to the second initiator that includes the updated goal2 and holds2 sets. In response, the second initiator appropriately updates its goal and holds sets. At t=29, the second initiator sends a message to the second thread granting its request for an exclusive lock.

The above-mentioned example illustrates only one embodiment of the invention disclosed herein. It should in no way be used to limit the scope of the invention. Many alternatives to the example and additional features not shown in the example have been contemplated and disclosed elsewhere.

VII. Other Embodiments

While certain embodiments of the invention have been described, these embodiments have been presented by way of example only, and are not intended to limit the scope of the present invention. Accordingly, the breadth and scope of the present invention should be defined in accordance with the following claims and their equivalents.

It is recognized and contemplated that one with ordinary skill in the art can implement the processes and systems of the invention to accommodate a plurality of resources. Additionally, though many embodiments refer to an initiator that is different from a coordinator, it is recognized that one or more initiators and one or more coordinators can be the same node. For example, if a thread on a node requests a lock on a resource associated with that node, the node would first determine if there was intranode contention (the initiator function) before determining if there was internode contention (the coordinator function). Moreover, the embodiments and examples disclosed herein pertain to a single lock domain. However, multiple lock domains are also contemplated. For example, two sets of lock types can be managed on a single system.

By way of example, the following alternatives are also contemplated. The data structures described herein have been directed to a system that maintains counts for the lock types held on a resource. In one implementation, the counts data structure is of a fixed length. One of ordinary skill in the art will appreciate that the processes described herein may be modified to avoid the situation in which the counts data structure overflows (for example, if it exceeds its maximum value). In one embodiment, overflow is prevented by denying locks when the count becomes sufficiently high. For example, locks would only be granted when at least some of the existing locks are released.

Additionally, some embodiments disclosed herein refer to converted locks (for example, existing locks that change type). One with skill in the art will appreciate that the embodiments described herein can be modified to similarly accommodate recursive locks.

Another alternative embodiment includes processes that accommodate no-wait locks. A no-wait lock is a lock request that will cancel the lock request if it is not granted immediately. A person with ordinary skill in the art will appreciate that sending trace messages along with lock request messages is one method for implementing no wait locks. For example, if the trace messages return to the locker before the lock is granted, then the lock is canceled. Hence, the lock does not wait to obtain the lock if the trace message returns before the lock is granted.

What is claimed is:

1. A system for managing semantic locks and semantic lock requests for a resource, the system comprising:
    a resource;
    a resource lock information indicating existing locks on said resource;
    a first lock compatibility table stored in a memory including information on a plurality of lock types, said information relating to the compatibility among the plurality of lock types;
    a software module configured to:
        receive a first lock request;
        access said first lock compatibility table and said resource lock information to determine whether said first lock request is compatible with existing locks on said resource; and
        transmit a response indicating that said first lock request could be granted if said first lock request is compatible with the existing locks on said resource; and
    a second lock compatibility table that applies to only a portion of all possible said first lock requests indicated by said first lock compatibility table.

2. A method for managing semantic locks and semantic locks requests for a resource comprising:
    receiving a first lock request for a resource;
    accessing a first lock compatibility table and a resource lock information to determine whether said first lock request is compatible with existing locks on said resource, wherein:
        the first lock compatibility table stores information relating to the compatibility among a plurality of lock types; and
        the resource lock information indicates existing locks on said resource; and
    transmitting a response indicating that said first lock request could be granted if said first lock request is compatible with the existing locks on said resource,
    wherein the first lock request is received at a second node, said second node assigned to said resource,
    wherein said first lock request originates from a first node remote from said second node,
    wherein said second node is configured to grant or deny said first lock request, and
    wherein said second node permits said first node to obtain a lock on said resource of the type requested by said first lock request and subtypes associated with said requested lock type.

3. The method of claim 2, wherein said first node releases said one or more maintained locks in response to a request from a third node for at least one lock that is incompatible with said one or more maintained locks.

4. A method for managing semantic locks and semantic locks requests for a resource comprising:
    receiving a first lock request for a resource;
    accessing a first lock compatibility table and a resource lock information to determine whether said first lock request is compatible with existing locks on said resource, wherein:
        the first lock compatibility table stores information relating to the compatibility among a plurality of lock types; and
        the resource lock information indicates existing locks on said resource; and
    transmitting a response indicating that said first lock request could be granted if said first lock request is compatible with the existing locks on said resource,
    wherein the first lock request is received at a second node, said second node assigned to said resource,
    wherein said first lock request originates from a first node remote from said second node,
    wherein said second node is configured to grant or deny said first lock request, and
    wherein said second node permits said first node to maintain one or more locks on said resource even after said first node has finished using said resource.

5. A method for managing semantic locks and semantic locks requests for a resource comprising:
    receiving a first lock request for a resource;
    accessing a first lock compatibility table and a resource lock information to determine whether said first lock request is compatible with existing locks on said resource, wherein:
        the first lock compatibility table stores information relating to the compatibility among a plurality of lock types; and
        the resource lock information indicates existing locks on said resource;
    transmitting a response indicating that said first lock request could be granted if said first lock request is compatible with the existing locks on said resource; and
    receiving a second lock compatibility table that applies to only a portion of all possible said first lock requests indicated by said first lock compatibility table.

* * * * *

UNITED STATES PATENT AND TRADEMARK OFFICE
CERTIFICATE OF CORRECTION

| | | |
|---|---|---|
| PATENT NO. | : 7,509,448 B2 | |
| APPLICATION NO. | : 11/650572 | |
| DATED | : March 24, 2009 | |
| INVENTOR(S) | : Neal T. Fachan and Aaron J. Passey | |

It is certified that error appears in the above-identified patent and that said Letters Patent is hereby corrected as shown below:

On the Title Pg, on page 1, at item 74, please change "Mertens," to --Martens,--.

On the Title Pg, on page 2, item 56, line 51, under U.S. Patent Documents, please change "Puliese et al." to --Pugliese et al.--.

On the Title Pg, on page 3, item 56, line 15, under Other Publications, please change "Seven" to --Steven--.

Figure 18B:
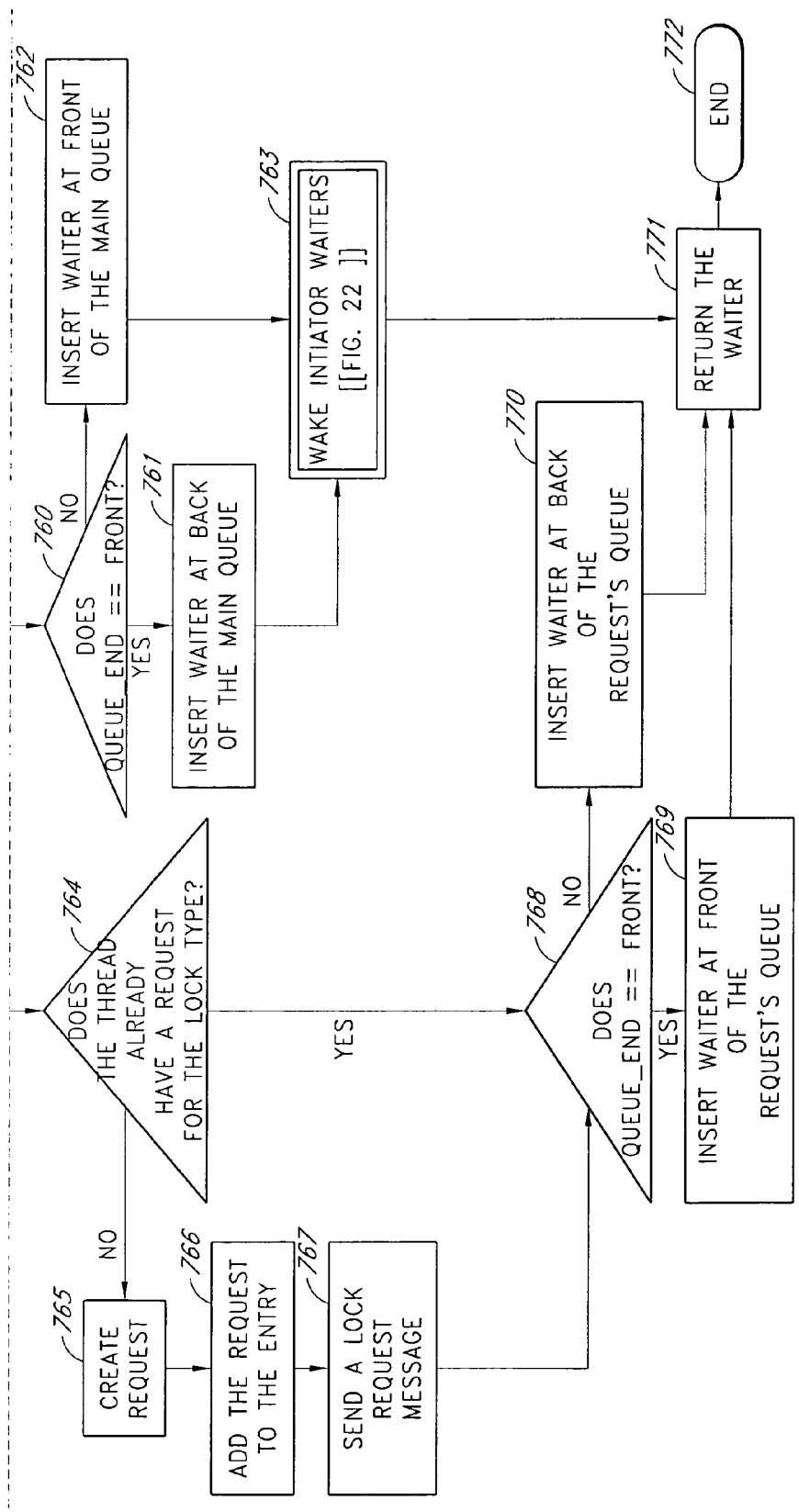

In FIG. 18B, at reference numeral 763, please change "INTIATOR" to --INITIATOR--.

In FIG. 19, at reference numeral 805, please change "INTIATOR" to --INITIATOR--.

In FIG. 20, at reference numeral 823, please change "INTIATOR" to --INITIATOR--.

In FIG. 21, at reference numeral 844, please change "INTIATOR" to --INITIATOR--.

At column 2, line 16, after "herein" please insert --.--.

At columns 15-16, line 31 (Pseudocode), before "from" please delete "of the code".

At columns 17-18, line 31 (Pseudocode), please change "waiter token);" to --waiter_token);--.

At columns 21-22, line 11 (Pseudocode), please change "ww.owners.add" to --ww_owners.add--.

At columns 23-24, line 2 (Pseudocode), please change "owners.dd" to --owners.add--.

At column 26, line 48 (approx.), after "( )" please insert --;--.

At column 34, line 39 (approx.), after "uphold" please insert --its side of the--.

UNITED STATES PATENT AND TRADEMARK OFFICE
CERTIFICATE OF CORRECTION

PATENT NO.        : 7,509,448 B2
APPLICATION NO.   : 11/650572
DATED             : March 24, 2009
INVENTOR(S)       : Neal T. Fachan and Aaron J. Passey It is certified that error appears in the above-identified patent and that said Letters Patent is hereby corrected as shown below:

At column 34, line 41 (approx.), before "high." please delete "its side of the".

Signed and Sealed this

Eighth Day of September, 2009

David J. Kappos
*Director of the United States Patent and Trademark Office*